US011498203B2

United States Patent
Ding et al.

(10) Patent No.: US 11,498,203 B2
(45) Date of Patent: Nov. 15, 2022

(54) CONTROLS OPTIMIZATION FOR WEARABLE SYSTEMS

(71) Applicant: President and Fellows of Harvard College, Cambridge, MA (US)

(72) Inventors: Ye Ding, Cambridge, MA (US); Ignacio Galiana Bujanda, Cambridge, MA (US); Jinsoo Kim, Cambridge, MA (US); Myunghee Kim, Cambridge, MA (US); Scott Kuindersma, Arlington, MA (US); Sangjun Lee, Cambridge, MA (US); Kathleen E. O'Donnell, Cambridge, MA (US); Christopher J. Siviy, Cambridge, MA (US); Conor J. Walsh, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 78 days.

(21) Appl. No.: 16/317,845

(22) PCT Filed: Jul. 15, 2017

(86) PCT No.: PCT/US2017/042286
§ 371 (c)(1),
(2) Date: Jan. 15, 2019

(87) PCT Pub. No.: WO2018/017436
PCT Pub. Date: Jan. 25, 2018

(65) Prior Publication Data
US 2020/0276698 A1 Sep. 3, 2020

Related U.S. Application Data

(60) Provisional application No. 62/522,617, filed on Jun. 20, 2017, provisional application No. 62/365,494, filed on Jul. 22, 2016.

(51) Int. Cl.
B25J 9/16 (2006.01)
G05B 19/042 (2006.01)
B25J 9/00 (2006.01)

(52) U.S. Cl.
CPC ............ *B25J 9/0006* (2013.01); *B25J 9/163* (2013.01); *G05B 19/0426* (2013.01); *G05B 2219/40305* (2013.01)

(58) Field of Classification Search
CPC ..... B25J 9/163; B25J 9/0006; G05B 19/0426; G05B 2219/40305
See application file for complete search history.

(56) References Cited

U.S. PATENT DOCUMENTS 3,387,305 A 6/1968 Shafer
3,411,511 A 11/1968 Marino
(Continued)

FOREIGN PATENT DOCUMENTS

CN 1431084 A 7/2003
CN 1868434 A 11/2006
(Continued)

OTHER PUBLICATIONS

International Search Report for International Application No. PCT/EP2003/012123, dated Jun. 22, 2004.
(Continued)

*Primary Examiner* — Stephen Holwerda
(74) *Attorney, Agent, or Firm* — Wolf, Greenfield & Sacks, P.C.

(57) ABSTRACT

A wearable system includes an exosuit or exoskeleton; an actuator(s) configured to generate force in the exosuit or exoskeleton; a sensor(s) configured to measure information for evaluating an objective function associated with providing physical assistance to the wearer, an interaction between the wearer and the exosuit or exoskeleton, and/or an opera-
(Continued)

Example of an optimization approach for patients using weighted sum of multiple objectives. In this case stability and forward propulsion metrics.

tion of the exosuit or exoskeleton; and a controller(s) configured to: actuate the actuator(s) according to an actuation profile(s), evaluate the objective function based on the information measured by the at least one sensor to determine a resulting change in the objective function, adjust a parameter(s) of the actuation profile(s) based on the resulting change in the objective function, and continue to actuate, evaluate, and adjust to optimize the actuation parameter(s) for maximizing or minimizing the objective function. Wearable systems configured to assist or promote an improvement in the wearer's gait and optimized using a gradient descent or Bayesian approach.

32 Claims, 52 Drawing Sheets

(56) References Cited

U.S. PATENT DOCUMENTS

| | | |
|---|---|---|
| 3,831,467 A | 8/1974 | Moore |
| 4,023,215 A | 5/1977 | Moore |
| 4,252,112 A | 2/1981 | Joyce |
| 4,370,977 A | 2/1983 | Mauldin et al. |
| 4,682,776 A | 7/1987 | Mitchell et al. |
| 4,697,808 A | 10/1987 | Larson et al. |
| 4,724,827 A | 2/1988 | Schenck |
| 4,760,850 A | 8/1988 | Phillips et al. |
| 5,020,790 A | 6/1991 | Beard et al. |
| 5,282,460 A | 2/1994 | Boldt |
| 5,485,402 A | 1/1996 | Smith et al. |
| 5,584,799 A | 12/1996 | Gray |
| 5,599,283 A | 2/1997 | Lindenmeyer et al. |
| 5,667,461 A | 9/1997 | Hall |
| 5,826,578 A | 10/1998 | Curchod |
| 5,865,714 A | 2/1999 | Marlowe |
| 5,865,770 A | 2/1999 | Schectman |
| 5,955,667 A | 9/1999 | Fyfe |
| 6,123,649 A | 9/2000 | Lee et al. |
| 6,129,691 A | 10/2000 | Ruppert |
| 6,168,634 B1 | 1/2001 | Schmitz |
| 6,213,922 B1 | 4/2001 | Afanasenko et al. |
| 6,500,138 B1 | 12/2002 | Irby et al. |
| 6,517,503 B1 | 2/2003 | Naft et al. |
| 6,633,783 B1 | 10/2003 | Dariush et al. |
| 6,635,024 B2 | 10/2003 | Hatton et al. |
| 6,666,831 B1 | 12/2003 | Edgerton et al. |
| 6,689,075 B2 | 2/2004 | West |
| 6,741,911 B2 | 5/2004 | Simmons |
| 6,783,555 B2 | 8/2004 | Kuhn et al. |
| 6,790,165 B2 | 9/2004 | Huang |
| 6,796,926 B2 | 9/2004 | Reinkensmeyer et al. |
| 6,812,624 B1 | 11/2004 | Pei et al. |
| 6,955,692 B2 | 10/2005 | Grundei |
| 6,989,669 B2 | 1/2006 | Low et al. |
| 7,034,432 B1 | 4/2006 | Pelrine et al. |
| 7,034,527 B2 | 4/2006 | Low et al. |
| 7,049,732 B2 | 5/2006 | Pei et al. |
| 7,056,297 B2 | 6/2006 | Dohno et al. |
| 7,064,472 B2 | 6/2006 | Pelrine et al. |
| 7,090,650 B2 | 8/2006 | Ou et al. |
| 7,153,242 B2 | 12/2006 | Goffer |
| 7,153,246 B2 | 12/2006 | Koscielny et al. |
| 7,166,953 B2 | 1/2007 | Heim et al. |
| 7,190,141 B1 | 3/2007 | Ashrafiuon et al. |
| 7,199,501 B2 | 4/2007 | Pei et al. |
| 7,211,937 B2 | 5/2007 | Kornbluh et al. |
| 7,224,106 B2 | 5/2007 | Pei et al. |
| 7,229,390 B2 | 6/2007 | Fujii et al. |
| 7,233,097 B2 | 6/2007 | Rosenthal et al. |
| 7,252,644 B2 | 8/2007 | Dewald et al. |
| 7,259,503 B2 | 8/2007 | Pei et al. |
| 7,259,553 B2 | 8/2007 | Arns, Jr. et al. |
| 7,307,418 B2 | 12/2007 | Low et al. |
| 7,331,906 B2 | 2/2008 | He et al. |
| 7,341,295 B1 | 3/2008 | Veatch et al. |
| 7,355,519 B2 | 4/2008 | Grold et al. |
| 7,367,958 B2 | 5/2008 | McBean et al. |
| 7,368,862 B2 | 5/2008 | Pelrine et al. |
| 7,390,309 B2 | 6/2008 | Dariush |
| 7,410,471 B1 | 8/2008 | Campbell et al. |
| 7,411,332 B2 | 8/2008 | Kornbluh et al. |
| 7,429,253 B2 | 9/2008 | Shimada et al. |
| 7,436,099 B2 | 10/2008 | Pei et al. |
| 7,445,606 B2 | 11/2008 | Rastegar et al. |
| 7,456,549 B2 | 11/2008 | Heim et al. |
| 7,476,185 B2 | 1/2009 | Drennan |
| 7,494,450 B2 | 2/2009 | Solomon |
| 7,521,840 B2 | 4/2009 | Heim |
| 7,521,847 B2 | 4/2009 | Heim |
| 7,537,573 B2 | 5/2009 | Horst |
| 7,549,969 B2 | 6/2009 | van den Bogert |
| 7,567,681 B2 | 7/2009 | Pelrine et al. |
| 7,578,799 B2 | 8/2009 | Thorsteinsson et al. |
| 7,595,580 B2 | 9/2009 | Heim |
| 7,598,651 B2 | 10/2009 | Kornbluh et al. |
| 7,598,652 B2 | 10/2009 | Kornbluh et al. |
| 7,626,319 B2 | 12/2009 | Heim |
| 7,650,204 B2 | 1/2010 | Dariush |
| 7,652,386 B2 | 1/2010 | Donelan et al. |
| 7,654,973 B2 | 2/2010 | Firsov |
| 7,679,267 B2 | 3/2010 | Heim |
| 7,684,896 B2 | 3/2010 | Dariush |
| 7,705,521 B2 | 4/2010 | Pelrine et al. |
| 7,737,685 B2 | 6/2010 | Low et al. |
| 7,750,532 B2 | 7/2010 | Heim |
| 7,758,481 B2 | 7/2010 | Drennan |
| 7,774,177 B2 | 8/2010 | Dariush |
| 7,775,999 B2 | 8/2010 | Brown |
| 7,785,279 B2 | 8/2010 | Sankai |
| 7,785,656 B2 | 8/2010 | Pei et al. |
| 7,787,646 B2 | 8/2010 | Pelrine et al. |
| 7,804,227 B2 | 9/2010 | Pelrine et al. |
| 7,857,774 B2 | 12/2010 | Sankai |
| 7,860,562 B2 | 12/2010 | Endo et al. |
| 7,883,546 B2 | 2/2011 | Kazerooni et al. |
| 7,887,471 B2 | 2/2011 | McSorley |
| 7,897,168 B2 | 3/2011 | Chen et al. |
| 7,911,761 B2 | 3/2011 | Biggs et al. |
| 7,915,790 B2 | 3/2011 | Heim et al. |
| 7,918,808 B2 | 4/2011 | Simmons |
| 7,921,541 B2 | 4/2011 | Pei et al. |
| 7,923,064 B2 | 4/2011 | Pelrien et al. |
| 7,923,902 B2 | 4/2011 | Heim |
| 7,947,004 B2 | 5/2011 | Kazerooni et al. |
| 7,952,261 B2 | 5/2011 | Lipton et al. |
| 7,977,923 B2 | 7/2011 | Pelrine et al. |
| 7,981,508 B1 | 7/2011 | Sharma et al. |
| 7,985,193 B2 | 7/2011 | Thorsteinsson et al. |
| 7,990,022 B2 | 8/2011 | Heim |
| 7,998,040 B2 | 8/2011 | Kram et al. |
| 8,048,007 B2 | 11/2011 | Roy |
| 8,057,410 B2 | 11/2011 | Angold et al. |
| 8,058,861 B2 | 11/2011 | Pelrine et al. |
| 8,060,337 B2 | 11/2011 | Kulach et al. |
| 8,075,633 B2 | 12/2011 | Herr et al. |
| 8,083,644 B2 | 12/2011 | Purdy et al. |
| 8,096,965 B2 | 1/2012 | Goffer et al. |
| 8,114,034 B2 | 2/2012 | Ikeuchi et al. |
| 8,125,755 B2 | 2/2012 | Garcia et al. |
| 8,127,437 B2 | 3/2012 | Lipton et al. |
| 8,142,370 B2 | 3/2012 | Weinberg et al. |
| 8,147,436 B2 | 4/2012 | Agrawal et al. |
| 8,164,232 B2 | 4/2012 | Kornbluh et al. |
| 8,183,739 B2 | 5/2012 | Heim |
| 8,222,799 B2 | 7/2012 | Polyakov et al. |
| 8,231,687 B2 | 7/2012 | Bedard et al. |
| 8,235,869 B2 | 8/2012 | Rastegar et al. |
| 8,246,559 B2 | 8/2012 | Hoffman et al. |
| 8,248,750 B2 | 8/2012 | Biggs et al. |
| 8,274,244 B2 | 9/2012 | Horst et al. |
| 8,283,839 B2 | 10/2012 | Heim |
| 8,287,477 B1 | 10/2012 | Herr et al. |

(56) References Cited

U.S. PATENT DOCUMENTS

| | | |
|---|---|---|
| 8,292,836 B2 | 10/2012 | Matsuoka et al. |
| 8,299,634 B2 | 10/2012 | Donelan et al. |
| 8,311,623 B2 | 11/2012 | Sanger |
| 8,316,526 B2 | 11/2012 | Pei et al. |
| 8,316,719 B2 | 11/2012 | Majidi et al. |
| 8,323,355 B2 | 12/2012 | Latour |
| 8,325,458 B2 | 12/2012 | Prahlad et al. |
| 8,348,875 B2 | 1/2013 | Goffer et al. |
| 8,376,971 B1 | 2/2013 | Herr et al. |
| 8,409,117 B2 | 4/2013 | Cheng et al. |
| 8,436,508 B2 | 5/2013 | Kornbluh et al. |
| 8,438,757 B2 | 5/2013 | Roser |
| 8,460,001 B1 | 6/2013 | Chuang |
| 8,467,904 B2 | 6/2013 | Dariush |
| 8,488,295 B2 | 7/2013 | Garcia et al. |
| 8,508,109 B2 | 8/2013 | Pelrine et al. |
| 8,551,029 B1 | 10/2013 | Herr et al. |
| 8,551,184 B1 | 10/2013 | Herr |
| 8,562,691 B2 | 10/2013 | Endo et al. |
| 8,564,926 B2 | 10/2013 | Prahlad et al. |
| 8,573,982 B1 | 11/2013 | Chuang |
| 8,585,620 B2 | 11/2013 | McBean et al. |
| 8,597,369 B2 | 12/2013 | Hansen et al. |
| 8,608,479 B2 | 12/2013 | Liu |
| 8,608,674 B2 | 12/2013 | Krebs et al. |
| 8,622,938 B2 | 1/2014 | Sankai |
| 8,663,133 B2 | 3/2014 | Johnson et al. |
| 8,665,578 B2 | 3/2014 | Pelrine et al. |
| 8,679,575 B2 | 3/2014 | Biggs et al. |
| 8,715,208 B2 | 5/2014 | Hodgins et al. |
| 8,764,850 B2 | 7/2014 | Hansen et al. |
| 8,766,925 B2 | 7/2014 | Perlin et al. |
| 8,773,148 B2 | 7/2014 | Sankai et al. |
| 8,847,611 B2 | 9/2014 | Ulmen et al. |
| 8,905,955 B2 | 12/2014 | Goffer et al. |
| 8,920,517 B2 | 12/2014 | Smith et al. |
| 8,926,534 B2 | 1/2015 | McBean et al. |
| 8,938,289 B2 | 1/2015 | Einav et al. |
| 8,961,439 B2 | 2/2015 | Yang et al. |
| 8,975,888 B2 | 3/2015 | Pelrine et al. |
| 8,981,621 B2 | 3/2015 | Pelrine et al. |
| 8,986,233 B2 | 3/2015 | Aoki et al. |
| 9,044,346 B2 | 6/2015 | Langlois et al. |
| 9,072,941 B2 | 7/2015 | Duda et al. |
| 9,101,323 B2 | 8/2015 | Einarsson et al. |
| 9,144,528 B2 | 9/2015 | Agrawal et al. |
| 9,149,370 B2 | 10/2015 | Herr et al. |
| 9,195,794 B2 | 11/2015 | Dariush |
| 9,198,821 B2 | 12/2015 | Unluhisarcikli et al. |
| 9,221,177 B2 | 12/2015 | Herr et al. |
| 9,227,108 B1 | 1/2016 | Chuang |
| 9,228,822 B2 | 1/2016 | Majidi et al. |
| 9,231,186 B2 | 1/2016 | Büsgen et al. |
| 9,266,233 B2 | 2/2016 | Kornbluh et al. |
| 9,333,097 B2 | 5/2016 | Herr et al. |
| 9,351,900 B2 | 5/2016 | Walsh et al. |
| 9,387,096 B2 | 7/2016 | Sverrisson et al. |
| 9,403,272 B2 | 8/2016 | Kornbluh et al. |
| 9,427,864 B2 | 8/2016 | Kornbluh et al. |
| 10,028,881 B2 | 7/2018 | Yamamoto et al. |
| 10,115,319 B2 | 10/2018 | Walsh et al. |
| 10,278,883 B2 | 5/2019 | Walsh et al. |
| 10,427,293 B2 | 10/2019 | Asbeck et al. |
| 10,434,030 B2 | 10/2019 | Asbeck et al. |
| 2001/0007845 A1 | 7/2001 | Afanasenko et al. |
| 2003/0009120 A1 | 1/2003 | MacAllister |
| 2003/0030397 A1 | 2/2003 | Simmons |
| 2003/0064869 A1 | 4/2003 | Reinkensmeyer et al. |
| 2003/0092545 A1 | 5/2003 | Koscielny et al. |
| 2003/0096310 A1 | 5/2003 | Hansen et al. |
| 2003/0120183 A1 | 6/2003 | Simmons |
| 2003/0125781 A1 | 7/2003 | Dohno et al. |
| 2004/0043879 A1 | 3/2004 | Huang |
| 2004/0064195 A1 | 4/2004 | Herr |
| 2004/0087418 A1 | 5/2004 | Eldridge |
| 2004/0106881 A1 | 6/2004 | McBean et al. |
| 2004/0116260 A1 | 6/2004 | Drennan |
| 2004/0147378 A1 | 7/2004 | Conklin et al. |
| 2004/0181289 A1* | 9/2004 | Bedard ............... A61F 2/64 623/24 |
| 2004/0191321 A1 | 9/2004 | Guan et al. |
| 2004/0204294 A2 | 10/2004 | Wilkinson et al. |
| 2005/0010150 A1 | 1/2005 | Firsov |
| 2005/0049865 A1 | 3/2005 | Yaxin et al. |
| 2005/0070834 A1 | 3/2005 | Herr et al. |
| 2005/0101448 A1 | 5/2005 | He et al. |
| 2005/0107725 A1 | 5/2005 | Wild |
| 2005/0157893 A1 | 7/2005 | Pelrine et al. |
| 2005/0184878 A1 | 8/2005 | Grold et al. |
| 2005/0288157 A1 | 12/2005 | Santos-Munne et al. |
| 2006/0079817 A1 | 4/2006 | Dewald et al. |
| 2006/0108755 A1 | 5/2006 | Smyler et al. |
| 2006/0136206 A1 | 6/2006 | Ariu et al. |
| 2006/0192465 A1 | 8/2006 | Kornbluh et al. |
| 2006/0249315 A1 | 11/2006 | Herr et al. |
| 2007/0004570 A1 | 1/2007 | Afanasenko et al. |
| 2007/0004571 A1 | 1/2007 | Gonzalez |
| 2007/0016329 A1 | 1/2007 | Herr et al. |
| 2007/0066918 A1 | 3/2007 | Dewald et al. |
| 2007/0111868 A1 | 5/2007 | Fujii et al. |
| 2007/0123997 A1 | 5/2007 | Herr et al. |
| 2007/0135279 A1 | 6/2007 | Purdy et al. |
| 2007/0276270 A1 | 11/2007 | Tran |
| 2008/0000317 A1 | 1/2008 | Patton et al. |
| 2008/0039756 A1 | 2/2008 | Thorsteinsson et al. |
| 2008/0062589 A1 | 3/2008 | Drabing |
| 2008/0071386 A1 | 3/2008 | McBean et al. |
| 2008/0075930 A1 | 3/2008 | Kornbluh et al. |
| 2008/0097269 A1 | 4/2008 | Weinberg et al. |
| 2008/0156363 A1 | 7/2008 | Ikeuchi et al. |
| 2008/0173365 A1 | 7/2008 | Unger et al. |
| 2008/0218132 A1 | 9/2008 | Pelrine et al. |
| 2008/0224564 A1 | 9/2008 | Pelrine et al. |
| 2008/0255488 A1 | 10/2008 | Agrawal et al. |
| 2008/0289952 A1 | 11/2008 | Pelrine et al. |
| 2008/0294019 A1 | 11/2008 | Tran |
| 2008/0300118 A1 | 12/2008 | Wehrell |
| 2009/0042702 A1 | 2/2009 | Toronto et al. |
| 2009/0221928 A1 | 9/2009 | Einav et al. |
| 2009/0255531 A1 | 10/2009 | Johnson et al. |
| 2009/0256817 A1 | 10/2009 | Perlin et al. |
| 2009/0306548 A1 | 10/2009 | Bhugra et al. |
| 2009/0319054 A1 | 12/2009 | Sankai |
| 2010/0000547 A1 | 1/2010 | Johnson et al. |
| 2010/0007240 A1 | 1/2010 | Kornbluh et al. |
| 2010/0024180 A1 | 2/2010 | Pei et al. |
| 2010/0026143 A1 | 2/2010 | Pelrine et al. |
| 2010/0030343 A1 | 2/2010 | Hansen et al. |
| 2010/0038983 A1 | 2/2010 | Bhugra et al. |
| 2010/0056966 A1 | 3/2010 | Toth |
| 2010/0113980 A1* | 5/2010 | Herr ............... A61F 2/60 600/587 |
| 2010/0114329 A1 | 5/2010 | Casler et al. |
| 2010/0144490 A1 | 6/2010 | Purdy et al. |
| 2010/0152630 A1 | 6/2010 | Matsuoka et al. |
| 2010/0185259 A1 | 7/2010 | Shiba et al. |
| 2010/0185301 A1 | 7/2010 | Hansen et al. |
| 2010/0204804 A1 | 8/2010 | Garrec |
| 2010/0271051 A1 | 10/2010 | Sankai et al. |
| 2010/0274364 A1 | 10/2010 | Pacanowsky et al. |
| 2010/0280628 A1 | 11/2010 | Sankai |
| 2010/0286796 A1 | 11/2010 | Clausen |
| 2010/0298834 A1 | 11/2010 | Hildebrandt |
| 2010/0319215 A1 | 12/2010 | Roser |
| 2010/0324698 A1 | 12/2010 | Sverrisson et al. |
| 2011/0004322 A1 | 1/2011 | Sankai |
| 2011/0009793 A1 | 1/2011 | Lucero et al. |
| 2011/0022349 A1 | 1/2011 | Stirling et al. |
| 2011/0025170 A1 | 2/2011 | Rosenthal et al. |
| 2011/0033835 A1 | 2/2011 | Endo et al. |
| 2011/0040216 A1 | 2/2011 | Herr et al. |
| 2011/0062948 A1 | 3/2011 | Arns, Jr. et al. |
| 2011/0071647 A1 | 3/2011 | Mahon |
| 2011/0093089 A1 | 4/2011 | Martin |

(56) References Cited

U.S. PATENT DOCUMENTS

| | | |
|---|---|---|
| 2011/0105966 A1 | 5/2011 | Kazerooni et al. |
| 2011/0150966 A1 | 6/2011 | Chen et al. |
| 2011/0152696 A1 | 6/2011 | Ryan |
| 2011/0154641 A1 | 6/2011 | Pelrine et al. |
| 2011/0155307 A1 | 6/2011 | Pelrine et al. |
| 2011/0174524 A1 | 7/2011 | Sharm et al. |
| 2011/0193362 A1 | 8/2011 | Prahlad et al. |
| 2011/0201978 A1 | 8/2011 | Jeon et al. |
| 2011/0209337 A1 | 9/2011 | Pei et al. |
| 2011/0245738 A1 | 10/2011 | Agrawal et al. |
| 2011/0282255 A1 | 11/2011 | Nace |
| 2011/0295384 A1 | 12/2011 | Herr et al. |
| 2011/0295385 A1 | 12/2011 | Herr et al. |
| 2011/0313331 A1 | 12/2011 | Dehez et al. |
| 2012/0019223 A1 | 1/2012 | Pelrine et al. |
| 2012/0023638 A1 | 2/2012 | Leicester |
| 2012/0056903 A1 | 3/2012 | Shinohara et al. |
| 2012/0071797 A1 | 3/2012 | Aoki et al. |
| 2012/0100286 A1 | 4/2012 | Sharma et al. |
| 2012/0109031 A1 | 5/2012 | Vollbrecht |
| 2012/0120544 A1 | 5/2012 | Pelrine et al. |
| 2012/0128960 A1 | 5/2012 | Busgen et al. |
| 2012/0165709 A1 | 6/2012 | Goffer et al. |
| 2012/0169184 A1 | 7/2012 | Pelrine et al. |
| 2012/0177934 A1 | 7/2012 | Vogel et al. |
| 2012/0179075 A1 | 7/2012 | Perry et al. |
| 2012/0181896 A1 | 7/2012 | Kornbluh et al. |
| 2012/0185052 A1 | 7/2012 | Lefeber |
| 2012/0209152 A1 | 8/2012 | Cordo |
| 2012/0238914 A1 | 9/2012 | Goldfield et al. |
| 2012/0248942 A1 | 10/2012 | Biggs et al. |
| 2012/0253234 A1 | 10/2012 | Yang et al. |
| 2012/0271207 A1 | 10/2012 | Schoen et al. |
| 2012/0279175 A1 | 11/2012 | Biggs et al. |
| 2012/0283844 A1* | 11/2012 | Langlois ............... G05B 15/02 623/24 |
| 2012/0289870 A1 | 11/2012 | Hsiao-Wecksler et al. |
| 2012/0330198 A1 | 12/2012 | Patoglu |
| 2013/0013085 A1 | 1/2013 | Smith et al. |
| 2013/0019749 A1 | 1/2013 | Hufton et al. |
| 2013/0040783 A1 | 2/2013 | Duda et al. |
| 2013/0041617 A1 | 2/2013 | Pease et al. |
| 2013/0045530 A1 | 2/2013 | Gracias et al. |
| 2013/0058001 A1 | 3/2013 | Prahlad et al. |
| 2013/0079686 A1 | 3/2013 | Sessions |
| 2013/0093439 A1 | 4/2013 | Ulmen et al. |
| 2013/0102935 A1 | 4/2013 | Kazerooni et al. |
| 2013/0123672 A1 | 5/2013 | Goffer et al. |
| 2013/0130866 A1 | 5/2013 | Wehrell |
| 2013/0131555 A1 | 5/2013 | Hook |
| 2013/0158444 A1 | 6/2013 | Herr et al. |
| 2013/0165817 A1 | 6/2013 | Horst et al. |
| 2013/0179154 A1 | 7/2013 | Okuno |
| 2013/0186699 A1 | 7/2013 | Prahlad et al. |
| 2013/0211295 A1 | 8/2013 | Johnson et al. |
| 2013/0225371 A1 | 8/2013 | Harrer et al. |
| 2013/0226048 A1* | 8/2013 | Unluhisarcikli ..... A61H 1/0244 601/34 |
| 2013/0230667 A1 | 9/2013 | Sharma et al. |
| 2013/0237884 A1 | 9/2013 | Kazerooni et al. |
| 2013/0245512 A1 | 9/2013 | Goffer et al. |
| 2013/0253385 A1 | 9/2013 | Goffer et al. |
| 2013/0261513 A1 | 10/2013 | Goffer et al. |
| 2013/0261766 A1 | 10/2013 | Langlois et al. |
| 2013/0268256 A1 | 10/2013 | Dariush |
| 2013/0274640 A1 | 10/2013 | Butters et al. |
| 2013/0288863 A1 | 10/2013 | Yamamoto et al. |
| 2013/0289452 A1 | 10/2013 | Smith et al. |
| 2013/0296746 A1 | 11/2013 | Herr et al. |
| 2013/0307370 A1 | 11/2013 | Jenninger et al. |
| 2013/0310979 A1* | 11/2013 | Herr ..................... B62D 57/032 700/258 |
| 2013/0312541 A1 | 11/2013 | Majidi et al. |
| 2013/0328440 A1 | 12/2013 | Kornbluh et al. |
| 2014/0046455 A1 | 2/2014 | Herr et al. |
| 2014/0088729 A1 | 3/2014 | Herr et al. |
| 2014/0194781 A1 | 7/2014 | Einarsson et al. |
| 2014/0213951 A1 | 7/2014 | Pietrusisnki et al. |
| 2014/0249676 A1* | 9/2014 | Florencio ............... B25J 9/1694 700/258 |
| 2014/0277739 A1 | 9/2014 | Kornbluh et al. |
| 2014/0358040 A1 | 12/2014 | Kim et al. |
| 2015/0099945 A1 | 4/2015 | Hawkins, III et al. |
| 2015/0142130 A1 | 5/2015 | Goldfarb et al. |
| 2015/0173993 A1 | 6/2015 | Walsh et al. |
| 2015/0266180 A1 | 9/2015 | Kornbluh et al. |
| 2015/0266181 A1 | 9/2015 | Kornbluh et al. |
| 2015/0297934 A1 | 10/2015 | Agrawal et al. |
| 2015/0298765 A1 | 10/2015 | Golden, Jr. |
| 2015/0321339 A1 | 11/2015 | Asbeck et al. |
| 2015/0321399 A1 | 11/2015 | Hong et al. |
| 2016/0346156 A1 | 1/2016 | Walsh et al. |
| 2016/0101516 A1 | 4/2016 | Kornbluh et al. |
| 2016/0101517 A1 | 4/2016 | Kornbluh et al. |
| 2016/0107309 A1 | 4/2016 | Walsh et al. |
| 2016/0220438 A1 | 8/2016 | Walsh et al. |
| 2016/0278948 A1 | 9/2016 | Piercy et al. |
| 2016/0284231 A1 | 9/2016 | Walsh et al. |
| 2017/0027735 A1 | 2/2017 | Walsh et al. |
| 2017/0163435 A1 | 6/2017 | Ehsani et al. |
| 2017/0176167 A1 | 6/2017 | Keller et al. |
| 2017/0202724 A1 | 7/2017 | De Rossi et al. |
| 2018/0008502 A1 | 1/2018 | Asbeck et al. |
| 2018/0056104 A1 | 3/2018 | Cromie et al. |
| 2018/0217448 A1 | 8/2018 | Mifune et al. |
| 2018/0370020 A1 | 12/2018 | Murakami et al. |
| 2019/0008714 A1 | 1/2019 | Murakami et al. |
| 2019/0021933 A1 | 1/2019 | Murakami et al. |
| 2019/0029912 A1 | 1/2019 | Murakami et al. |
| 2019/0060156 A1 | 2/2019 | Swift et al. |
| 2019/0060157 A1 | 2/2019 | Lamb et al. |
| 2019/0070062 A1 | 3/2019 | O'Donnell et al. |

FOREIGN PATENT DOCUMENTS

| | | |
|---|---|---|
| CN | 101175456 A | 5/2008 |
| CN | 102327173 A | 1/2012 |
| CN | 202342034 U | 7/2012 |
| DE | 19944139 A1 | 4/2001 |
| EP | 0 016 268 A1 | 10/1980 |
| EP | 0 141 640 A | 5/1985 |
| EP | 0 302 148 A1 | 2/1989 |
| EP | 0 509 723 A1 | 10/1992 |
| EP | 1 260 201 A1 | 11/2002 |
| EP | 1 306 792 A2 | 5/2003 |
| EP | 1 324 403 A1 | 7/2003 |
| EP | 1 550 689 A1 | 7/2005 |
| EP | 1 589 059 A1 | 10/2005 |
| EP | 1 842 518 A1 | 10/2007 |
| EP | 2 226 053 A2 | 9/2010 |
| EP | 2 497 610 A1 | 9/2012 |
| EP | 2 548 543 A1 | 1/2013 |
| EP | 2 649 976 A1 | 10/2013 |
| JP | H07-163607 A | 6/1995 |
| JP | 2002-301124 A | 10/2002 |
| JP | 2005-000500 A | 1/2005 |
| JP | 2007-000391 A | 1/2007 |
| JP | 2008-067762 A | 3/2008 |
| JP | 4345025 B2 | 10/2009 |
| JP | 2010-042069 A | 2/2010 |
| JP | 2010-051416 A | 3/2010 |
| JP | 4424269 B2 | 3/2010 |
| JP | 2010-075656 A | 4/2010 |
| JP | 4582523 B2 | 11/2010 |
| JP | 2011-036375 A | 2/2011 |
| JP | 4848260 B2 | 12/2011 |
| JP | 2012-192013 A | 10/2012 |
| JP | 2013-146328 A | 8/2013 |
| JP | 2013-208397 A | 10/2013 |
| JP | 2014-018536 A | 2/2014 |
| WO | WO 00/12041 A2 | 3/2000 |
| WO | WO 2004/017890 A1 | 3/2004 |
| WO | WO 2004/039292 A2 | 5/2004 |
| WO | WO 2004/047928 A2 | 6/2004 |

(56) References Cited

FOREIGN PATENT DOCUMENTS

| WO | WO 2005/102208 A2 | 11/2005 |
|---|---|---|
| WO | WO 2011/008934 A2 | 1/2011 |
| WO | WO 2011/026086 A1 | 3/2011 |
| WO | WO 2011/030641 A1 | 3/2011 |
| WO | WO 2011/126985 A2 | 10/2011 |
| WO | WO 2012/014164 A2 | 2/2012 |
| WO | WO 2012/050938 A2 | 4/2012 |
| WO | WO 2012/103073 A2 | 8/2012 |
| WO | WO 2012/124328 A1 | 9/2012 |
| WO | WO 2012/178171 A2 | 12/2012 |
| WO | WO 2013/019749 A1 | 2/2013 |
| WO | WO 2013/033669 A2 | 3/2013 |
| WO | WO 2013/044226 A2 | 3/2013 |
| WO | WO 2013/049658 A1 | 4/2013 |
| WO | WO 2013/146231 A1 | 10/2013 |
| WO | WO 2014/034145 A1 | 3/2014 |
| WO | WO 2014/109799 A1 | 7/2014 |
| WO | WO 2014/194257 A1 | 12/2014 |
| WO | WO 2015/074070 A1 | 5/2015 |
| WO | WO 2015/088863 A2 | 6/2015 |
| WO | WO 2015/120186 A1 | 8/2015 |
| WO | WO 2015/157731 A1 | 10/2015 |
| WO | WO 2016/044251 A1 | 3/2016 |
| WO | WO 2016/089466 A2 | 6/2016 |
| WO | WO 2017/040669 A1 | 3/2017 |
| WO | WO 2017/160751 A1 | 9/2017 |
| WO | WO 2018/017436 A1 | 1/2018 |

OTHER PUBLICATIONS

International Search Report and Written Opinion in International Application No. PCT/US2016/049706, dated Nov. 29, 2016.
International Search Report and Written Opinion for International Application No. PCT/US2013/060225, dated May 27, 2014.
International Search Report and Written Opinion for International Application No. PCT/US2019/033143, dated Oct. 9, 2019.
International Search Report and Written Opinion for International Application No. PCT/US2014/068462, dated May 22, 2015.
International Search Report and Written Opinion for International Application No. PCT/US2014/040340, dated Oct. 31, 2014.
International Search Report and Written Opinion in International Application No. PCT/US2015/051107, dated Aug. 5, 2016.
International Search Report and Written Opinion for International Application No. PCT/US2017/042286, dated Sep. 28, 2017.
International Search Report and Written Opinion for International Application No. PCT/US2018/022494, dated Jun. 8, 2018.
International Search Report and Written Opinion for International Application No. PCT/US2015/014672, dated Jul. 6, 2015.
International Search Report and Written Opinion for International Application No. PCT/US2015/025472, dated Sep. 4, 2015.
International Search Report and Written Opinion in International Application No. PCT/US2017/022150, dated Jun. 9, 2017.
[No Author Listed], Development of a strategic Master Plan for the transformation of the traditional textile and clothing into a knowledge driven industrial sector by 2015; Report on Intelligent Textiles; State of the art. Clevertex. dated prior to Jul. 2014; 160 pages.
Bae et al., A Soft Exosuit for Patients with Stroke: Feasibility study with a mobile off-board actuation unit. 2015 IEEE International Conference on Rehabilitation Robotics (ICORR). Aug. 11, 2015; 131-8.
Banala et al., Active leg exoskeleton (alex) for gait rehabilitation of motor-impaired patients. Proc. In 2007 IEEE 10th Int. Conf. Rehabil. Robotics. Jun. 13, 2007; 401-7.
Browning et al., The effects of adding mass to the legs on the energetics and biomechanics of waling. Medicine and science in sports and exercise. Mar. 1, 2007; 39(3): 515-25.
Cho et al, Eds., Smart Clothing Technology and Applications. Human Factors and Ergonomics. CRC Press. 2010; 290 pages.
Chu et al., On the biomimetic design of the Berkeley lower extremity exoskeleton (BLEEX). In IEEE Int. Conf. Robotics and Automation (ICRA). Barcelona, Spain. Apr. 2005; 4345-52.

Collins et al., Efficient Bipedal Robots Based on Passive-Dynamic Walkers. Science, Feb. 2005; 307(5712): 1082-1085.
Cool, Biomechanics of orthoses for the subluxed shoulder. Prosthetics & Orthotics International. Jan. 1, 1989;13(2):90-6.
Da Silva et al., FBG Sensing Glove for Monitoring Hand Posture. Sensors Journal. Apr. 5, 2011; 11(10): 2442-8. [Online]. Available: http://ieeexplore.ieee.org/xpls/absall.jsp?arnumber=5742669.
De Rossi et al., Wearable technology for biomechanics: e-textile or micromechanical sensors? IEEE engineering in medicine and biology magazine. May-Jun. 2010; 29(3): 37-43. [Online]. Available:http://www.ncbi.nlm.nih.gov/pubmed/20659856.
Delp et al., OpenSim: open-source software to create and analyze dynamic simulations of movement. IEEE transactions on biomedical engineering. Oct. 22, 2007; 54(11): 1940-50. [Online]. Available: http://www.ncbi.nlm.nih.gov/pubmed/18018689.
Dollar et al., Lower extremity exoskeletons and active orthoses: Challenges and state-of-the-art. Robotics, IEEE Transactions on Robotics. Feb. 25, 2008; 24(1): 144-58.
Erk et al., Strain stiffening in synthetic and biopolymer networks. Biomacromolecules. Apr. 14, 2010; 11(5): 1358-63.
Farris et al., Human medial gastrocnemius force-velocity behavior shifts with locomotion speed and gait. Proc Natl Acad Sci U S A. Jan. 17, 2012;109(3):977-982.
Ferris et al., A Physiologist's Perspective on Robotic Exoskeletons for Human Locomotion. Int J HR. Sep. 2007. 4(3): 507-28.
Ferris et al., Robotic lower limb exoskeletons using proportional myoelectric control. In EMBC 2009, Annual International Conference of the IEEE Engineering in Medicine and Biology Society. Sep. 3, 2009; 2119-24.
Fonseca, Validation of two types of textile electrodes for electrocardiography and electromyography measurement applications. Dissertation submitted to Faculdade de Engenharia da Universidade do Porto. Jul. 2012; 126 pages.
Ghodsi et al., De novo Likelihood-based measures for comparing genome assemblies. In: BMC Research Notes. Dec. 2013; 6(1):334.— online retrieved on Oct. 25, 2016.
Gibbs et al., Wearable Conductive Fiber Sensors for Multi-Axis Human Joint Angle Measurements. Journal of NeuroEngineering and Rehabilitation. Dec. 2005;2(1):7.
Goodvin, Development of a Real-time Spinal Motion Inertial Measurement System for Vestibular Disorder Application. Thesis submitted to University of Victoria. 2003; 155 pages.
Gregorczyk et al., The effects of a lower body exoskeleton load carriage assistive device on oxygen consumption and kinematics during walking with loads. In 25th Army Sci. Conf., Florida, USA. Nov. 1, 2006.
Hallemans et al., 3D joint dynamics of walking in toddlers. A cross-sectional study spanning the first rapid development phase of walking. Gait & Posture. Oct. 1, 2005; 22(2):107-118.
Kadaba et al., Measurement of lower extremity kinematics during level walking. Journal of orthopaedic research : official publication of the Orthopaedic Research Society. May 1990; 8(3): 383-92. [Online]. Available: http://www.ncbi.nlm.nih.gov/pubmed/2324857.
Kawamoto et al., Power assist method for HAL-3 using EMG-based feedback controller. in Systems, Man and Cybernetics, 2003. IEEE International Conference on. Oct. 8, 2003; 2:1648-53.
Kim et al., Epidermal electronics. Science. Aug. 12, 2011; 333(6044): 838-43. [Online]. Available: http://www.sciencemag.org/cgi/doi/10.1126/science.1206157.
Kramer et al., Soft curvature sensors for joint angle proprioception. in 2011 IEEE/RSJ International Conference on Intelligent Robots and Systems. Sep. 25, 2011; 1919-26. [Online]. Available:http://ieeexplore.ieee.org/lpdocs/epic03/wrapper.htm?arnumber-6094701.
Kramer et al., Wearable tactile keypad with stretchable artificial skin. 2011 IEEE International Conference on Robotics and Automation. May 9, 2011; 1103-7. [Online]. Available:http://ieeexplore.ieee.org/lpdocs/epic03/wrapper.htm?arnumber=5980082.
Kulyukin, Ed., Advances in Human-Robot Interaction. In-Teh. Dec. 2009.; 354 pages.

(56) References Cited

OTHER PUBLICATIONS

Laughton et al., Effect of Strike Pattern and Orthotic Intervention on Tibial Shock During Running. Journal of Applied Biomechanics. May 1, 2003; 19(2): 153-68.

Lee et al., Biomimetic Approach Enables Functional Movements of Hand Post Stroke: A Pilot Study. Gait and Clinical Movement Analysis Society. 2012; 2 pages.

Lenhart et al., Increasing Running Step Rate Reduces Patel-lofemoral Joint Forces. Medicine & Science in Sports & Exercise. Mar. 2014; 46(3): 557-64.

Lieberman et al., Effects of stride frequency and foot position in landing on braking force, hip torque, impact peak force and the metabolic cost of running in humans. Journal of Experimental Biology. Nov. 1, 2015; 218(21):3406-14.

Lipomi et al., Skin-like pressure and strain sensors based on transparent elastic films of carbon nanotubes. Nature nanotechnology. Dec. 2011; 6(12): 788-92. [Online]. Available: http://www.ncbi.nlm.nih.gov/pubmed/22020121.

Majidi et al., A non-differential elastomer curvature sensor for softer-than-skin electronics. Smart Materials and Structures. Aug. 31, 2011; 20(10): 105017. [Online]. Available:http://stacks.iop.org/0964-1726/20/i=10/a=105017?key=crossref.0cca7e97d6a-d7110bcdcaf45f30f3b60.

Malcolm et al., Fast Exoskeleton Optimization. Science. Jun. 23, 2017; 356(6344): 1230-1.

Mattila, Ed., Intelligent textiles and clothing. Woodhead Publishing Limited. 2006; 525 pages.

McGeer, Passive Bipedal Running. Proceedings of the Royal Society of London. Series B, Biological Sciences. May 22, 1990; 240(1297): 107-134.

Newman et al., Astronauth Bio-Suit System to enable planetary exploration. In International Astronautical Conference. Vancouver, Canada. Oct. 2004.

Park et al., Active Modular Elastomer Sleeve For Soft Wearable Assistance Robots, 2012 IEEE/RSJ International Con. On Intelligent Robots and Systems. Vilamoura, Algarve, Portugal. Oct. 7, 2012; 1595-1602.

Park et al., Bio-inspired Active Soft Orthotic Device for Ankle Foot Pathologies. 2011 IEEE/RSJ International Conference on Intelligent Robots and Systems. San Francisco, CA, USA. Sep. 25, 2011; 4488-95.

Park et al., Design and Fabrication of Soft Artificial Skin Using Embedded Microchannels and Liquid Conductors. IEEE Sensors Journal. May 22, 2012; 12(8): 2711-8. [Online]. Available:http://ieeexplore.ieee.org/lpdocs/epic03/wrapper.htm?arnumber-6203551.

Park et al., Hyperelastic pressure sensing with a liquid-embedded elastomer. Journal of Micromechanics and Microengineering. Nov. 29, 2010; 20(12): 125029. [Online]. Available:http://stacks.iop.org/0960-1317/20/i=12/a=125029?key=crossref.84cffc44789-ba7bde0bdfdl69e25af91.

Polonen et al., Automatic Intensity Quantification of Fluorescence Targets from microscope Images with Maximum Likelihood Estimation. 17th European Signal Processing Conference. Aug. 24, 2009; 1072-6.—retrieved online Oct. 25, 2016.

Pratt et al., The RoboKnee: An exoskeleton for enhancing strength and endurance during walking. in IEEE Int. Conf. Robotics and Automation (ICRA). New Orleans, USA. Apr. 26, 2004; 3: 2430-5.

Quintero et al., Control and Implementation of a Powered Lower Limb Orthosis to Aid Walking in Paraplegic Individuals, in IEEE International Conference on Rehabilitation Robotics. Jun. 29, 2011; 6 pages.

Ramuz et al., Transparent, Optical, Pressure-Sensitive Artificial Skin for Large-Area Stretchable Electronics. Advanced Materials. Jun. 26, 2012; 24(24):3223-7. [Online] Available:http://doi.wiley.com/10.1002/adma.201200523.

Reid et al., Biomechanical assessment of racksack shoulder strap attachment location: effect on load distribution to the torso. RTO HFM Specialists Meeting on Soldier Mobility: Innovations in Load Carriage System Design and Evaluation. NATO-RTO Meeting Proceedings: MP-056 (Neuilly-sur Seine: NATO). Jun. 2000; 9 pages.

Royer et al., Manipulations of Leg Mass and Moment of Inertia: Effects on Energy Cost of Walking. Medicine & Science in Sports & Exercise. Apr. 1, 2005; 37(4): 649-56.

Schiele, Ergonomics of Exoskeletons: Objective Performance Metrics, in Euro Haptics conference on Haptic Interfaces for Virtual Environmental Teleoperator Systems. Salt Lake City, UT, USA. Mar. 18, 2009: 103-8.

Scilingo et al., Strain-sensing fabrics for wearable kinaesthetic-like systems. IEEE Sensors Journal. Sep. 4, 2003; 3(4): 460-7. [Online]. Available: http://ieeexplore.ieee.org/lpdocs/epic03/wrapper.htm?arnumber=1226639.

Silva et al., Wireless Hydrotherapy Smart-Suit Network for Posture Monitoring. 2007 IEEE International Symposium on Industrial Electronics. Jun. 2007; 2713-7.

Sinclair et al., Determination of Gait Events Using an Externally Mounted Shank Accelerometer. Journal of Applied Biomechanics. Feb. 1, 2013; 29(1): 118-22.

Strauser et al., The development and testing of a human machine interface for a mobile medical exoskeleton, in IEEE Int Conf, Intelligent Robots and Systems. San Francisco, CA. USA. Sep. 25, 2011; 4911-6.

Tesconi et al., Wearable sensorized system for analyzing the lower limb movement during rowing activity. 2007 IEEE International Symposium on Industrial Electronics. Jun. 4, 2007; 2793-6. [Online]. Available: http://ieeexplore.IEEE.org/lpdocs/epic03/wrapper.htm?arnumber=4375052.

Tiwana et al., A review of tactile sensing technologies with applications in biomedical engineering. Sensors and Actuators A: Physical. Jun. 1, 2012; 179: 17-31. [Online]. Available: http://linkinghub.elsevier.com/retrieve/pii/S0924424712001641.

Vogt et al., Design and Characterization of a Soft Multi-Axis Force Sensor Using Embedded Microfluidic Channels. IEE Sensors Journal. Jul. 4, 2013; 13(10): 4056-64.

Walsh et al., Quasi-Passive Leg Exoskeleton for Load Carrying Augmentation. International Journal of Humanoid Robotics, Special Issue: Active Exoskeletons. Sep. 2007; 4(3): 487-506.

Wehner et al., Experimental characterization of components for active soft orthotics. in Submitted in Proc. IEEE Int. Conf. Biomed. Rob. Biomechatron. Roma, Italy. Jun. 24, 2012; 1586-92.

Wehner et al., Lower Extremity Exoskeleton Reduces Back Forces in Lifting. ASME Dynamic Systems and Control Conference. Hollywood, California, USA. Oct. 12, 2009; 49-56.

Wehner, Man to Machine, Applications in Electromyography. In: EMG Methods for Evaluation Muscle and Nerve Functions. Jan. 2012. Schwartz, Ed.. Chapter 22: 29 pages.

Woodman, An introduction to inertial navigation. University of Cambridge Computer Laboratory Technical Report UCAM-CL-TR-696. Aug. 2007; 37 pages.

Yamada et al., A stretchable carbon nanotube strain sensor for human-motion detection. Nature nanotechnology. May 2011; 6(5): 296-301. [Online]Available: http://www.ncbi.nlm.nih.gov/pubmed/21441912.

Zhang et al., Carbon nanotube polymer coatings for textile yarns with good strain sensing capability. Sensors and Actuators A: Physical. Jun. 2012; 179: 83-91. [Online]. Available:http://linkinghub.elsevier.com/retrieve/pii/S0924424712001938.

Zhang et al., Human-in-the-Loop Optimization of Exoskeleton Assistance During Walking. Science. Jun. 23, 2017; 356(6344): 1280-4.

Zoss et al., Biomechanical deign of the Berkeley lower extremity exoskeleton (BLEEX). Mechatronics, IEE/ASME Transactions on. Apr. 10, 2006; 11(2): 128-138.

U.S. Appl. No. 15/097,744, filed Apr. 13, 2016, Asbeck et al.
U.S. Appl. No. 15/102,694, filed Mar. 31, 2017, De Rossi et al.
U.S. Appl. No. 14/893,934, filed Nov. 24, 2015, Walsh et al.
U.S. Appl. No. 16/538,746, filed Aug. 12, 2019, Asbeck et al.
U.S. Appl. No. 16/493,746, filed Sep. 12, 2019, Bartlett et al.
U.S. Appl. No. 15/302,347, filed Oct. 6, 2016, Walsh et al.
U.S. Appl. No. 16/084,377, filed Sep. 12, 2018, O'Donnell et al.

(56) References Cited

OTHER PUBLICATIONS

PCT/US2013/060225, May 27, 2014, International Search Report and Written Opinion.
PCT/US2019/033143, Oct. 9, 2019, International Search Report and Written Opinion.
PCT/US2014/068462, May 22, 2015, International Search Report and Written Opinion.
PCT/US2014/040340, Oct. 31, 2014, International Search Report and Written Opinion.
PCT/US2015/051107, Aug. 5, 2016, International Search Report and Written Opinion.
PCT/US2017/042286, Sep. 28, 2017, International Search Report and Written Opinion.
PCT/US2018/022494, Jun. 8, 2018, International Search Report and Written Opinion.
PCT/US2015/014672, Jul. 6, 2015, International Search Report and Written Opinion.
PCT/US2015/025472, Sep. 4, 2015, International Search Report and Written Opinion.
PCT/US2017/022150, Jun. 9, 2017, International Search Report and Written Opinion.
PCT/EP2003/012123, Jun. 22, 2004, International Search Report.
PCT/US2016/049706, Nov. 29, 2016, International Search Report and Written Opinion.
Ding et al., Multi-joint actuation platform for lower extremity soft exosuits. 2014 IEEE International Conference on Robotics and Automation (ICRA). May 31, 2014:1327-34.

* cited by examiner

Example of an optimization approach for patients using weighted sum of multiple objectives, in this case stability and forward propulsion metrics.

Schematic diagram showing the experimental protocol to validate the implementation of the Optimization control approach at ankle

| Subject | Positive Ankle Power | Metabolic Benefit | Optimal timings |
|---|---|---|---|
| S1 | 7.62 W ⇑ 10.78 W | 13.28% ⇑ 17.68% | T1 = 41.25, D = 18.75 |
| S2 | 4.72 W ⇑ 9.81 W | 10.24% ⇑ 19.77% | T1 = 38.75, D = 26.25 |
| S3 | 6.13 W ⇑ 7.34 W | 9.64% ⇑ 13.50% | T1 = 41.25, D = 23.75 |
| S4 | 6.66 W ⇑ 11.24 W | 11.01% ⇑ 19.13% | T1 = 46.25, D = 23.75 |
| S5 | 6.27 W ⇑ 11.22 W | 10.91% ⇑ 24.76% | T1 = 41.25, D = 23.75 |
| S6 | 4.91 W ⇑ 7.58 W | 16.72% ⇑ 17.83% | T1 = 43.75, D = 26.25 |

FIG. 31

- Higher ankle power delivered (6.05 to 9.66 W/kg)
- Higher reduction in metabolic cost (-11.97 to -18.8% compared to slack)

CONTROLS OPTIMIZATION FOR WEARABLE SYSTEMS

CROSS-REFERENCE TO RELATED APPLICATIONS

This application is a U.S. national phase application of PCT International Patent Application No. PCT/US2017/042286, filed on Jul. 15, 2017, which claims the benefit of and priority to U.S. Provisional Patent Application No. 62/365,494, filed Jul. 22, 2016, and U.S. Provisional Patent Application No. 62/522,617, filed Jun. 20, 2017, the entirety of all these applications are hereby incorporated by reference for all purposes.

GOVERNMENT SUPPORT

The invention was made with government support under Grant W911NF-14-C-0051 awarded by Defense Advanced Research Projects Agency (DARPA) and under Award 1446464 awarded by National Science Foundation (NSF). The Government has certain rights in the invention.

BACKGROUND

Soft exosuits have a number of possible applications. For example, healthy individuals may utilize soft exosuits to reduce the energy cost of walking, thereby improving endurance and allowing them to carry heavier loads. As another example, individuals with an impaired gait (e.g., stroke patients, persons with muscular or neurological development issues or injuries) may utilize soft exosuits to help restore or improve pathological gait patterns. Human subject experiments conducted by our laboratory in the last two years have shown that soft exosuits can achieve significant metabolic cost reduction for both loaded and unloaded walking, and how they can lead to improvements in walking of post-stroke individuals.

These studies indicate not only that exosuits can be effective on a large pool of subjects, but also that there is a very high degree of variability in the efficacy of exosuits across different individuals. Such variability stems primarily from the fact that each individual (whether with healthy or impaired gait) necessitates from an individualized assistance pattern to maximize the effect of the exosuits. A one-size-fits-all approach leads naturally to a high variability in the results. For example, as shown in FIG. 1, while the best actuation timing for subject A which minimizes the metabolic cost of walking is AA, another subject B may have a totally different metabolic landscape and a totally different optimum at BB. In a case like this, the controllers presented in this disclosure may automatically find the optimal control parameter for each subject by solving an optimization problem in real time while walking with the wearer, leading to a maximum effect of the exosuit.

Experimental data further demonstrates variability in effectiveness of soft exosuits across subjects. For example, FIG. 2A and FIG. 2B illustrate experimental results showing a change in metabolic rate for 7 different subjects. Four different controller conditions with different negative power assistance timings were tested in the study and are presented along the x-axis of the figures. FIG. 2A depicts average changes (gray bars) and corresponding s.e.m. (error bars). FIG. 2B depicts individual subject data (colored lines) and corresponding box plots. As shown in FIG. 2A, in this study our soft exosuit allowed for an average reduction of −15% of the net metabolic cost of walking in the best condition (Max-Neg). As shown in FIG. 2B, however, when considering individual subjects the metabolic benefit varied greatly from −5% to −23% in the same controller condition, while the exosuit was governed by the same exact control algorithm and all subjects were assisted in a uniform way. It can be seen that the inter-subject variability in metabolic saving is very significant, and most importantly, the optimal condition is not the same for all subjects.

Inter-subject variability is not only a problem of soft exosuit, but it has indeed been confirmed in many other studies involving the use of exoskeletons. FIG. 3A and FIG. 3B illustrate experimental results showing change in metabolic rate for 9 different subjects. Five different spring conditions for unpowered exoskeletons were tested and are presented along the x-axis. FIG. 3A depicts average changes (gray bars) and corresponding s.e.m. (error bars). FIG. 3B depicts individual subject data (colored lines) and corresponding box plots. As shown in FIG. 3A, the unpowered exoskeleton allowed for an average metabolic reduction of −7% in the best stiffness condition (182 N m rad-1). However, the individual reduction varied from +4% to −23% in the same condition, and inter-subject variability was pretty significant for all of the experimental conditions.

Accordingly, there is a need to optimize exosuit control parameters for individual wearers to minimize variability in outcomes and to maximize the efficacy of the exosuit for each subject.

SUMMARY

Presented are systems and methods for optimizing the control of an exosuit or an exoskeleton to maximize efficacy and reduce the variability of its effect across different wearers. In various embodiments, one or more actuation parameters of an assistive profile (e.g., those associated with actuation timing, actuation amplitude, actuation rate, a profile shape of actuation, or combinations thereof) may be adjusted to maximize or minimize an objective function associated with one or a combination of: (i) providing physical assistance to the wearer, (ii) an interaction between the wearer and the exosuit or the exoskeleton, and (iii) an operation of the exosuit or the exoskeleton. The systems and methods of the present disclosure may be widely applied to wearable systems designed to assist healthy wearers and wearers with physical/neurological impairments alike.

For example, actuation timing (e.g., onset, peak, offset), actuation amplitude (e.g., maximum, minimum), actuation rate (e.g., slow, fast), and/or actuation profile shape (e.g., function coefficients affecting shape of polynomial-, linear-, exponential-, sinusoidal-, or spline-shaped actuation profiles) can be adjusted according to the optimization approaches described herein to optimize objective functions associated with providing physical assistance to the wearer such as locomotive economy (e.g., minimizing energy expenditure of locomotion), locomotive output (e.g., maximizing propulsion), locomotive form (e.g., maximizing gait symmetry, maximizing ground clearance), and stability (whether stationary or moving). Likewise, various actuation parameters can be adjusted to maximize or minimize objective functions associated with interactions between the exosuit or exoskeleton and the wearer such as displacement of the exosuit or the exoskeleton on the wearer (e.g., minimize displacement) and comfort of the wearer (e.g., minimize shearing forces and/or pressure points). Still further, systems and methods of the present disclosure provide for optimizing one or more actuation parameters for maximizing or minimizing objective functions associated with the exosuit or exoskeleton itself such as electrical power consumption (e.g., minimizing battery power consumption), mechanical power transmission efficiency (e.g., maximizing force delivered to the exosuit by the actuator), and temperature (e.g., minimizing temperature of one or more components of the exosuit or the exoskeleton). In various embodiments, an objective function may be used to combine more than one variable that is desired to optimize, through a weighted average of two or more variables, or other methods.

In various embodiments, the objective function can be evaluated using one or more wearable sensors, thereby facilitating use outside of laboratory environments. In some such embodiments, the wearable sensor(s) may directly measure the objective function, while in other embodiments, the controller may use measurements from the wearable sensor(s) to calculate or otherwise approximate the objective function (e.g., measure force and rotational velocity to calculate power delivered to the wearer). Example wearable sensors include one or a combination of an inertial measurement unit (IMU), a joint angle sensor, a force or pressure sensor, a torque sensor, a metabolic energy measurement device, a muscle activity measurement device, a ground reaction force sensor, a heart rate sensor, and an insole force or pressure sensor, amongst others.

Additionally or alternatively, systems and methods of the present disclosure may monitor a proxy that has a correlative relationship with the objective function in order to evaluate the objective function. For example, experimental data shows that average positive power delivered to the wearer by the exosuit or exoskeleton tends to correlate with locomotive efficiency and locomotive output of the wearer; therefore, average positive power a useful proxy for evaluating locomotive efficiency and locomotive output as objective functions.

Optimization approaches, in various embodiments, may generally include actuating the exosuit or exoskeleton according to at least one actuation profile, evaluating the objective function based on information measured by at least one sensor, adjusting at least one parameter of the actuation profile based on a resulting change in the objective function, and continuing to actuate, evaluate, and adjust to optimize the actuation parameter(s) for maximizing or minimizing the objective function.

More specifically, in some embodiments, a gradient-descent approach may be used to optimize the actuation parameter(s) for maximizing or minimizing the objective function. A gradient-descent approach typically leads to convergence, and is often simple and low in computational burden, making it well suited for running on inexpensive processors or when running other computationally-burdensome processes on shared hardware. In one such embodiment, the controller may be configured to determine whether the objective function increased or decreased from one or an average of preceding evaluations of the objective function, and in response, adjust the actuation parameter in a same or different direction depending on whether it is sought to maximize or to minimize the objective function. Likewise, when multiple actuation profiles are tested before adjustments are made, the controller may be configured to compare evaluations of the objective function for each actuation profile to determine which produces the highest or lowest evaluation of the objective function, and in response, generate another set of actuation profiles in which the values of the actuation parameters being optimized have been adjusted according to a derivative of the objective function evaluations associated with the former set of actuation profiles. A gradient-descent approach may optimize the actuation parameter(s) to a local maximum/minimum or a global maximum/minimum depending on the objective function landscape (i.e., relationship between the objective function and the parameter(s) being optimized). For example, in situations when the objective function landscape is substantially convex in shape, a gradient-descent approach may optimize the actuation parameter(s) to a global maximum/minimum of the objective function. In other situations, such as those in which the objective function landscape includes multiple peaks or valleys, the gradient-descent approach may optimize the actuation parameter(s) to either a local maximum/minimum or to a global maximum/minimum depending on where the optimization starts, amongst other relevant factors.

In other embodiments, a Bayesian approach may be used to optimize the actuation parameter(s) for maximizing or minimizing the objective function. A Bayesian approach is typically sample-efficient, allowing it to explore the objective function landscape relatively quickly. This feature can make a Bayesian approach well-suited for finding and optimizing the actuation parameter(s) to a global maximum/minimum in more complex objective function landscapes, and tends to make a Bayesian approach relatively more tolerant of noise in evaluations of the objective function than some other approaches. In one such embodiment, a mathematical correlation between the actuation parameter(s) and the objective function can be defined by actuating the exosuit or exoskeleton according to several actuation profiles having different baseline values of the actuation parameter(s) being optimized and mapping corresponding evaluations of the objective function for each. From this, the controller may determine a candidate value(s) of the actuation parameter(s) for maximizing or minimizing the objective function. The candidate value(s) may be tested and evaluated, and the mathematical correlation updated, until the controller converges on an optimized value of the actuation parameter(s), or until some other suitable termination criteria is met. In an embodiment, the process of defining the mathematical correlation and identifying candidate values of the actuation parameter may involve generating a posterior distribution (e.g., via a Gaussian process, in an embodiment) and utilizing a probabilistic model (e.g., a Bayesian approach) to identify a candidate value(s) of the actuation parameter based on the posterior distribution like a gradient-descent approach, a Bayesian approach may optimize the actuation parameter(s) to a local maximum/minimum or a global maximum/minimum depending on the objective function landscape and where the optimization starts, amongst other relevant factors.

BRIEF DESCRIPTION OF THE DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

FIG. 31 shows resulting positive ankle power, metabolic benefit, and optimal timings for six subjects, in accordance with embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

As described above, while studies with exoskeletons and exosuits have shown very promising results when averaging multiple subjects, there still exists a very variability in results on different subjects. So far, the assistive profiles of these type of wearable devices have been designed following methodologies that include i) commanding a pre-defined assistive profile based on biomechanics knowledge from studies that involve multiple participants, ii) off-line simulation of different assistive profiles given a typical movement of the wearer from average or normative biomechanics, iii) experimental evaluation of different profiles on multiple subjects by following time-consuming biomechanical studies and selection of the profile that, in average, provides higher benefits in average. All these approaches may lead to promising results in average for the conditions that they have been designed for but may result in high inter-subject variability and are very dependent on the task that they have been designed for (e.g., a treadmill speed or a way of performing a given task).

Figure 4:
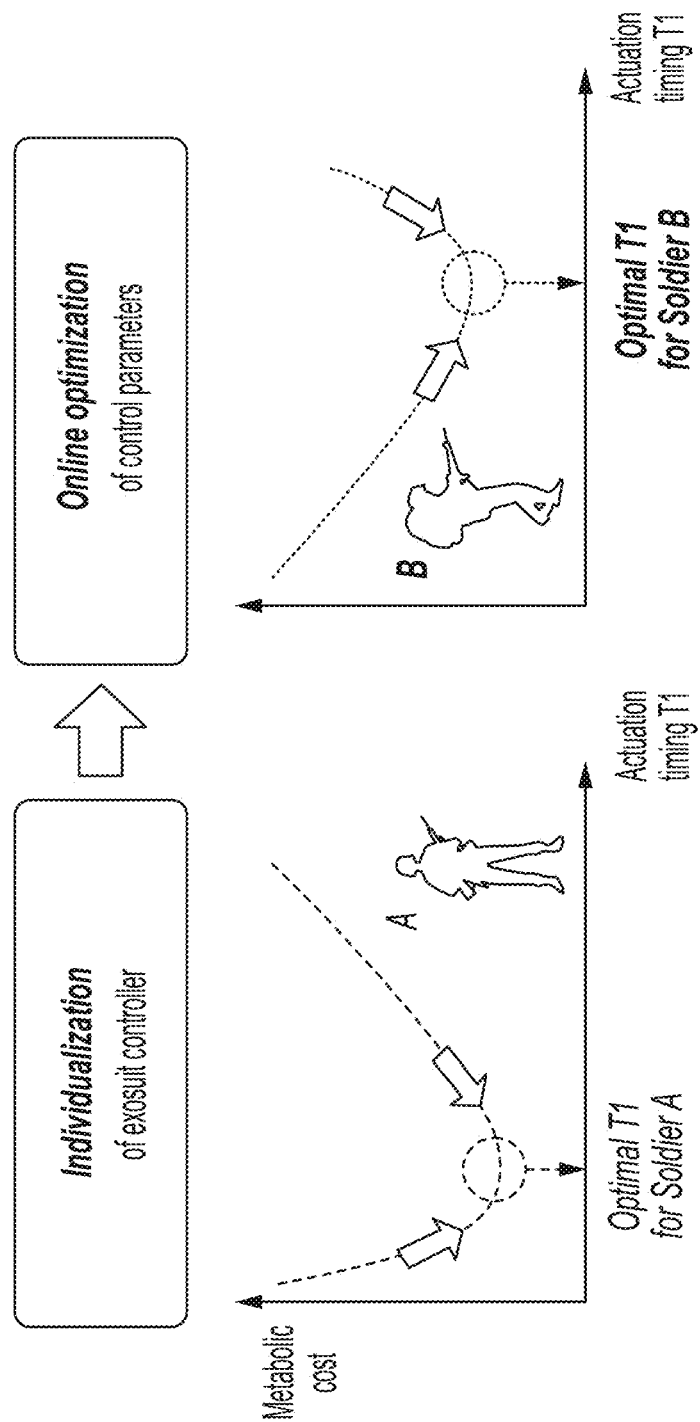
FIG. 4 illustrates actuation optimization for two different individuals, each yielding different optimal actuation onset timing, in accordance with another embodiment of the present disclosure.

When assisting healthy people with wearable devices, we have to keep in mind that i) different people may perform a given activity differently (e.g. subtle differences in the way two different healthy subjects walk, presentations of a neurological conditions in gait that may affect patients in different ways, etc.), ii) different people may react to a given assistance in different ways, iii) the task may change (e.g., walking at different speeds, over different terrains, etc.). As an example, FIG. 4. illustrates how two different healthy individuals may have different outcomes depending on the actuation parameters selected (in this case actuation timing), the maximum performance of the system, in this case the lowest metabolic cost of walking, is achieved with very different actuation parameters for each subject. This highlights the need of individualizing the exosuit or exoskeleton controller for different individuals. An online optimization algorithm that measures or estimates the objective function by using wearable sensors and adapts different parameters of the assistive profile to maximize or minimize that objective while a given user is performing a task will allow for a higher individualization of the assistance, Optimization approaches may be used to maximize or minimize benefits when wearing a lower-limb exoskeleton or exosuit during walking. The proposed system may assist different joints in the lower-limb such as the ankles, knees or hips during walking to either enhance the performance of healthy individuals during walking (e.g. reducing fatigue) or to correct gait deficits and improve the efficiency of walking for impaired individuals. In both cases, walking is a cyclic task in which an optimization algorithm may be able to measure or estimate an objective over multiple steps, modify a parametrized assistive profile, re-evaluate the objective and iterate until the parameters that maximize of minimize the desired objective are found.

In addition to optimization approaches that involve the lower extremity of the body, for example, that can assist the gait of the wearer, various other types of motion and movement of the body of the wearer can be affected and optimized using optimization approaches in conjunction with the exosuit or exoskeleton. For example, other non-walking tasks that are either cyclic in nature, involve multiple repetitions, or that are sustained over time can utilize an optimization algorithm to maximize or minimize an objective function that is evaluated during each repetition or over time respectively. Exemplary cyclical upper body movement can include exercise in rehabilitation or repetitive work tasks.

Activities involving the upper body including, but not limited to, the arms, neck, hands, wrists, shoulders, and/or back, can be enhanced by wearing assistive wearable devices, such as an exosuit or an exoskeleton, which can reduce fatigue, strains and/or injuries. For example, support can be provided to the lower back, shoulder, elbow, arm and/or hand when either lifting objects or performing overhead work, or a grip assist device can provides additional strength in wrist and/or the hand to either grasp a tool or press a trigger of a tool to avoid strains on muscles or carpal-tunnel symptoms if repeated. In all these cases, wearable devices can be applied to wearers to reduce fatigue, improve ergonomics, prevent injuries, or improve comfort while doing these tasks. Wearable devices can be optimized and used on or across various joints of the wearer including, but not limited to, an ankle, knee, hip, back, neck, shoulder, elbow, hand, or combinations of aforementioned joints. As these tasks are characterized by having multiple repetitions or being sustained over a period of time, various optimization methods can be used to measure and/or estimate an objective function over multiple repetitions or over time respectively and update a parametrized assistive profile to optimize a desired objective.

In the context of exosuit or exoskeleton control systems, an optimization approach may generally entail:

1. The choice of an objective function;
2. The choice of a way to evaluate the objective function (e.g., direct measurement; calculations based on measurements of related information, or by proxy);
3. The choice of one or more actuation parameters to optimize for maximizing or minimizing the objective function; and
4. The choice and application of an optimization method.

Actuation Profiles and Parameters

Figure 5B:
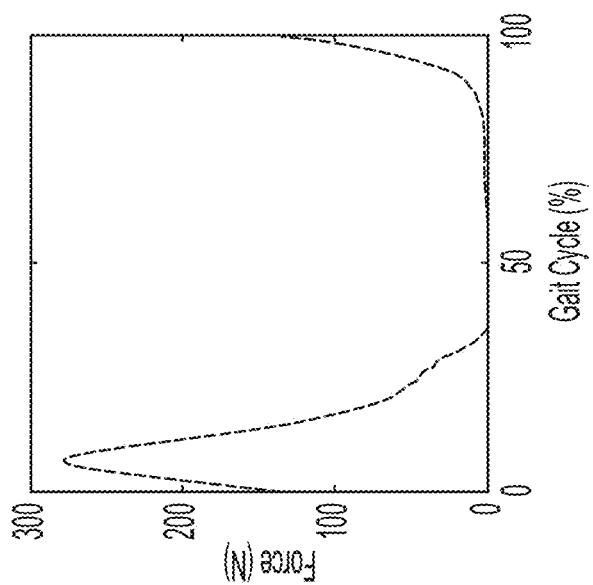
FIG. 5A, FIG. 5B, and FIG. 5C illustrates a representative actuation profile and associated actuation parameters, in accordance with yet another embodiment of the present disclosure.
Figure 5A:
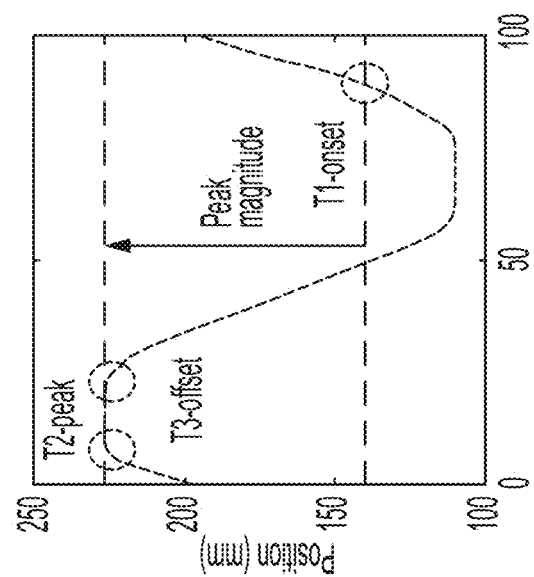
Figure 5C:
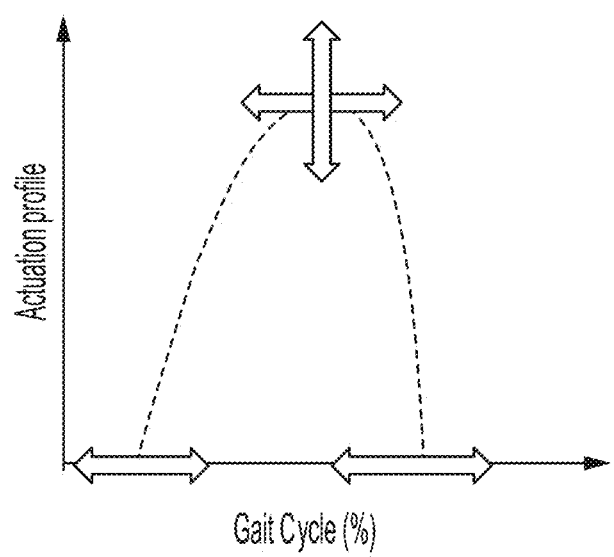

Systems and methods of the present disclosure seek to optimize one or more parameters associated with actuating the exosuit or exoskeleton in order to maximize or minimize the selected objective function. Generally speaking, the exoskeleton or exosuit is actuated according to an actuation profile defining a timing, rate, magnitude, and overall shape of the actuation during a specified period. Oftentimes, an actuation profile is presented in the form of commanded actuator position (e.g., cable position when a Bowden cable(s) connects a motor(s) to portion(s) of the exosuit or exoskeleton) throughout the specified period, as shown in FIG. 5B, that determines the shape of the assistance force profile as shown in FIG. 5A. An actuation profile can also be based on force control as shown in FIG. 5C. Here, the specified period is a cycle of the wearer's gait, which can be a useful timeframe when assisting the lower limbs of the wearer during locomotion. Of course, any suitable period may be specified according to the biomechanics of the wearer and the portion(s) of the wearer's body being assisted by the exosuit or exoskeleton.

Still referring to FIG. 5A, an actuation profile can be broken down according to the prescribed timing, rate, magnitude, and overall shape of actuation. More specifically, an actuation profile can be further reduced into a finite-dimensional set of numerical variables, representing key actuation parameters such as: (i) the timing of the initiation of actuation, of its peak, and of its termination, (ii) a rate of the actuation, (iii) the magnitude of the actuation, and (iv) coefficients of a function defining a shape of the actuation, such as the coefficients of a polynomial, linear, exponential, sinusoidal, or other function defining a shape of the actuation profile.

Actuation of the exosuit or exoskeleton in combination with the natural motion of the wearer, causes the exosuit or exoskeleton to deliver forces and moments to the wearer's body. Like an actuation profile, the timing and magnitude of the resulting forces and moments may be characterized by a position assistance profile, as shown in FIG. 5B. Here, actuation of the exosuit or exoskeleton according to the actuation profile of FIG. 5A delivers forces and moments to the wearer's hip as represented in the assistance profile of FIG. 5B. In other cases, the assistive profile may be parametrized directly in the force or torque space to be controlled by a force controller as shown in FIG. 5C. In this example, the actuation is configured to assist an extension motion of the wearer's hip joint while walking.

Objective Functions and Proxies, Generally

A common goal of the optimization approaches disclosed herein is to maximize the benefits conferred by the exosuit or exoskeleton to the wearer. These benefits may vary depending on the given application, but generally speaking, involve providing physical assistance to the wearer. This can include, for example, assisting the wearer's natural motions (e.g., reducing energy expenditure, increasing strength), helping to stabilize the wearer while stationary or moving, or promoting an improvement in a cyclical or repetitive motion of the wearer (e.g., retraining gait in stroke patients), amongst any number of other suitable uses. Depending on the wearer and the purpose of the exosuit or exoskeleton, one may identify a number of metrics that, if maximized or minimized, may make the exosuit or exoskeleton more beneficial to the wearer. Optimization approaches of the present disclosure seek to optimize one or more parameters of how the exosuit or exoskeleton is actuated with the purpose of maximizing or minimizing these metrics, or objective functions.

Systems and methods of the present disclosure, in various embodiments, utilize feedback from one or more sensors of the wearable system to evaluate the impact of actuation adjustments on a given objective function. This feedback helps the wearable system ensure that these actuation adjustments converge in a way that maximizes or minimizes the objective function. As such, in various embodiments, the controller may be configured to evaluate the objective function in response to a given actuation of the exosuit or exoskeleton. As used herein, evaluating the objective function broadly includes any suitable way of quantifying the objective function. For example, in an embodiment, evaluating the objective function may be obtaining a direct measurement of the objective function from the one or more sensors included in the wearable system. In another embodiment, evaluating the objective function may include calculating or approximating the objective function using one or more measurements provided by the one or more sensors of the wearable system. For example, if the objective function is power delivered by the exosuit or exoskeleton to the wearer, the controller may be configured to calculate power by multiplying measurement of force and rotational velocity taken by a load cell and IMU to calculate this metric. In yet another embodiment, evaluating the objective function may include measuring, calculating, or approximating a proxy correlated with the objective function using information measured by the one or more sensors of the wearable system to estimate, via this correlative relationship, the objective function.

The use of a proxy in evaluating the objective function may be particularly well-suited to situations in which it may be impossible or otherwise difficult to directly measure the objective function, or to estimate the objective function via calculations using related measurements from wearable sensors. For example, it can be difficult to directly measure metabolic consumption, and typically requires expensive equipment or requires the user to wear a mask to measure gas exchange. However, the amount of positive power that an exosuit or exoskeleton delivers to the ankle joint during plantarflexion has been found to correlate with a reduction in metabolic cost. Therefore, an optimization algorithm may use positive power delivered to the biological joint as a proxy for evaluating metabolic cost, locomotive efficiency, and other related objective functions. It should be noted, of course, that average positive power, along with any other proxy identified in the present disclosure, can itself be used as an objective function within the scope of the present framework. Stated otherwise, an objective function, as the term is used herein, need not always describe the ultimate desired effect (e.g., maximize locomotive efficiency) but rather can be any metric sought to be maximized or minimized (including, within a set of range constraints) through optimization of one or more actuation parameters.

As another example, heart rate has also been found to be correlated with a level of exertion of wearers in some applications, and therefore heart rate, in an embodiment, may be used as a proxy for metabolic effort. In yet another example, estimating the overall stability of human walking overground can be very challenging; however as further described in more detail below, there exists some low-dimensional quantities such as extrapolated center of mass and the maximum Lyapunov exponent (MLE), which correlate with the wearer stability and thus, in an embodiment, can be used as a proxy for evaluating stability.

Generally speaking, objective functions related to exosuits or exoskeletons may be broken down into three categories: (i) those objective functions associated with providing physical assistance to the wearer, (ii) those objective functions associated with an interaction between the wearer and the exosuit or exoskeleton, and (iii) those objective functions associated with the operation of the exosuit or exoskeleton, as further described in more detail below. It should be understood, of course, that these categories are presented for ease of explanation, and that the optimization approaches described herein may also be used in connection with optimizing actuation for maximizing or minimizing any other suitable objective function that may fall outside of the scope of one of these three general categories.

Objective Functions and Proxies Associated with Providing Physical Assistance to the Wearer As referenced above, many objective functions associated with exosuit or exoskeleton performance relate to the effectiveness of the wearable system in providing physical assistance to the wearer. Below, representative examples of several such objective functions are provided, along with biomechanical context for how each may be maximized or minimized to benefit the wearer.

Energy Expenditure: Quantifies the energy consumption or level of effort when performing a task. A system that measures this variable may use this as an objective function to an algorithm to reduce the metabolic effort of a given task (e.g. walking, running, lifting an object, etc.). This metric may be useful for a wide variety of applications such as healthy people doing strenuous tasks or impaired individuals with reduced walking efficiency. This objective function may also be referred to herein as metabolic effort or, in the context of locomotion, locomotive efficiency.

Ground Clearance: Measurement of the shortest distance between the foot and the ground. An exemplary optimization approach may seek to optimize an actuation parameter(s) to maximize the distance between the foot and the ground in order to minimize instances of toe-catching in patients with foot drop or when carrying heavy loads. A related objective function based on this measurement, and blending aspects of both ground clearance and gait symmetry, is the ratio or symmetry index of ground clearance between both legs, which could be useful for applications such as stroke where one leg is mostly affected.

Similarity of joint kinematics to normative data: An exemplary optimization approach may evaluate how similar a wearer's kinematics are to age-, sex, weight-, and/or speed-matched data from a normative set of healthy users, and optimize an actuation parameter(s) to drive the wearer's kinematics to match (i.e., maximize similarity to or minimize variance from) a desired normative profile. Possible metrics include correlation with healthy data or percent difference in key points or metrics (e.g. ankle kinematics during ground clearance).

Time integral of muscular activity: This is the integral with respect to time of the muscular activity. An exemplary optimization approach may seek to optimize an actuation parameter(s) to reduce or minimize the overall activity of the muscle(s) during an activity. For instance, one may desire to reduce or minimize the overall effort of calf muscles during walking, or muscles in the back when lifting an object.

Peak muscular activity: Similar to time integral of muscular activity, but targeting peak muscle activity. This may be chosen over or in combination with time integral of muscular activity in some applications, for instance for activities in which the peak muscular activity may pose a risk of injury or in which the peak muscle activity is higher than a person is able to perform for a long time.

Time integral of forward propulsion (propulsive impulse): This is the integral with respect to time of the component of the ground reaction force pointing in the direction of locomotion. An exemplary optimization approach may seek to maximize this objective function in order to increase propulsive efficiency. This optimization could be done for just one leg (as in stroke, where the objective may be to enhance paretic propulsive impulse) or both legs.

Peak propulsive force: This is the maximum value of the ground reaction force pointing in the direction of walking. An exemplary optimization approach may seek to maximize this objective function in order to increase propulsive or locomotive output. This optimization could be done for just one leg (as in stroke, where the objective may be to enhance paretic propulsive impulse) or both legs.

Ratio of propulsive impulse to braking impulse: Propulsive impulse is measured as described above, while the braking impulse is the time integral of the component of the ground reaction force that points opposite the direction of walking. For steady-state walking in healthy populations, this ratio is approximately one for each leg. An exemplary optimization approach may seek to optimize an actuation parameter(s) to drive this ratio towards one for each leg (i.e., maximize similarity between propulsive impulse and braking impulse for a given leg).

Propulsion impulse symmetry: This is expressed as either a ratio between the propulsion impulse of both legs, or a "symmetry index" where a value of one suggests "healthy-like" locomotion. An exemplary optimization approach may seek to optimize an actuation parameter(s) to drive this ratio or symmetry index between legs towards one (i.e., maximize similarity between propulsion impulse of the legs).

Peak propulsion symmetry: This is either a ratio between the peak propulsion of both legs, or a "symmetry index" where a value of one suggests "healthy-like" locomotion. An exemplary optimization approach may seek to optimize an actuation parameter(s) to drive this ratio or symmetry index between legs towards one (i.e., maximize similarity between peak propulsion of the legs).

Timing of the transition from braking to propulsion: During the gait cycle, each foot switches from braking (forces pointing opposite the direction of walking) and propulsion (forces pointing in the direction of walking). In healthy locomotion, the timing of this transition is the same in either foot's gait cycle. An exemplary optimization approach may seek to optimize an actuation parameter(s) to minimize variance in the transition timing of each foot relative to the other during locomotion. Additionally or alternatively, another exemplary optimization approach may identify an optimal transition timing for maximizing or minimizing a related objective function (e.g., locomotive efficiency, locomotive output) and seek to minimize variance from the optimal timing.

Similarity of ground reaction forces to normative data: An exemplary optimization approach may evaluate how similar a wearer's ground reaction forces are to age-, sex, weight-, and/or speed-matched data from a normative set of healthy users, and optimize an actuation parameter(s) to drive the wearer's kinematics to match (i.e., maximize similarity to or minimize variance from) a desired normative profile. Possible metrics include correlation with healthy data or percent difference in key points or metrics (such as peak propulsion and propulsive impulse, as defined above).

Stability during locomotion: An exemplary optimization approach may seek to optimize an actuation parameter(s) to maximize joint stability or overall body stability during locomotion. Estimating the overall stability of a human during locomotion can be very challenging. However, some measurements may sufficiently correlate with stability to function as proxies therefor, such as low-dimensional quantities, extrapolated center of mass (CP) and the maximum Lyapunov exponent (MLE). These metrics can be used as part of an optimization strategy to improve stability during walking for patients or healthy individuals performing complex or strenuous tasks.

Joint range of motion: An exemplary optimization approach may seek to optimize an actuation parameter(s) to maximize the range of motion for a particular joint. The range of motion is typically defined as the difference between the maximum and minimum angle of a given joint in a given plane of motion, but the maximum and minimum angles may also be of interest for optimization. For example, the ankle's range of motion in the sagittal plane is the peak plantarflexion angle minus the peak dorsiflexion angle, but an algorithm may seek to optimize just the maximum dorsiflexion angle.

Foot placement, step length and step width: This measures the location of one foot relative to another. Users with impaired balance or stability may walk with wider step width and shorter step length than healthy people, so an exemplary optimization approach may seek to optimize an actuation parameter(s) to minimize step width and/or maximize step length. Additionally or alternatively, another exemplary optimization approach may seek to optimize an actuation parameter(s) to maximizing symmetry (or minimize variance) between step width for both legs. Foot placement can be measured directly via motion capture or ground reaction forces on a force place (by looking at the position of the foot's center of pressure), or estimated using IMUs.

Time to perform a repetitive task: An exemplary optimization approach may seek to optimize an actuation parameter(s) to minimize the time required to perform a repetitive task such as lifting loads, moving packages from one place to another in a factory environment, etc.

Trailing limb angle during terminal stance: This is the angle between the global vertical axis and the line defined by a point on the pelvis (often the greater trochanter or the hip joint center) and a point on the stance foot (often the fifth metatarsal head or the center of pressure). Compared to healthy walking, people with impaired gait may have a lower trailing limb angle during terminal stance. As the trailing limb angle increases, more of the ground reaction force goes into forward propulsion; as the trailing limb angle decreases, more of the ground reaction force goes into vertical components. An exemplary optimization approach may seek to optimize an actuation parameter(s) to maximize trailing limb angle, for example, in situations where it is desired to increase forward propulsion. Additionally or alternatively, another exemplary optimization approach may seek to optimize an actuation parameter(s) to minimize trailing limb angle, for example, in situations where it is desired to increase stability.

Vertical center of mass travel: Movement of the wearer's center of mass in the vertical direction may be directly measured either by motion capture or force plates. However, it is also possible to approximate an acceleration of the wearer's center of mass using trunk- or pelvis-mounted IMUs, and integrating twice with respect to time yields an evaluation of the position of the wearer's center of mass. Total travel of the center of mass in the vertical direction may be positively related to the metabolic cost of walking, so this metric could be used as a proxy for evaluating related objective functions (e.g., locomotive efficiency). An exemplary optimization approach may seek to optimize an actuation parameter(s) to minimize vertical center of mass travel, for example, in situations where it is desired to maximize locomotive efficiency.

Center of mass power: Center of mass power is the vector product of center of mass velocity and total ground reaction force. It can be measured directly using force plates and/or motion capture, or estimated by wearable sensors by approximating the acceleration of the wearer's center of mass as outlined above and then estimating total ground reaction force using that acceleration and overall body mass. Center of mass power may be positively related to the metabolic cost of walking, so this metric could be used as a proxy for evaluating related objective functions (e.g., locomotive efficiency). An exemplary optimization approach may seek to optimize an actuation parameter(s) to minimize center of mass power, for example, in situations where it is desired to maximize locomotive efficiency.

Similarity of center of pressure location of the foot to normative data: In healthy walking, the center of pressure follows a well-known trajectory through the foot. An exemplary optimization approach may seek to optimize an actuation parameter(s) to maximize similarities (or minimize variance) between a trajectory of the wearer's center of pressure and that of a desired normative trajectory. Center of pressure may be measured using force plates, or estimated by wearable sensors, such as an instrumented shoe insole.

Total pressure of the foot during push-off: Like center of pressure, the total pressure exerted by the foot may be measured using force plates or estimated by wearable sensors, such as an instrumented shoe insole. The total pressure tends to correlate with the total ground reaction force (GRF), which in turn correlates with forward propulsive force when evaluated during a push-off phase of locomotion. Accordingly, total pressure could be used as a proxy for evaluating forward propulsion. An exemplary optimization approach may seek to optimize an actuation parameter(s) to maximize total pressure of the foot during a push-off phase of locomotion, for example, in situations where it is desired to increase forward propulsion.

Blood oxygenation in muscles: Related to pulse oximetry commonly used in clinical practice, near-infrared spectroscopy (NIRS) is a method of estimating how much blood in a muscle is oxygenated. This measure is directly related to the metabolic demand of that muscle, so this metric could be used as a proxy for evaluating related objective functions (e.g., energy expenditure, locomotive efficiency). An exemplary optimization approach may seek to optimize an actuation parameter(s) to maximize blood oxygenation, for example, in situations where it is desired to minimize energy expenditure or maximize locomotive efficiency.

Muscle contraction/strain and tendon strain: Wearable exosuits and exoskeletons can affect how muscles contract and muscle/tendons strain under load. An exemplary optimization approach may seek to optimize an actuation parameter(s) to maximize or minimize these physiological parameters, or to limit them to certain values or ranges. In addition, contraction/strain is often related to the energetic metabolic demand of the corresponding muscle, so this metric may be a suitable proxy for evaluating related objective functions (e.g., energy expenditure, locomotive efficiency). An exemplary optimization approach may seek to optimize an actuation parameter(s) to minimize muscle contraction/strain and tendon strain, for example, in situations where it is desired to minimize energy expenditure or maximize locomotive efficiency. Ultrasound or acoustic imaging may, in some embodiments, be used as a way to non-invasively measure tissue movement.

Exemplary optimization approaches may utilize information associated with associated with providing physical assistance to the wearer in evaluating these objective functions. For example, in some embodiments, the controller may evaluate these objective functions using direct measurements of the objective functions themselves, while in other embodiments, the controller may evaluate these objective functions by calculating or approximating the objective function using various measurements of related metrics from one or more wearable sensors or other measurement equipment. In various embodiments, representative information associated with these objective functions may include any such information described above, as well as one or a combination of an angle, velocity, or acceleration of one or more joints; a force, torque, or power applied by the exosuit or the exoskeleton; a type of physical activity in which the wearer is engaged; a posture of the wearer; an energy expenditure of the wearer; and an interaction of the wearer's body with a surrounding physical environment.

Representative sensors for measuring said information for evaluating the objective function may include, in various embodiments, inertial measurement units (IMUs), accelerometers, gyroscopes, encoders, resolvers, strain sensors, heart rate monitors, pulmonary gas exchange systems, electromyography, pressure sensors (e.g., in a footwear insole for measuring GRFs), and an instrumented treadmill, amongst other suitable sensors.

Objective Functions and Proxies Associated with Interactions Between the Exosuit or the Exoskeleton and the Wearer As referenced above, many objective functions associated with exosuit or exoskeleton performance relate to interactions between the exosuit or exoskeleton and the wearer. As further described below, such interactions may relate to things like wearer comfort and the effectiveness of the wearable system in transmitting loads to the wearer, amongst others. Representative examples of several such objective functions are provided below, along with biomechanical context for how each may be maximized or minimized to benefit the wearer.

Displacement of the exosuit or exoskeleton: An exemplary optimization approach may seek to optimize an actuation parameter(s) to minimize displacement (or maximize alignment) of the exosuit or exoskeleton (including individual components thereof, such as anchor members) on the body of the wearer. Displacement of the suit components with respect to the body may be measured by using wearable sensors such as IMUs. For instance by using two IMUs, one of them IMU integrated in a suit component and another sensor attached to the body and integrating measurements such as the relative speed or acceleration. For cable-driven systems in which the cable anchors on both sides of the joint, relative displacement may be estimated by combining the of exposed cable (e.g. by an encoder) and a measurement of the joint position by using wearable sensors such as IMUs; the amount of exposed cable is a function of the cable required to track the joint movement, the stiffness of the suit and the compliance of the interface. If the displacement is measured at points of the gait cycle in which there is no active force applied to the person (only pretension or tracking without applying force), the stiffness of the suit will have no effect on the cable travel and therefore the displacement may be calculated by combining the cable movement due to the joint angle (translated to displacement by multiplying by the distance from the joint center of rotation and the cable, which could be a constant or an input to the device) and the total exposed cable measurement. Finally, For cable-driven systems in which the cable anchors on both sides of the joint, relative displacement may be estimated by using the motor encoder and comparing the exposed cable at repeatable points in the gait cycle over multiple steps such as mid-stance giving an estimation of how much the suit components has displaced with respect to the body over different steps.

Comfort: An exemplary optimization approach may seek to optimize an actuation parameter(s) to maximize comfort of the wearer (or to minimize a particular discomfort experienced by the wearer). In various embodiments, potential discomfort can be automatically detected by the controller by, for example, monitoring forces in the exosuit or exoskeleton or by monitoring pressures between the exosuit or exoskeleton and the wearer, and comparing these forces and/or pressures to levels of each that are known to cause discomfort in the individual wearer, or across a representative sampling of wearers. In cases where the exosuit or exoskeleton is, for example, generating forces in excess of comfortable levels (or with improper timing that causes discomfort), a representative optimization approach may seek to optimize an actuation parameter to reduce those forces to within an acceptable range (while still, perhaps, maximizing the level of forces generated within the acceptable range). Similarly, in cases where an interaction between the exosuit or the exoskeleton and the wearer generates an excess level of shear forces (which can cause chafing and other discomfort on the skin), a representative optimization approach may seek to optimize an actuation parameter to reduce those shear forces to within an acceptable range (while still, perhaps, maximizing the level of forces generated within the acceptable range). In practice, this may involve reducing the level of force generated by the exosuit or exoskeleton, or perhaps increasing a compressive force within the exosuit or exoskeleton to better anchor the troubling anchor member to the underlying body part. Similar approaches may be taken to optimizing an actuation parameter to reduce pressure points generated by an interaction of the exosuit or exoskeleton and the wearer, as further described below. Additionally or alternatively, comfort may be self-reported through a GUI, hand-held device, voice, pressure measurements, or the like.

Pressure at the interface: An exemplary optimization approach may seek to optimize an actuation parameter(s) to minimize pressures applied to some areas of the wearer's body that may be sensitive to discomfort caused by the textile or rigid interface with the exosuit or exoskeleton. This may maximize comfort (or minimize discomfort) while, for example, still maximizing assistance within those comfort levels. This pressure may be affected by actuation parameters such as the timing, rate, the jerkiness of the profile or magnitude of assistance.

Load transfer along the wearer's body: In some cases, it may be advantageous to utilize the exosuit or exoskeleton to help transfer loads away from one area of the wearer's body to another, for example, to help mitigate injuries. An exemplary optimization approach may seek to optimize an actuation parameter(s) to maximize load transfer from the area of the body at issue. This may be particularly useful in situations in which the wearer is lifting a heavy load and is thus susceptible to back injury. In such an embodiment, the controller may seek to optimize an actuation parameter(s) to minimize loads on the spine of the wearer. This may, in an embodiment, be accomplished by optimizing the actuation parameter(s) to maximize force transfer to other areas of the body such as the hips, torso or legs.

Actuator force: An exemplary optimization approach monitor interactions between the exosuit or exoskeleton, and upon detecting a large generated by the interaction, optimize an actuation parameter(s) to minimize a force generated by the actuator, so as not to deliver additional force that may cause discomfort or injury. In an embodiment, the controller may, in optimizing the actuation parameter(s), also seek to keep other biomechanical constraints constant.

Exemplary optimization approaches may utilize information associated with associated with an interaction between the exosuit or exoskeleton and the wearer in evaluating these objective functions. For example, in some embodiments, the controller may evaluate these objective functions using direct measurements of the objective functions themselves, while in other embodiments, the controller may evaluate these objective functions by calculating or approximating the objective function using various measurements of related metrics from one or more wearable sensors or other measurement equipment. In various embodiments, representative information associated with these objective functions may include any such information described above, as well as one or a combination of a shearing or compression force generated between the wearer and the exosuit or the exoskeleton, and a position of the exosuit or the exoskeleton on the wearer.

Representative sensors for measuring said information for evaluating the objective function may include, in various embodiments, load cells, force sensors, torque sensors, and pressure sensors, amongst other suitable sensors.

Objective Functions and Proxies Associated with Operation of the Exosuit or Exoskeleton As referenced above, many objective functions associated with exosuit or exoskeleton performance relate to the operation of the exosuit or exoskeleton itself. As further described below, such interactions may relate to things like electrical power consumption, overheating, and consistency in actuator/actuation system functionality, amongst others. Representative examples of several such objective functions are provided below.

Electrical Power Consumption: An exemplary optimization approach may seek to optimize an actuation parameter(s) to minimize electrical power consumption. Electrical power consumption may be measured by combining electrical current draw measurement (via an integrated current sensor) and voltage (via an integrated voltage sensor), by multiplying those measurements electrical power can be calculated, the average power consumption over one step will give an estimation of how much electrical power is consumed per step. Another embodiment may use remaining battery voltage to estimate how much battery is left or how much battery has been consumed so far in the system.

Consistency of Assistive Forces: An exemplary optimization approach may seek to optimize an actuation parameter(s) to maximize consistency (or minimize variance) between assistive forces generated in the exosuit or exoskeleton. If an exosuit or exoskeleton aims to provide forces that are consistent in terms of peak force over multiple steps, a measurement of consistency may be the variance of the peak force or other features in the force profile that have to remain consistent over multiple steps. Forces may be measured by using wearable sensors such as force sensors or loadcells. Another embodiment may define consistency of assistive forces as the root mean square deviation of the measured force and the desired force profile, maximizing consistency of this difference over multiple steps may be used as an objective for these systems.

Maximum and average actuator position, velocity, acceleration, or jerk: Subject to kinematic or kinetic constraints measured as outlined above (e.g. peak dorsiflexion angle does not fall below a pre-set threshold, or propulsive impulse remains constant), it may be of interest to minimize these metrics related to how "hard" the suit is pulling. For example, an exemplary optimization approach could find the optimal parameter or set of parameters that minimize maximum cable acceleration without impacting the propulsive impulse.

Temperature: An exemplary optimization approach may seek to optimize an actuation parameter(s) to minimize a temperature of one or more components of the exosuit or exoskeleton. Like other objective functions described herein, minimizing the temperature may, in an embodiment, mean ensuring the temperature does not exceed an upper threshold of a predetermined range.

Exemplary optimization approaches may utilize information associated with associated with operation of the exosuit or exoskeleton in evaluating these objective functions. For example, in some embodiments, the controller may evaluate these objective functions using direct measurements of the objective functions themselves, while in other embodiments, the controller may evaluate these objective functions by calculating or approximating the objective function using various measurements of related metrics from one or more wearable sensors or other measurement equipment. In various embodiments, representative information associated with these objective functions may include any such information described above, as well as one or a combination of a current or a voltage used during actuation of the exosuit or the exoskeleton; a temperature of one or more components of the exosuit or the exoskeleton; a force generated by the at least one actuator; a force delivered to the exosuit or the exoskeleton; and a force, torque, or power delivered to the wearer of the exosuit or the exoskeleton.

Representative sensors for measuring said information for evaluating the objective function may include, in various embodiments, current sensors, voltage sensors, thermistors, encoders and resolvers (e.g., for measuring actuator position, speed, and acceleration), amongst other suitable sensors.

Weighted Objective Functions and Proxies

As alluded to in several of the above examples, an objective function (or proxy function) needs not to represent a single variable associated with the motion or biomechanics of a wearer, but can combine multiple optimization targets. Multiple single-variable objective functions can be combined into a single one through different methods, such as weighted averaging, which allows to calibrate the relative importance of each component of the objective function. Eq.1 below shows an example implementation of weighted sum of multiple objective functions:

$$F = \alpha_1 x_1 + \alpha_2 x_2 + \ldots + \alpha_n x_n \text{ where } \Sigma_{i=1}^{i=n} \alpha_i = 1 \quad \text{(Eq. 1.)}$$

This approach can be followed to combine the optimization of a variable associated with providing physical assistance to the wearer (e.g. metabolic cost of walking) with a variable associated with the efficiency of the system (e.g. battery life). Some example weightings of two or more objectives within one objective function include:

- Optimizing a variable related to motion (metabolic cost of walking) and a variable related to the device performance (e.g. battery life of the device).
- Optimizing multiple variables such as peak muscular activity, forward propulsion, battery life of the device and comfort through a weighted sum of them.
- Optimizing multiple variables related to motion (e.g. forward propulsion) and a variable related to the interaction of the suit and the wearer (e.g. user comfort).
- Optimizing metabolic cost of walking and peak muscular activity of a targeted muscle.
- Optimizing multiple variables related to motion (e.g. forward propulsion and stability).
- Optimizing forward propulsion and ground clearance.
- Optimizing time to complete a task and peak EMG activity of a targeted muscle.

Figure 6:
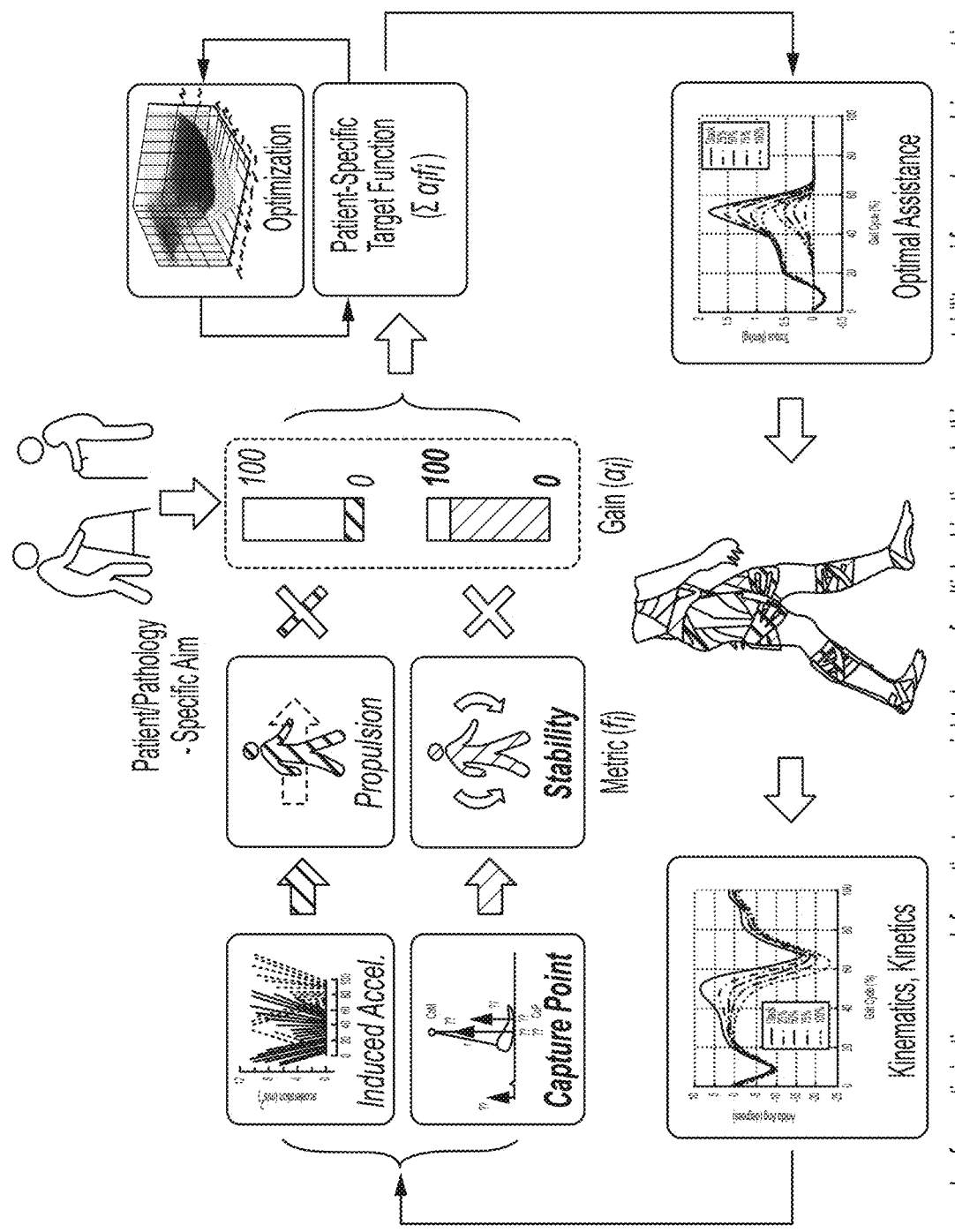
FIG. 6 illustrates an optimization approach for patients using a weighted sum of multiple objectives, in accordance with an embodiment of the present disclosure.

The importance of each metric may be different depending on the application. For instance for medical applications depending on each pathology, individual patient or the goals of a therapeutic session, the clinician or operator of the system may be able to modify these gains during a test. An example of this concept using weighted sum of objectives for impaired individuals is shown in FIG. 6. For healthy population, individual users may be able to change these settings manually.

Optimization Approaches, Generally

Systems and methods of the present disclosure provide for optimizing one or a combination of these actuation parameters to maximize or minimize a selected objective function. Approaches seeking to optimize a single actuation parameter (e.g., finding the optimal actuation onset timing) may be referred to herein as single-parameter optimization, while approaches seeking to optimize a combination of actuation parameters (e.g., finding the optimal combination of actuation onset timing and actuation peak timing) may be referred to herein as multi-parameter optimization. As will be described further below, a number of factors may influence whether a single-parameter or multi-parameter optimization approach is used including, without limitation, the biomechanics of the wearer, the population wearing the exosuit or exoskeleton, the relative effect of each actuation parameter on the objective function, required optimization time, measurement noise, wearer adaption and available computing power, as further described below.

In various embodiments, known (or modified) methods for optimizing variables (e.g., gradient descent, Bayesian, brute force, and simulated annealing) may be used or otherwise modified to optimize the targeted actuation parameter(s) to maximize or minimize a selected objective function. Of course, the best mathematical method for optimizing the actuation parameter(s) may vary depending on a number of factors including, without limitation, the nature of the objective function landscape relative to the actuation parameter(s) to be optimized, the biomechanics of the wearer, the population wearing the exosuit or exoskeleton, the relative effect of each actuation parameter on the objective function, required optimization time, measurement noise, wearer adaption and available computing power, as further described below.

In one embodiment, a simplified gradient descent approach may be employed to optimize the actuation parameter(s) to maximize or minimize the objective function. A gradient-descent approach typically leads to convergence, and is often simple and low in computational burden, making it well suited for running on inexpensive processors or when running other computationally-burdensome processes on shared hardware. In one such embodiment, the controller may be configured to determine whether the objective function increased or decreased from one or an average of preceding evaluations of the objective function, and in response, adjust the actuation parameter in a same or different direction depending on whether it is sought to maximize or to minimize the objective function. Likewise, when multiple actuation profiles are tested before adjustments are made, the controller may be configured to compare evaluations of the objective function for each actuation profile to determine which produces the highest or lowest evaluation of the objective function, and in response, generate another set of actuation profiles in which the values of the actuation parameters being optimized have been adjusted according to a derivative of the objective function evaluations associated with the former set of actuation profiles. A gradient-descent approach may optimize the actuation parameter(s) to a local maximum/minimum or a global maximum/minimum depending on the objective function landscape (i.e., relationship between the objective function and the parameter(s) being optimized). For example, in situations when the objective function landscape is substantially convex in shape and the differentiation of the landscape is differentiable and bounded, convergence to the global solution can be achieved. Since the landscape of the objective function is convex, all local minima are also global minima, so in this case gradient descent can converge to the global solution. A gradient-descent approach may optimize the actuation parameter(s) to a global maximum/minimum of the objective function. In other situations, such as those in which the objective function landscape includes multiple peaks or valleys, the gradient-descent approach may optimize the actuation parameter(s) to either a local maximum/minimum or to a global maximum/minimum depending on where the optimization starts, amongst other relevant factors. In such situations in which the landscape is non-convex, gradient descent is more likely to find a local optimum since gradient descent performs a local search comparing points that are relatively close to each other, other approaches that perform a global search of the landscape such as the Bayesian approach described below are more likely to find a global optimum in those cases. However, the low-computation requirements of gradient descent and guaranteed convergence may make this method attractive even with its limitations in some cases. For instance, finding a local optimum that improves upon an initial setting of the device for a specific person or activity may be attractive in some applications. Gradient descent method is particularly applicable in situations in which the noise to signal ratio is very low and the objective is measured in a repeatable way, if the noise of the measurement is high, even with a convex landscape, gradient descent may converge to points in the landscape that are non-optimal due to noise or unrepeatability in the measurements.

In other embodiments, a Bayesian approach may be used to optimize the actuation parameter(s) for maximizing or minimizing the objective function. A Bayesian approach is typically sample-efficient, allowing it to explore the objective function landscape relatively quickly. This feature can make a Bayesian approach well-suited for finding and optimizing the actuation parameter(s) to a global maximum/minimum in more complex objective function landscapes, and tends to make a Bayesian approach relatively more tolerant of noise in evaluations of the objective function than some other approaches. In one such embodiment, a mathematical correlation between the actuation parameter(s) and the objective function can be defined by actuating the exosuit or exoskeleton according to several actuation profiles having different baseline values of the actuation parameter(s) being optimized and mapping corresponding evaluations of the objective function for each. From this, the controller may determine a candidate value(s) of the actuation parameter(s) for maximizing or minimizing the objective function. The candidate value(s) may be tested and evaluated, and the mathematical correlation updated, until the controller converges on an optimized value of the actuation parameter(s), or until some other suitable termination criteria is met. In an embodiment, the process of defining the mathematical correlation and identifying candidate values of the actuation parameter may involve generating a posterior distribution (e.g., via a Gaussian process, in an embodiment) and utilizing a probabilistic model (e.g., a Bayesian approach) to identify a candidate value(s) of the actuation parameter based on the posterior distribution Like a gradient-descent approach, a Bayesian approach may optimize the actuation parameter(s) to a local maximum/minimum or a global maximum/minimum depending on the objective function landscape and where the optimization starts, amongst other relevant factors. However, Bayesian optimization is more likely to find a global optimum since it performs a global search of the landscape based on the posterior distribution as opposed to only looking locally and comparing points that are relative close to each other like the gradient descent does. A Bayesian optimization approach is therefore particularly useful in situations in which the landscape of the objective function is complex, when there are multiple parameters to be optimized and therefore search efficiency is important or when the measurements of the objective function are noisy (e.g. metabolic measurements).

Of course, it should be recognized that these are merely illustrative examples, and that any suitable mathematical approach may be used to optimize any number of actuation parameters for maximizing or minimizing an objective function affected by the selected parameter(s).

In some embodiments, the optimization may run until the objective function is truly maximized or minimized; however, in other embodiments, the optimization process may be further subject to additional or alternative termination criteria. In various embodiments, the optimization algorithm may be configured to terminate when one of the following predefined termination criterion occurs: (i) a difference between evaluations of the objective function for successive adjustments to the at least one parameter of the at least one actuation profile falls below a predetermined threshold, (ii) a difference between successive adjustments to the at least one parameter of the at least one actuation profile falls below a predetermined threshold, (iii) a predefined amount of time since the start of optimization has been exceeded, (iv) the wearer exceeds a predefined number of steps since the start of optimization, and (v) a termination command issued by the wearer.

Representative Example #1: Single-Parameter, Gradient-Descent Optimization

The above-referenced provisional patent applications presented representative one-parameter and multi-parameter optimization approaches for the control of soft exosuits, and provided several representative embodiments for the assistance of different joints, and the optimizations of several representative objective functions. In particular, as further described in this representative example, these references presented a representative algorithm for determining the best actuation onset timing for an exosuit providing assistance to the ankle, driven by the optimization of the average positive power delivered at the wearer's ankle joint using a simplified gradient descent method.

Objective Function: Average Positive Power Delivered at Ankle

Metabolic consumption has been traditionally measured by using a gas exchange measurement system, however this measurement requires the user to wear a mask during walking. The energetics of walking is influenced by the work done by muscle at joints. During walking, if the exosuit delivers positive power to the ankle during late stance, the wearer' forward propulsion will be assisted which will contribute to reduce the metabolic cost of walking. This principle is applicable to other joints and other types of assistance as well.

Figure 7:
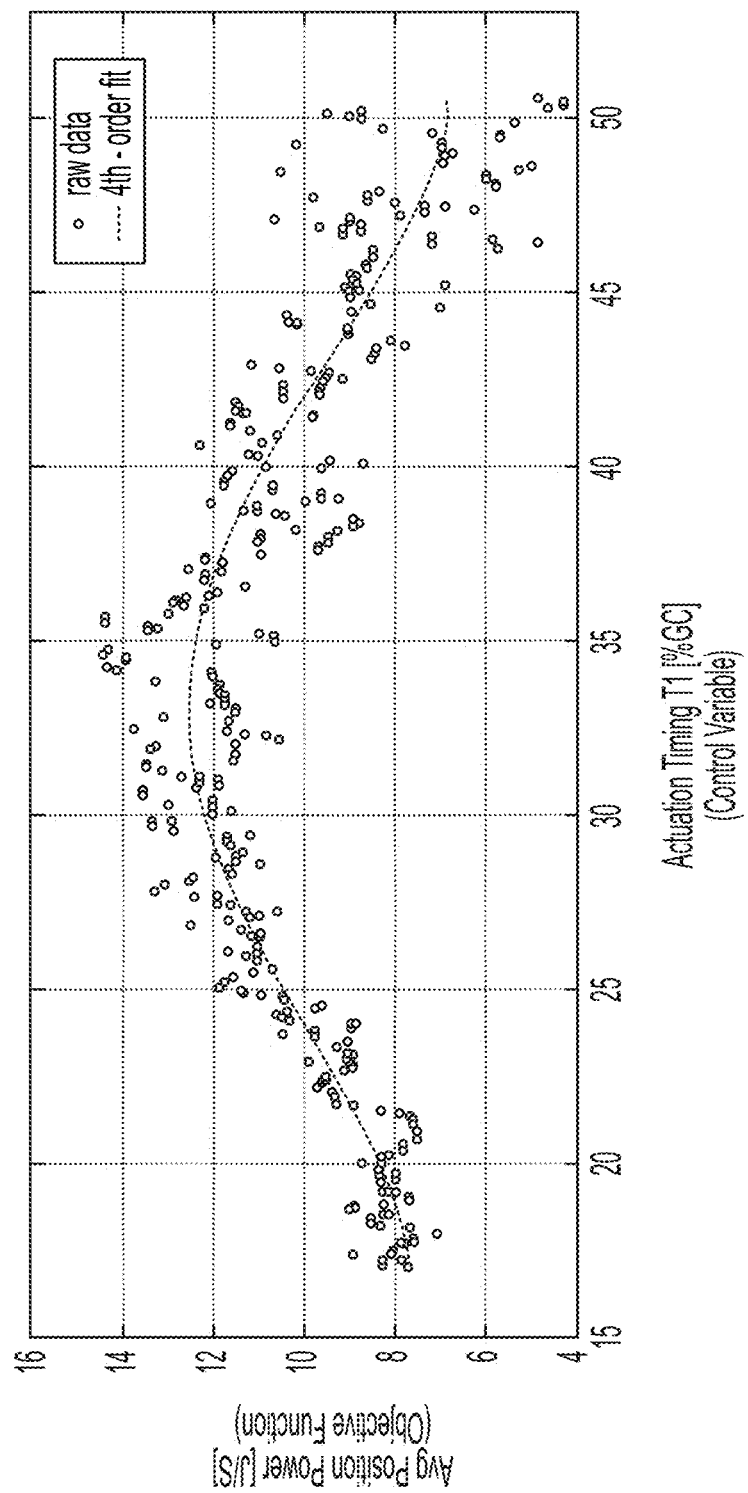
FIG. 7 shows a correlation between positive power delivered by the exosuit measured using by wearable sensors and the metabolic benefit that users had when measured by a gas exchange system, in accordance with an embodiment of the present disclosure.

Multiple biomechanics studies have demonstrated that the metabolic benefit of assistive devices at the ankle is correlated with the average positive power delivered by the system to the biological joint FIG. 7. Moreover, FIG. 7 shows the correlation between positive power delivered by the exosuit measured using by wearable sensors and the metabolic benefit that users had when measured by a gas exchange system which suggests that average positive power delivered by the wearable robot can be used as a proxy to optimize metabolic effort. This is further validated by the results shown below which improved metabolic performance of multiple users by targeting average positive power delivered to the joint.

Figures 8A, 8B:
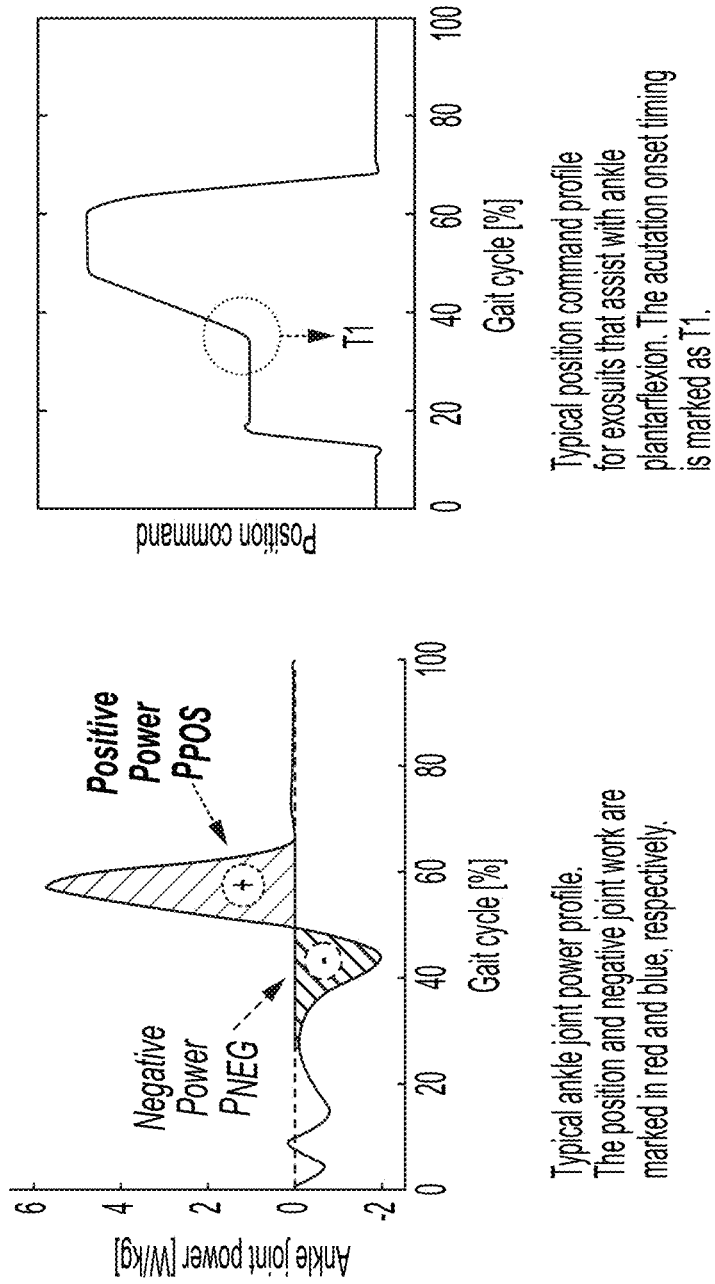
FIG. 8A illustrates a typical ankle joint power profile during a stance phase of the gait cycle
FIG. 8B illustrates a typical actuation profile for an exosuit assisting with ankle plantarflexion, in accordance with an embodiment of the present disclosure.

A) The positive joint work delivered at ankle (the positive area under the ankle power curve—marked in red in FIG. 8A divided by stride time.

B) This function is a proxy objective measure, available in real-time, in lieu of a direct measure of metabolic benefit.

C) There is a positive correlation between the average positive power delivered at ankle and the metabolic reduction from it. A change in the positive power delivered at the ankle correlates with a change in the metabolic cost, allowing it to be used as a proxy.

Control Variable: Actuation Onset Timing

Figure 9A:
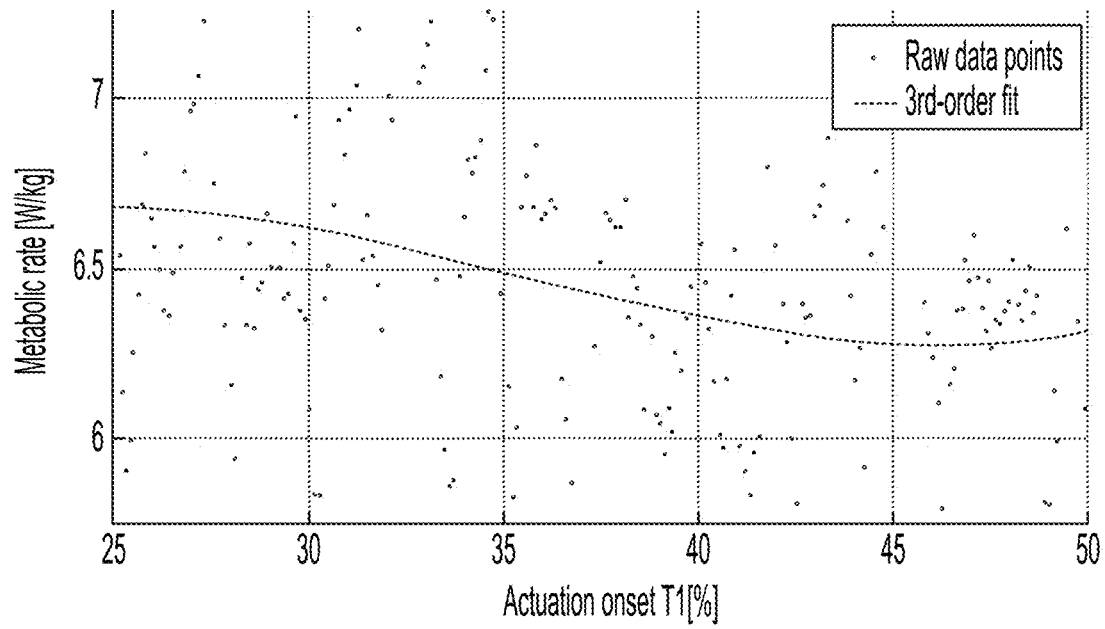
FIG. 9A and FIG. 9B illustrate test results showing the relationships of metabolic rate and average positive power for sweeps of actuation onset timing, in accordance with an embodiment of the present disclosure.
Figure 9B:
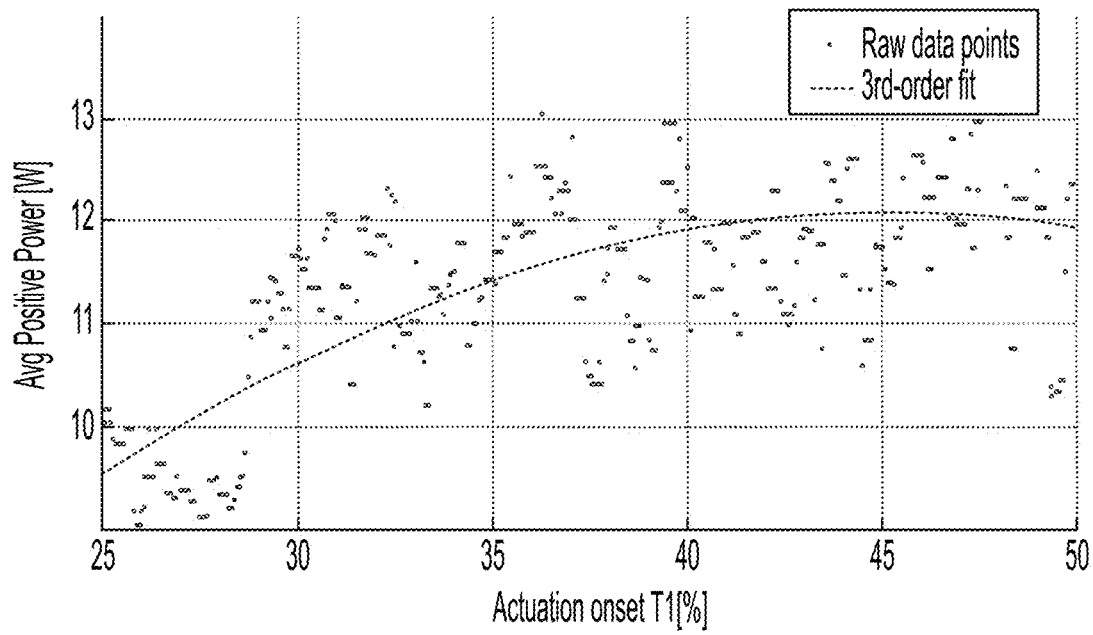
Figure 10A:
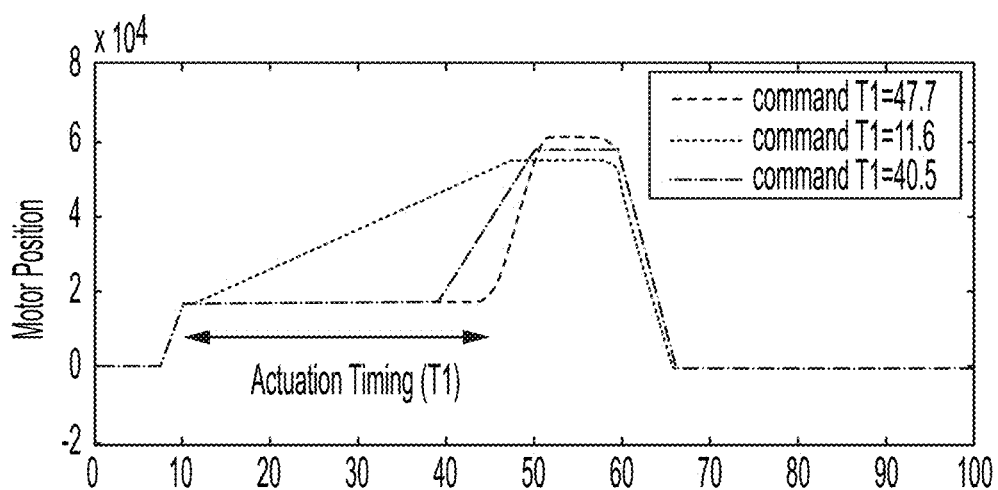
FIG. 10A, FIG. 10B, and FIG. 10C show actuator position, resulting force, and resulting power delivered to the user for different actuation onset timings, in accordance with an embodiment of the present disclosure.
Figure 10B:
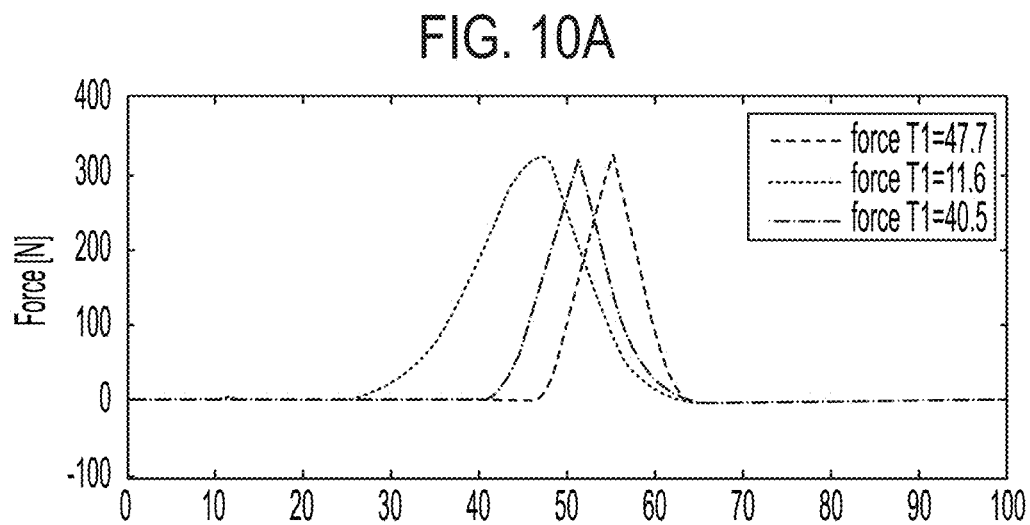
Figure 10C:
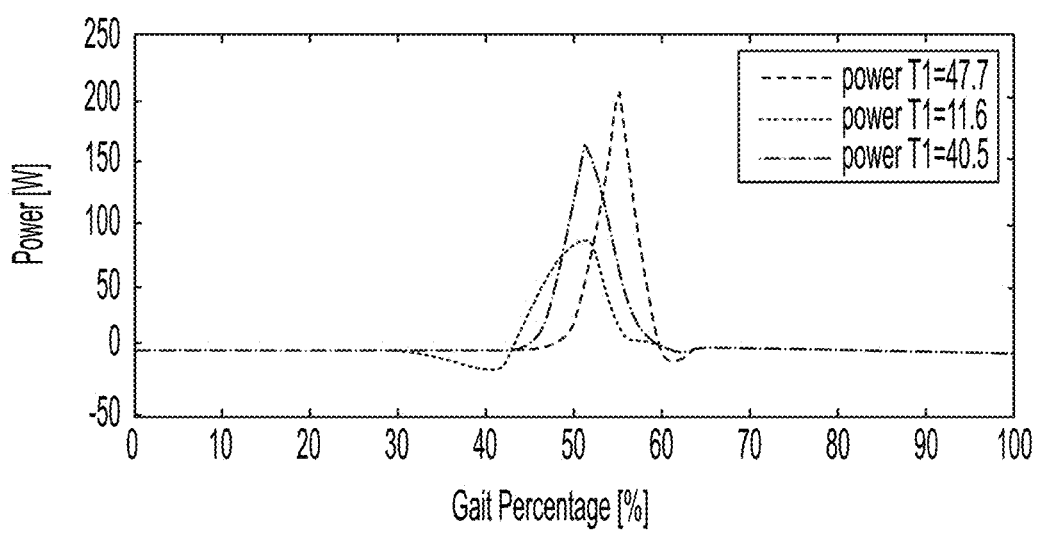
Figures 11A, 11B, 11C:
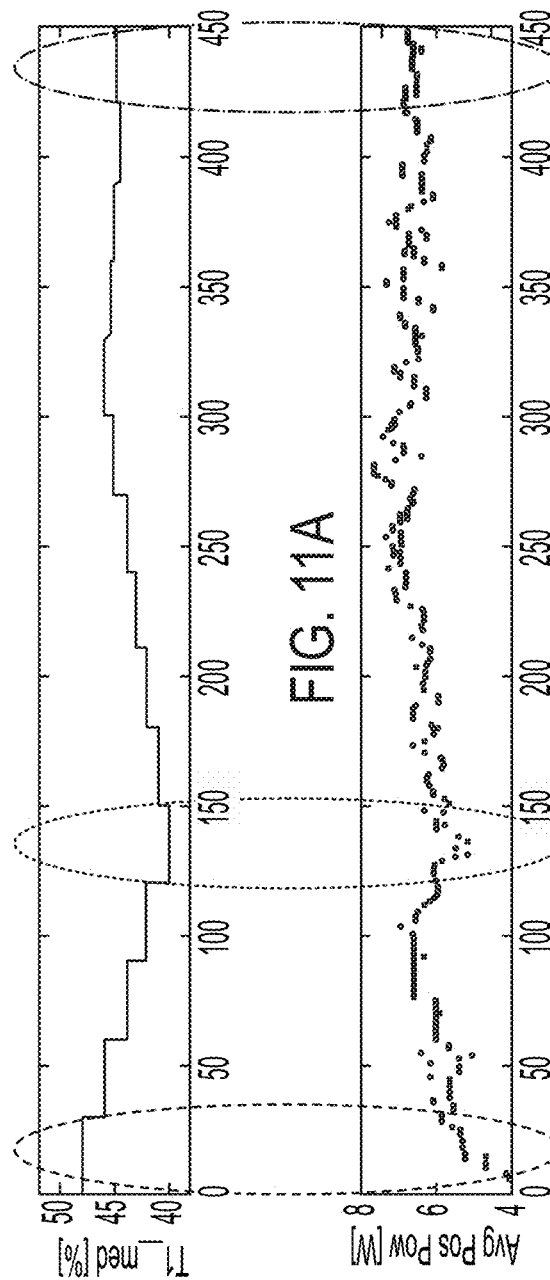
FIG. 11A, FIG. 11B, FIG. 11C, FIG. 11D, and FIG. 11E show average positive power, actuator position, resulting force, and resulting power delivered to the user during an example optimization of onset timing for a healthy male subject, in accordance with an embodiment of the present disclosure.
Figure 11D:
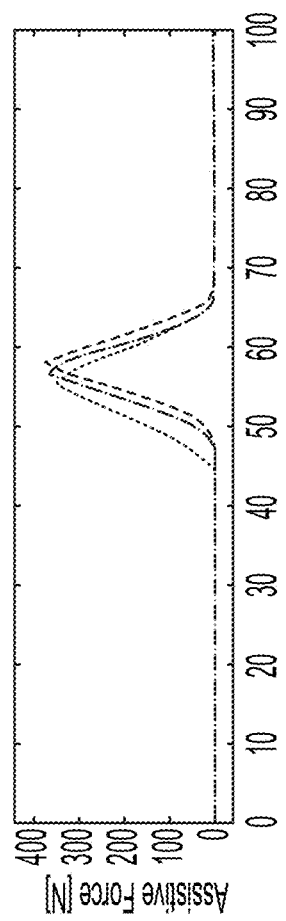
Figure 11E:
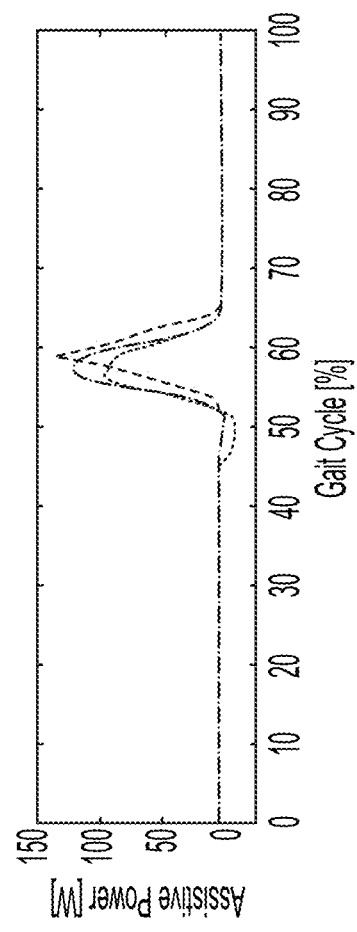

Actuation onset was selected as a parameter for the optimization process since it's a key variable when evaluating metabolic reduction during ankle assistance and its timing influences the amount of positive power delivered to the ankle joint. Contribution to positive power of the ankle joint starts during the push-off phase when the ankle angular speed becomes positive; starting to apply force to the joint earlier than that time may maximize the average positive power because there will be additional force at the cable by the time the joint starts to perform positive power. However, starting too early may result in a reduced speed of the ankle joint which will have negative effects in the amount of positive power that the system delivers during the push-off phase. Therefore, the time in which the actuation starts is critical to the performance of the exosuit when maximizing metabolic benefits of the exosuit and is hard to model because the result of the optimization will depend on the user's gait and how they react to different assistive profiles. During this study, tests were performed by providing assistance to the user while sweeping the actuation onset, these results demonstrate that the onset of actuation has a high impact on the average positive power that is delivered to the ankle joint as shown in FIG. 9A and FIG. 9B. These figures shows (1) that the objective function landscape is convex and (2) that the onset of actuation has a big impact on the average positive powered and on the metabolic reduction of the different assistive profiles. FIG. 10A, FIG. 10B, and FIG. 10C show the motor/cable position, resulting force and power delivered to the user for different values of T1, as it can be seen in this figure, T1 has a big impact in the amount of power delivered to the human joint.

The variable to be optimized in this embodiment is the timing when the controller starts active cable retraction—marked in FIG. 8B.

Optimization Algorithm: Simplified Gradient Descent Method

In order to find the best actuation onset timing for single-joint assistance targeting the ankle joint, and aimed at reducing the metabolic cost of walking, the simple gradient descent method proves to be an effective option. The gradient descent method is a first-order iterative optimization algorithm, which finds a local optimum by iteratively estimating a function gradient at the current point and perturbing the independent variable in steps proportional to the gradient magnitude. In this application, the gradient can be estimated by applying several adjacent control parameter settings to the wearer while measuring/estimating the objective function and its local landscape.

While this algorithm does not guarantee the global optimality, it does guarantee a gradual change of the perturbed parameter.

As shown in FIG. 7, from internal parameter sweep experiments conducted in our lab, it has been shown that the average positive power delivered usually shows a convex shape with respect to T1 (actuation onset). Depending on the scope of the adjustments made to onset timing during optimization, the gradient descent process may converge on a local maximum (e.g., a localized peak in the overall convex landscape) or to a global maximum (e.g., the peak in the overall convex landscape).

Figure 8C:
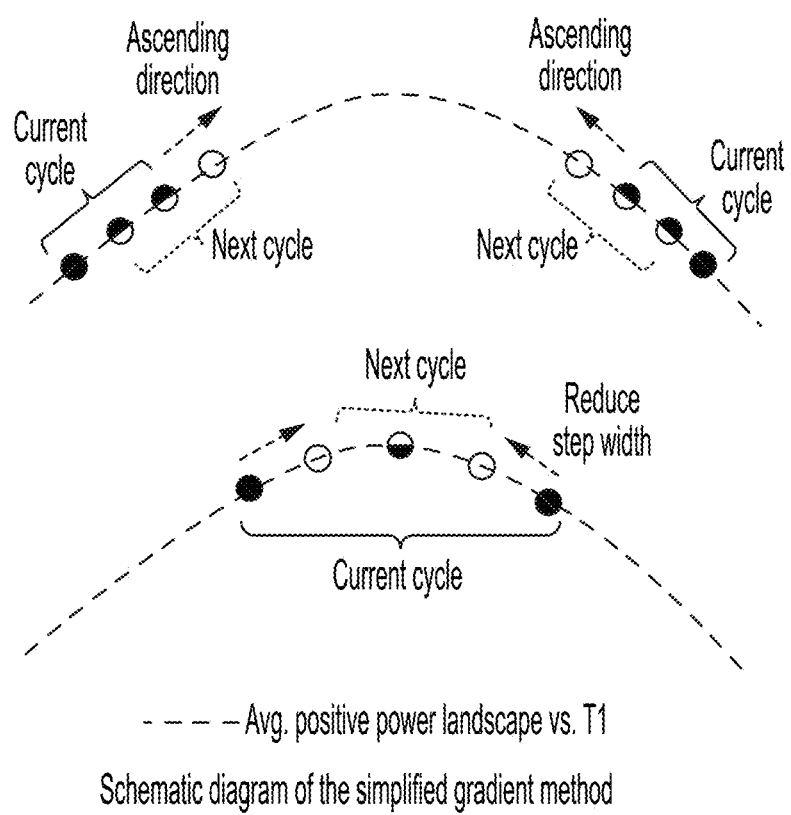
FIG. 8C schematically illustrates a representative gradient descent approach for optimizing actuation onset timing for maximizing average positive power delivered to the ankle joint.

Since the landscape of this optimization is convex, gradient descent may be a good strategy to maximize the average positive power delivered to the joint. A simplified gradient descent algorithm is proposed and used for this embodiment. In brief, in the present simplified gradient descent algorithm, the different steps of this optimization are:

1.) apply three different motor position profiles with three different T1 values (T1_high, T1_med, and T1_low) in each optimization cycle, and 2.) measure and calculate the average positive power (PP_high, PP_med, and PP_low) for each of the three T1 values, and then, 3.) by comparing the three average positive power values, the algorithm (a) moves on to the next set of T1 values along the ascending direction of the objective function, or (b) reduces the step width. Note that the three T1 values are apart by the step width w, so T1_high=T1_med+w and T1_low=T1_med−w. This process is conceptually illustrated in FIG. 8C.

FIG. 11A, FIG. 11B, FIG. 11C, FIG. 11D, AND FIG. 11E show an example of execution of the present algorithm with a healthy male subject. Subject walked on a treadmill at 1.25 m/s for 8 minutes while wearing a multi-articular soft exosuit controlled by the algorithm described above. As shown in these figures, the control variable T1 succesfully converged to a specific value (44.75%), during the convergence process, the objective function for the identified optimal resulted in 7 W which is about 1.8 times greater than the initial value when the algorithm started.

```
// internal variable for sequencing the algorithm (0, 1, 2, 3, 4, 5, or −1)
process = 0;
// initial values for T1_med and w T1_med = 48; w = 2;
while ( process >= 0) {
// Process 0: initialize the variables (timer, T1_high, T1_low)
if ( process == 0 ) {
  timer_ms = 0;
  T1_high = T1_med + w;
  T1_low = T1_low + w;
  process = 1; }
  else if ( process == 1 ) { // Process 1: apply T1_high until 10 sec
    T1_apply = T1_high;
    if ( timer_ms > 10 * 1000) {
      PP_high = PP_5strides_avg;
      process = 2;
    }
  }
else if ( process == 2 ) { // Process 2: apply T1_med until 20 sec
  T1_apply = T1_med;
  if ( timer_ms > 20 * 1000) {
    PP_med = PP_5strides_avg;

process = 3;
  } } else if ( process == 3) { // Process 3: apply T1_low until 30 sec
    T1_apply = T1_low;
    if ( timer_ms > 30 * 1000) {
      PP_low = PP_5strides_avg;
      process = 4;
    }
  }
else if ( process == 4) { // Process 4: compare PP and change T1_med and w
  if ( PP_high > PP_med && PP_high > PP_low ) {
    T1_med = T1_med + w;
    w = w;
  }
  else if ( PP_med > PP_high && PP_med > PP_low ) {
    T1_med = T1_med;
    w = w/2;
  }
  else if ( PP_low > PP_high && PP_low > PP_med ) {
    T1_med = T1_med − w;
    w = w;
  }
  process = 5; } else if ( process == 5) { // Process 5: check the convergence
  if ( w <= 0.25 ) }
    T1_optimal = T1_med;
    status = −1;
  }
  else }
  process = 0;
  }
 }
}
```

Termination Strategy

When the change in average positive power falls under a certain threshold, and/or the magnitude of the estimated gradient vector falls below a certain threshold, the iterative optimization stops. Optimization can be resumed at a later stage if the proxy function starts varying again.

In the following sections, several validation results for this embodiment are presented, proving the effectiveness of this optimization algorithm.

Experimental Validation of Optimization Approach

Figure 12:
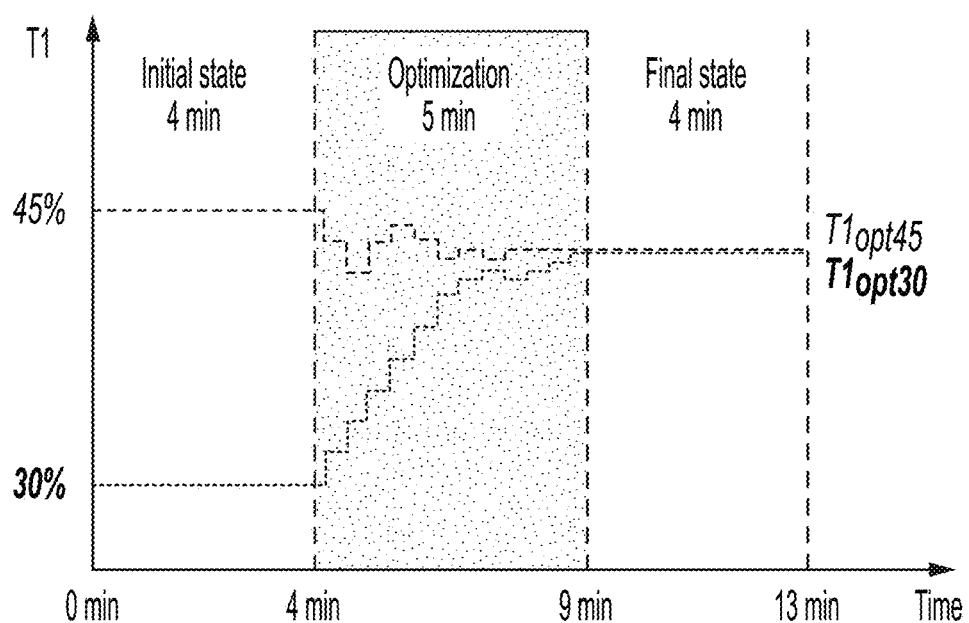
FIG. 12 illustrates experimental protocol for validating an approach for optimizing ankle actuation onset timing for maximizing ankle positive power, in accordance with an embodiment of the present disclosure.

To better validate the implementation of the developed optimization control approach for soft exosuits particularly at ankle, a human subject experiment has been conducted, where subjects walked on a treadmill at 1.5 m/s with a 15 Kg backpack wearing an exosuit assisting with ankle plantarflexion. As shown in FIG. 12, the experiment consisted of 13 min continuous walking trials, including an initial state (4 min), an optimization period (5 min), and a final state (4 min). During the initial state, the controller kept the actuation onset timing (T1) constant at a given initial value, either 30% or 45% of the gait cycle, which is a relatively early or late actuation onset timing. During the optimization period, the controller ran the developed optimization controller to find the optimal actuation onset timing that maximizes the average positive power delivered at ankle while keeping the peak force level constant. Then, during the final state, the controller kept the actuation onset timing constant again, at the optimal value found during the optimization period.

Figure 13:
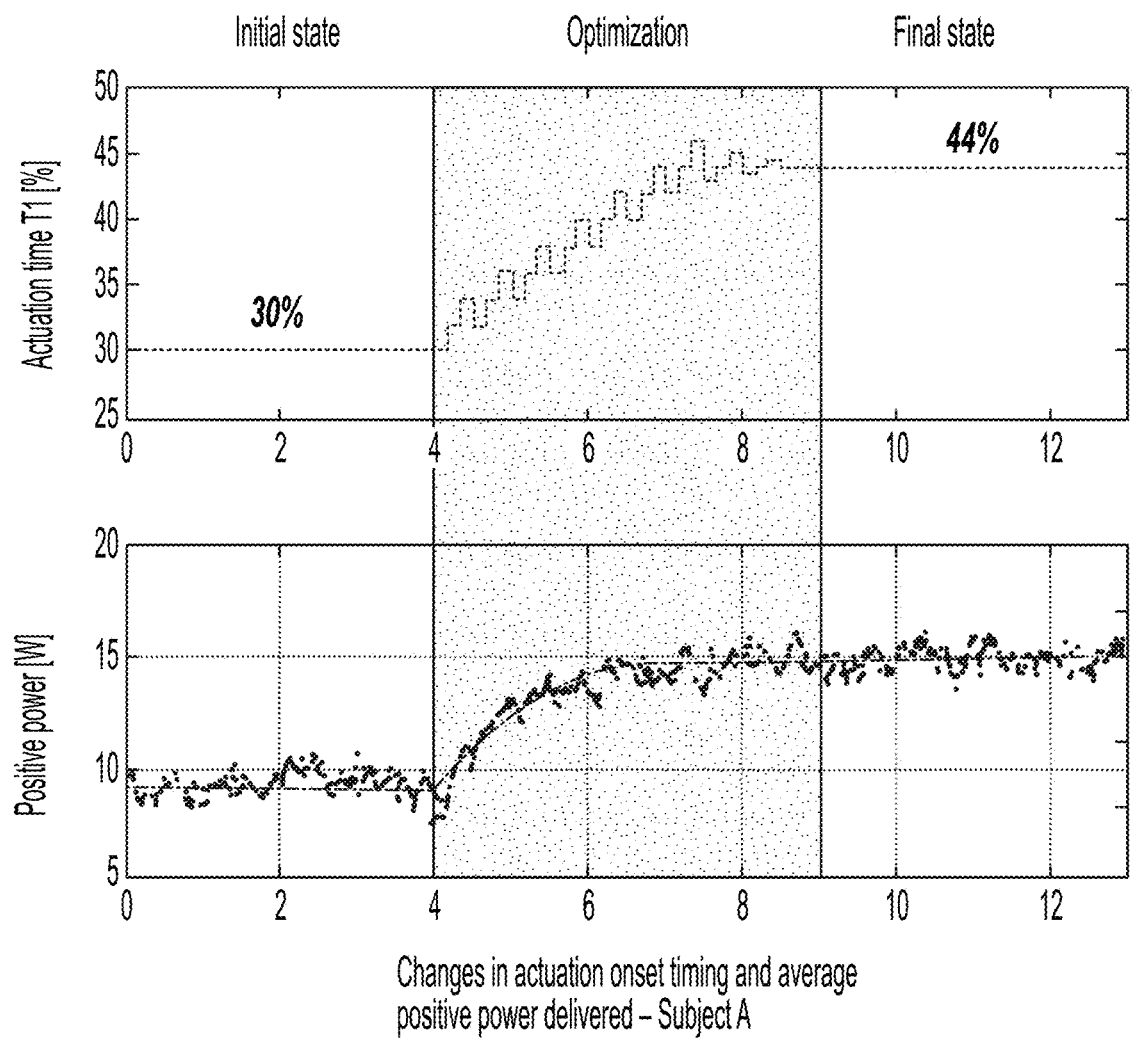
FIG. 13 shows changes in positive power for Subject A during optimization, in accordance with an embodiment of the present disclosure.

FIG. 13 shows a representative result of the experiment from a subject (Subject A). As shown, the trial started with the actuation onset timing at 30% of the gait cycle. During the optimization period, the controller ran the optimization controller by applying different actuation onset timings to the subject. As a result, the actuation onset timing (control variable) converged to 44% starting from 30% of the gait cycle, and by comparing the initial state and the final state, the average positive power delivered at ankle (objective function) significantly increased.

Figure 14:
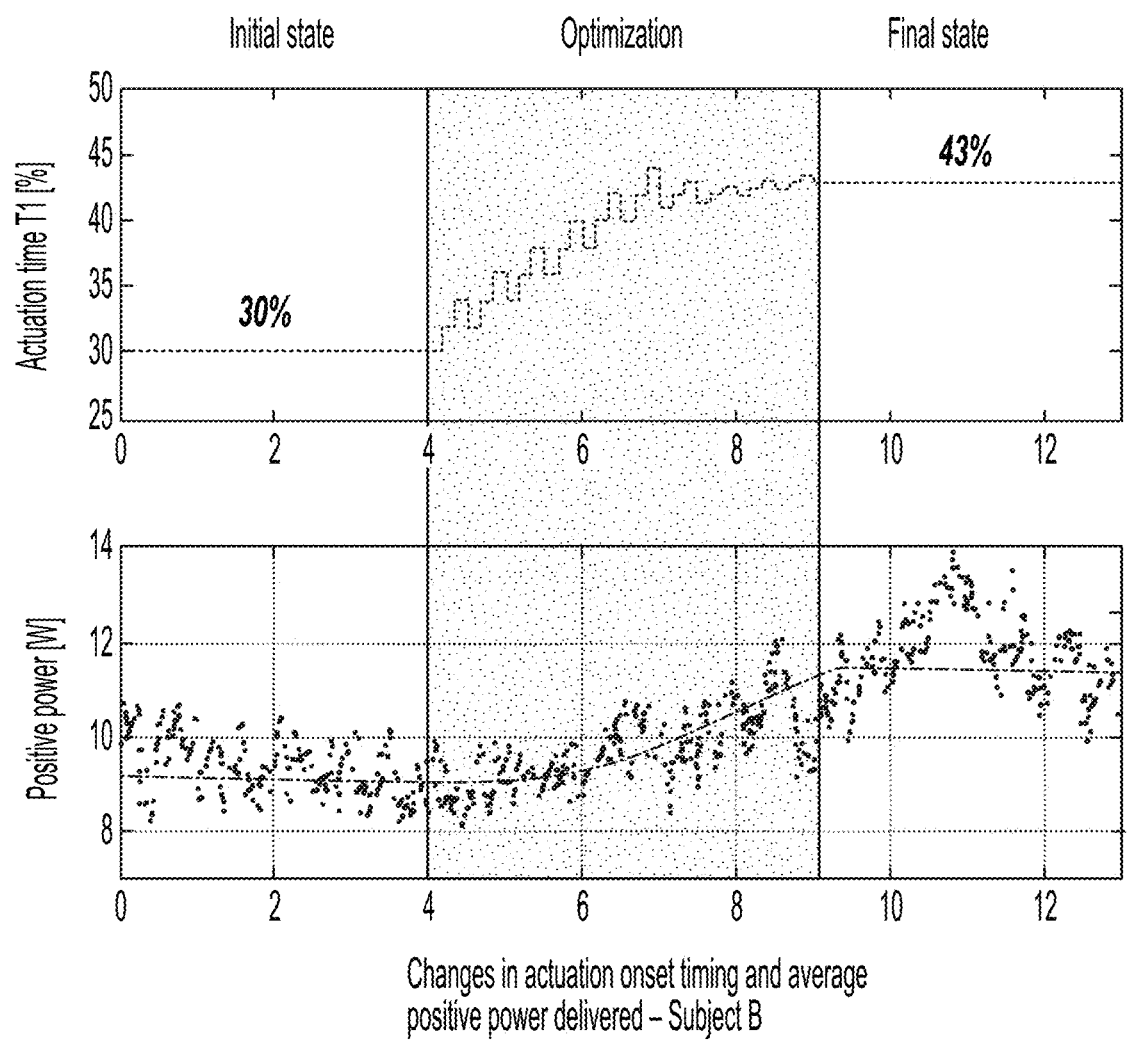
FIG. 14 shows changes in positive power for Subject B during optimization, in accordance with an embodiment of the present disclosure.

FIG. 14 shows another representative result of the experiment from a different subject (Subject B). Similarly, the actuation onset timing (control variable) converged to 43% starting from 30% of the gait cycle, and by comparing the initial state and the final state, the average positive power delivered at ankle (objective function) greatly increased.

These results show that the implementation of the optimization control approach at ankle works well with the given control variable and the objective function.

In addition, for both subjects, the two optimal actuation onset timings found by the two separate trials starting from different initial values (30% and 45% gait cycles) were almost the same. This indicates that the assumption on the convexity of the objective function landscape is sound, which further improves the validity of the implementation at ankle.

TABLE 1

Optimal actuation onset timings found in the experiment.

|  | Optimization starting from 30% | Optimization starting from 45% |
|---|---|---|
| Subject A | 30.0% ⇒ 44.0% | 45.0% ⇒ 44.0% |
| Subject B | 30.0% ⇒ 43.0% | 45.0% ⇒ 42.5% |

Figure 15:
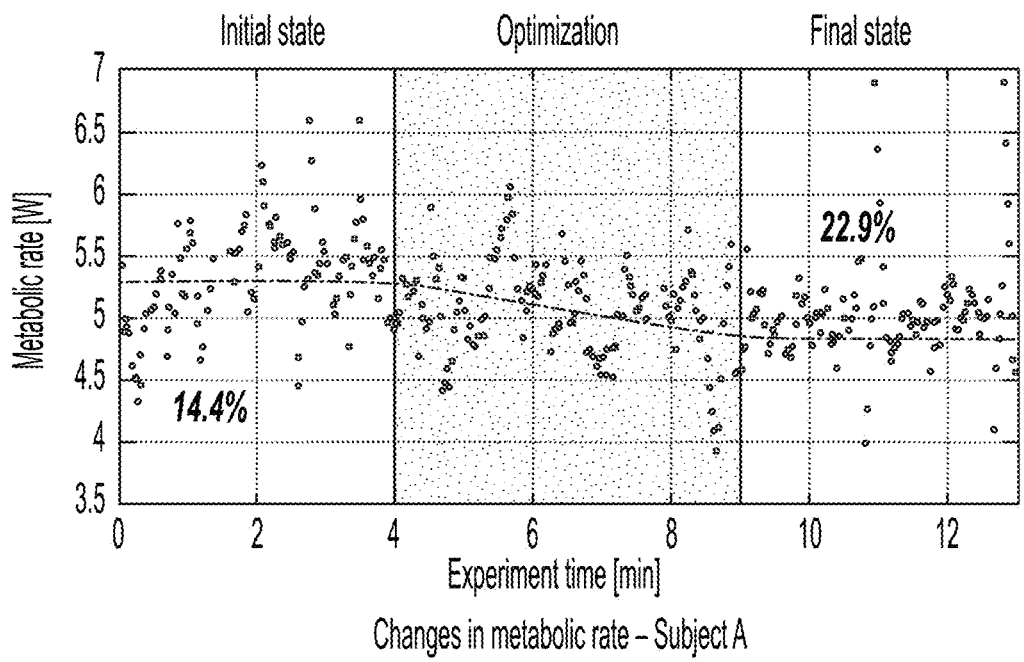
FIG. 15 shows changes in metabolic rate of Subject A during optimization, in accordance with embodiments of the present disclosure.

FIG. 15 shows the metabolic rate of the subject while walking with 15 kg backpack during the same experiment presented above. As shown, the metabolic cost gradually decreased while going through the optimization period. Comparing the initial state and the final state, the percentile metabolic reduction relative to the baseline condition (walking with powered-off exosuit) greatly increased from 14.4% to 22.9%.

Figure 16:
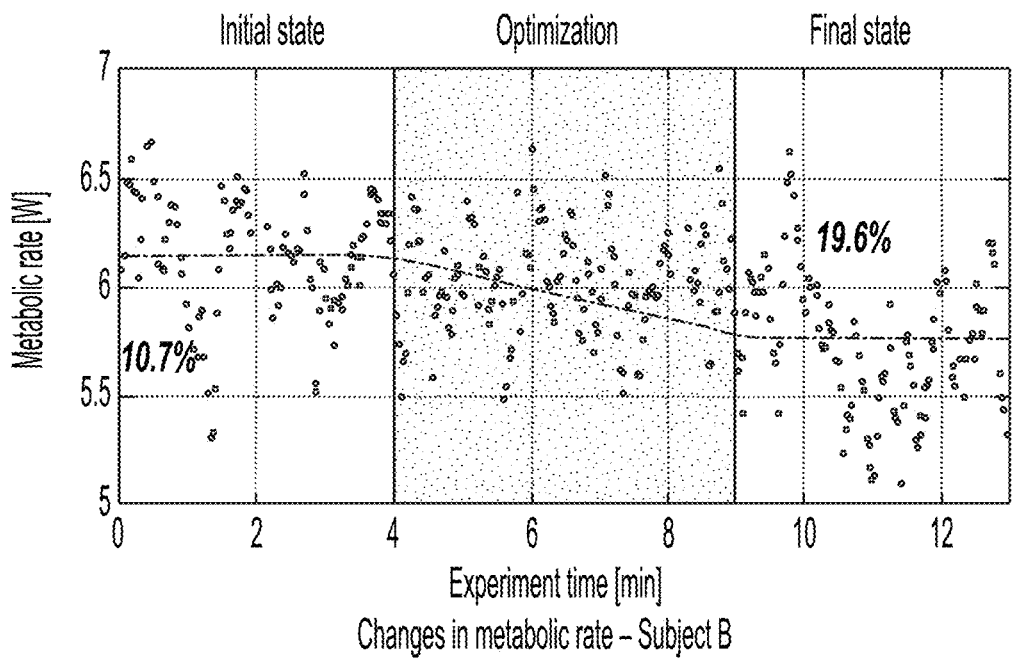
FIG. 16 shows changes in metabolic rate of Subject B during optimizatio, in accordance with embodiments of the present disclosure.

FIG. 16 shows the metabolic rate results of Subject B. Similarly, the metabolic cost gradually decreased, and comparing the initial state and the final state, the percentile metabolic reduction greatly increased from 10.7% to 19.6%.

These results show that the implementation of the optimization control approach at ankle may potentially increase the metabolic benefit by finding the optimal actuation onset timing that maximizes the average positive power delivered at ankle.

Representative Example #2: Multi-Parameter, Gradient-Descent Optimization

Bayesian optimization is a very efficient way of optimizing control parameters online, however, in some circumstances, it may be preferred to sacrifice efficiency by guaranteeing that the parameter space is explored in a gradual way. Gradient descent methods gradually explore the parameter space by changing from one point to another proximal point. This characteristic of gradient descent may be especially useful when a large change in the parameter space may result in a sudden change in the way the suit transmits forces to the user and may make the learning experience harder for the user to adapt to those transition, this may be especially applicable to users that are not trained to using wearable devices or for some patient populations. In these circumstances, designers may choose to implement gradient descent methods, most likely sacrificing convergence time and performance under local minimum points for non-convex spaces. As an example, the following multi-dimensional optimization implementation has the goal of maximizing the average positive power delivered from the exosuit to the ankle joint.

As an example, the following multi-dimensional optimization implementation has the goal of maximizing the average positive power delivered from the exosuit to the ankle joint.

The selected optimization variable for this study are characterized by the onset of the assistive profile (when the cable starts to pull, which should be related to the start timing of push-off) and by the slope or duration of the assistance (how fast the cable pulls or the rate of cable pull, which should be relate to the ankle joint velocity during push-off).

A gradient descent algorithm will have an initialization starting at a specific point in the parameter space (T1, D1).

The algorithm, will then iteratively estimate the gradient of the objective function at the current point and perturbing the independent variables in steps proportional to the gradient magnitude. For this discrete application, the gradient can be estimated by applying multiple adjacent points in the parameter space and evaluating the objective function in each of them as explained in the single-parameter implementation.

When the change in the average positive power falls under a certain threshold and/or the magnitude of the gradient falls below a certain threshold, the iterative optimization stops.

Representative Example #3: Multi-Parameter, Bayesian Optimization

While a single-parameter optimization approach can certainly lead to much improved performance of a control system compared with one-size-fits-all actuation profiles, it can often be less optimal for achieving significant gains under several scenarios. In many circumstances, an objective function (such as a direct measure or indirect proxy for metabolic cost) will depend strongly on the entire profile of the assistance to be provided to the one or more joints of the wearer, and a one-dimensional simplification (such as the onset timing thereof) which keeps any other profile parameter constant may be insufficient to explore all the possible profile variations which could lead to an improved performance.

As an example, the above-referenced provisional patent applications investigated how the onset and peak timing of hip extension assistance delivered by a lower-body soft exosuit affects the delivered positive mechanical power and metabolic cost during loaded walking. The study showed that two control variables (profile onset and peak timing) can both significantly and independently affect the amount of delivered mechanical power and metabolic reduction. The main results of this study are shown in FIG. 17A, FIG. 17B, and FIG. 17C.

Figure 1:
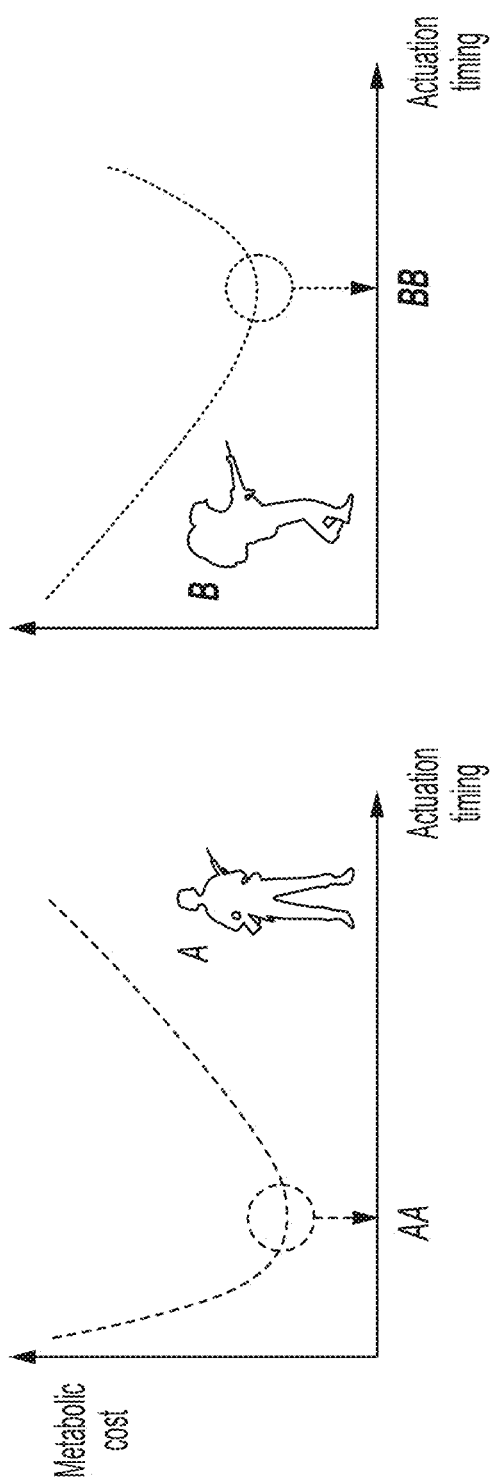
FIG. 1 shows variability in exosuit efficacy across individual subjects.
Figure 2A:
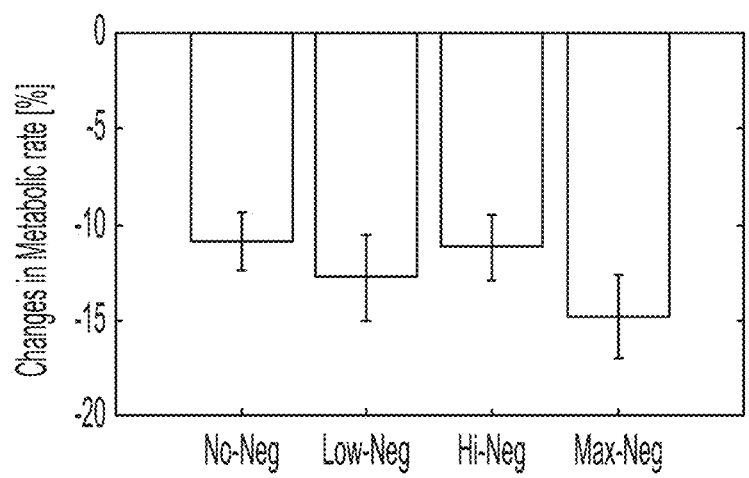
FIG. 2A and FIG. 2B illustrate experimental results showing a change in metabolic rate for 7 different subjects.
Figure 2B:
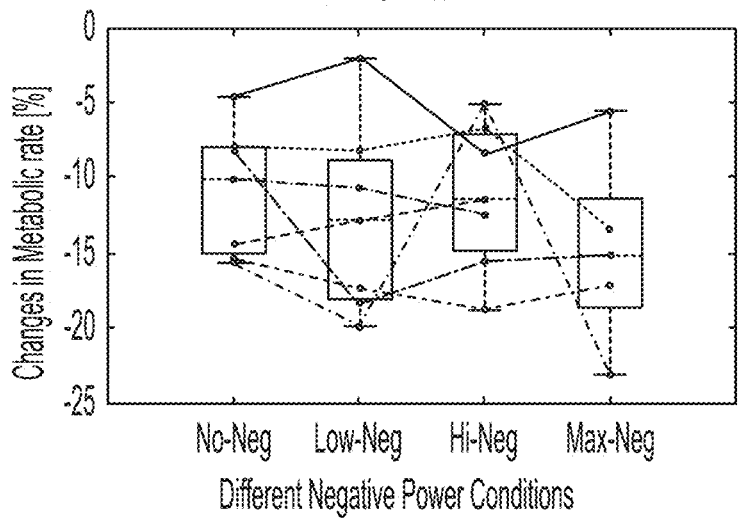
Figure 3A:
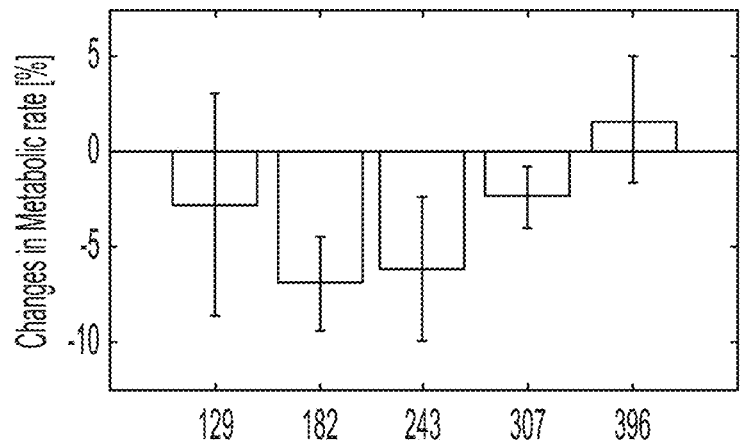
FIG. 3A and FIG. 3B illustrate experimental results showing change in metabolic rate for 9 different subjects.
Figure 3B:
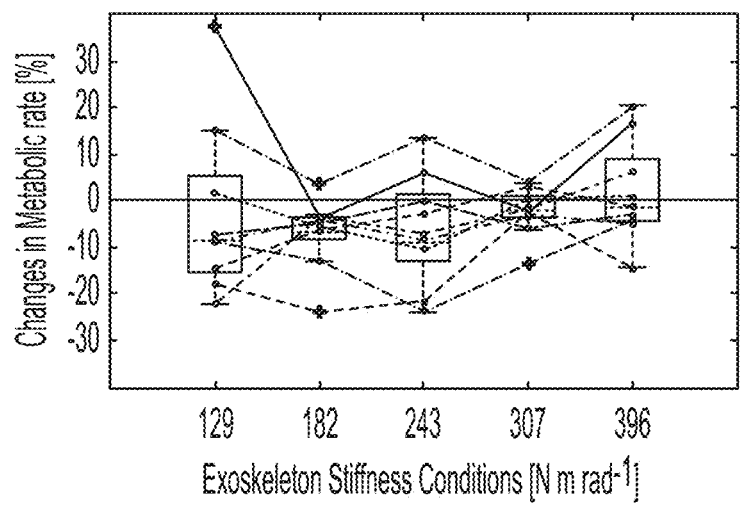
Figure 17A:
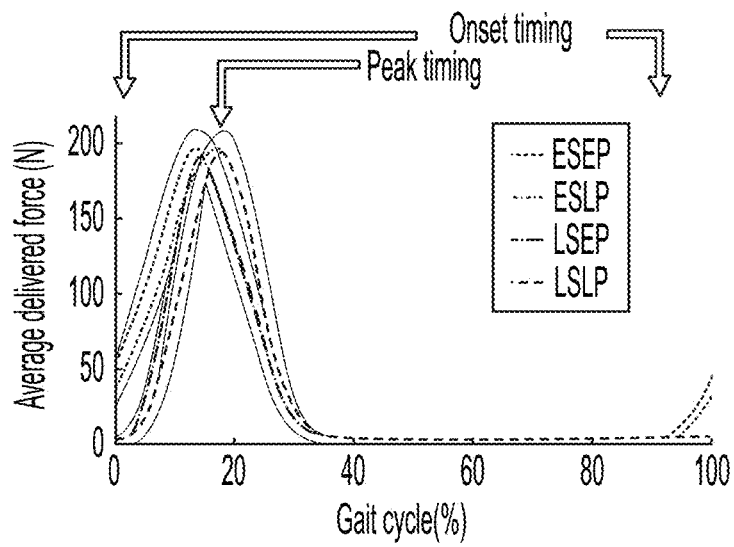
FIG. 17A, FIG. 17B, and FIG. 17C show resulting assistive force profiles, metabolic cost, and average delivered power for a variety of actuation onset and actuation peak timings, in accordance with an embodiment of the present disclosure.
Figure 17B:
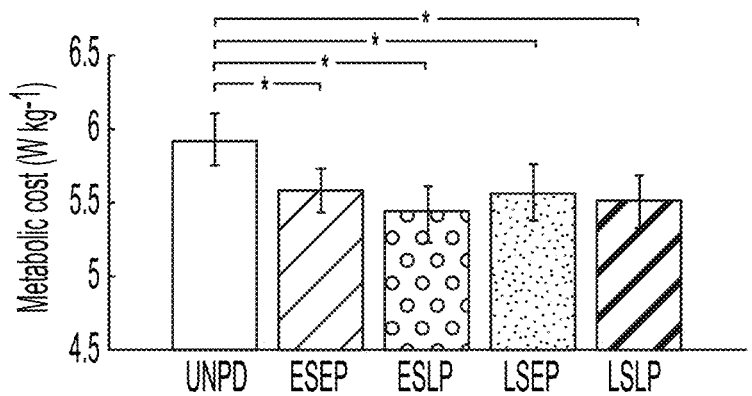
Figure 17C:
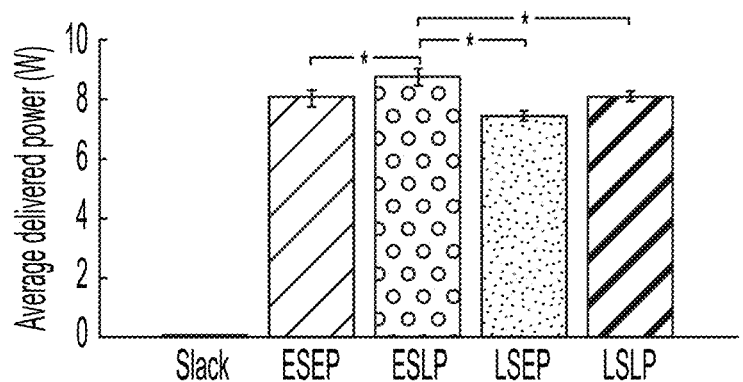

FIG. 17A shows the resulting assistive force profiles (average from eight subjects) shown on the right side of the figure. Early-start-early-peak (ESEP), early-start-late-peak (ESLP), late-start-early-peak (LSEP), late-start-late-peak (LSLP) in red, yellow, green, blue respectively. FIG. 1B(M) shows the net metabolic cost reported in the unpowered condition (UNPD) and in the powered conditions. All data are means±SEM. The small panel on the right corner shows the corresponding assistive profile. Early-start-early-peak (ESEP), early-start-late-peak (ESLP), late-start-early-peak (LSEP), late-start-late-peak (LSLP) in red, yellow, green and blue respectively. The braces with * represent statistically significant differences with the unpowered condition ($p<0.05$). FIG. 17C shows the positive mechanical power delivered by the soft exosuit to both limbs. All data are means±SEM. The braces with * represent statistically significant differences between two conditions ($p<0.05$).

The highest metabolic reduction profile with highest positive mechanical power delivered was reported in the profile with early start timing and late peak timing (ESLP in FIG. 17A). Overall, these results show that both onset and peak timings are independently critical to the reduction of metabolic cost of walking and one-dimensional optimization may not be sufficient to optimize two control variables at the same time.

In a case like this, the only viable way to use a one-dimensional optimization algorithm would be to fix one of the two parameters while optimizing the other, and then to repeat the same approach for any value of the first parameter in order to effectively explore the entire landscape of profiles. This would exponentially increase the required amount of optimization time by the number of open control variables, and by the number of assisted joints.

Figure 18:
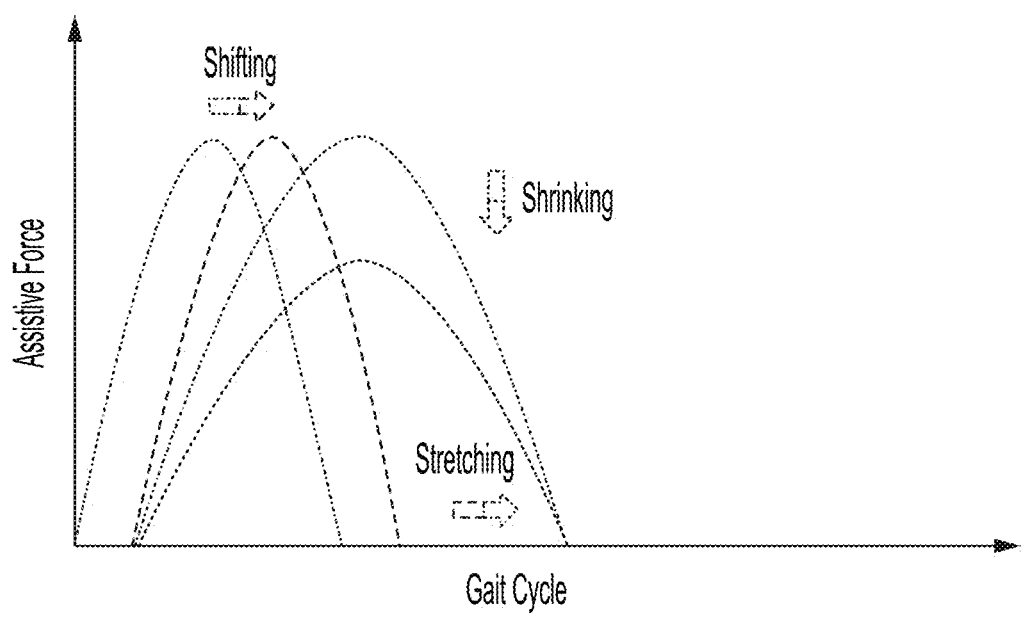
FIG. 18 illustrates adjustments to various parameters of a representative assistive force profile, in accordance with embodiments of the present disclosure.

In more general terms, onset and peak timings are not the only variables that determine how the subject receives assistance from the soft exosuit and the reduction of metabolic cost of walking. The entire shape and timing of the assistive profile needs to be defined to maximize the metabolic reduction, which means optimizing the entire shape of the profile. If n variables are used to define the assistive profile, this leads the optimization to become an n-dimensional optimization problem. As a way of example, three control variables could be used to define a sinusoidal assistive profile for a single degree of freedom (DOF) as shown in FIG. 18 (amplitude, frequency, phase or time offset). In this case, a three-dimensional optimization method would be able to find the optimal profile. In a multi-joint assistive profile optimization scenario with m joints assisted with a profile defined by n control variables, a m×n-dimensional optimization would be required.

The multi-dimensional optimization technique is not only preferable when tuning control variables in an exosuit, but it could also be advantageous in tuning the control systems of rigid exoskeletons and powered prostheses. As an example, the BiOM powered ankle prosthesis has 11 parameters governing its stiffness, the power and timing of the actuated push-off, and other functionality. Although high numbers of parameters make devices highly adaptable, they also make the selection of proper parameter values more difficult. Manually selecting those parameters experimentally are challenging to reach optimal.

Since offline models and simulations cannot fully capture the variability of the subjects nor the ways that subjects will interact with different parameter settings, there is a need for optimizing multiple exosuit control variables to the optimal configurations for individual wearers to minimize variability in efficacy of the exosuit and to maximize the metabolic benefit for each subject.

A method was developed to optimize multiple control parameters of an assistive actuation profile of an exosuit in order to (i) to find the optimal set of control variables for the soft exosuit for each subject, in order to (ii) to minimize or maximize the metabolic benefit for each subject.

The goal for this method is to minimize or maximize an objective function which represents, or is an indirect measure, of the desired outcome from using the exouit. The goal of the multi-dimensional optimization method disclosed here is to find the optimal set of control variables values (within a pre-defined set of variables) to minimize or maximize the objective function for each subject.

Using metabolic cost as the objective function can be used to optimize locomotion economy in healthy individuals.

Using other objective functions for different purposes with this optimization is also viable. For example, to use the forward propulsion impulse symmetry or the gait symmetry (impaired vs. sound leg) as the target function when tuning exosuit control variables for improving the gait quality of a post-stroke individual. Or using indirect measurements (such as the delivered positive power) as a proxy to measure the metabolic cost of walking in order to make the optimization method viable for a portable soft exosuit system with body-worn sensors. Also, the result of max range of the hip angle times the step frequency can also be an objective function to utilize this optimization method to maximize the walking speed of the subject by optimizing those control variables.

The control variables for a multi-dimensional optimization can be any set of independent control parameters that affect the value of the objective function.

Example control variables include but are not limited to assistance peak magnitude, assistance onset, peak, offset timing and multi-joint assistance correlation.

A real-time optimization algorithm will try to find an optimal point in the n-dimensional space of the control variables (within predefined boundaries) in order to minimize or maximize a cost function.

An optimization algorithm based on a Bayesian optimization approach is described herein, consisting of an initialization and two steps executed iteratively:

1. Selection of a n-dimensional set of starting points in the space of the control variables, then, iteratively 2. Evaluation of the objective function on each point of the set, and estimation of a posterior distribution of the objective function 3. Calculation of the next set of best points in the control variables space using a pre-defined metric.

Figure 19:
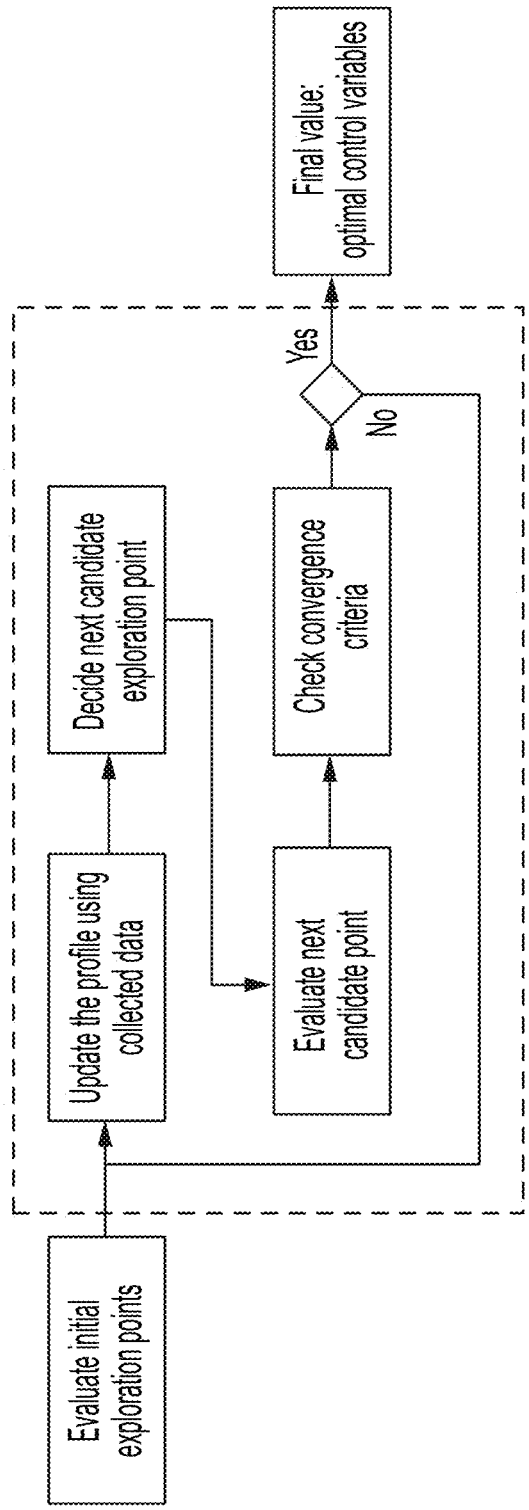
FIG. 19 is a flow chart illustrating a representative multi-parameter optimization approach, in accordance with embodiments of the present disclosure.

More in detail, and with reference to the flowchart of FIG. 19, the algorithm works as follows:

1. Initialization: select a set of initial evaluation points based on a pre-defined metric 2. Evaluation: for each point of the set, evaluate the objective function by:

Generating an assistance profile for the point

Measuring or estimating the objective function on the generated assistance profile. This typically corresponds to the individual wearing the exosuit walking for a pre-defined amount of time, and either a proxy function or a direct measure being taken.

3. Update distribution: the posterior distribution of the objective function is updated using the calculated/measured objective function from the last iteration 4. Generate new control variable sets: A new set of evaluation points is calculated based on the updated posterior distribution and a pre-defined metric 5. Terminate or iterate: pre-defined termination criteria are evaluated. If the outcome does not meet the criteria, repeat 2) through 4) using updated candidates.

Initialization

The initial evaluation points can be chosen from the n-scape of the control variables through several sampling methods. Generally speaking, the approach is that of sampling the n-dimensional space of the control parameters in order to have a reasonable initial estimation of the objective function landscape.

Several sampling methods exist. Some examples are

A. uniform random sampling (e.g. latin hypercube sampling) within the feasible region, delimited by any boundaries defined on the control variables B. random sampling within a structure.

Figures 20A, 20B:
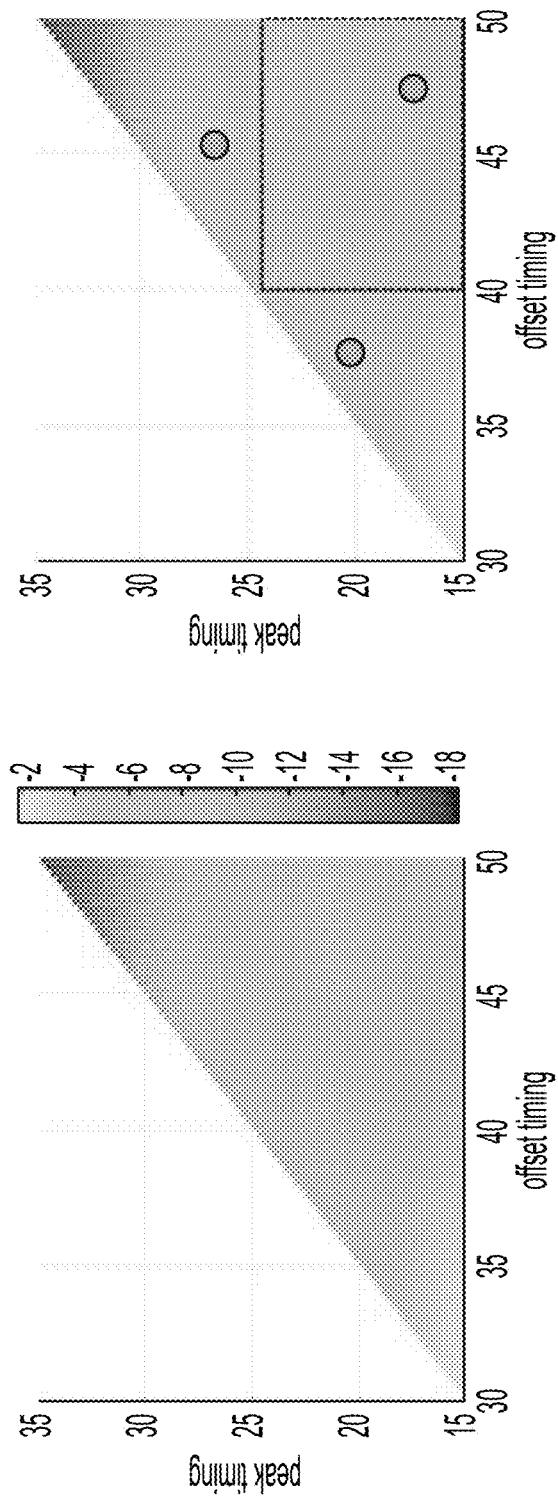
FIG. 20A and FIG. 20B illustrate samplings and associated methods for initially exploring an objective function landscape for optimal parameter candidates, in accordance with embodiments of the present disclosure.
Figure 21A:
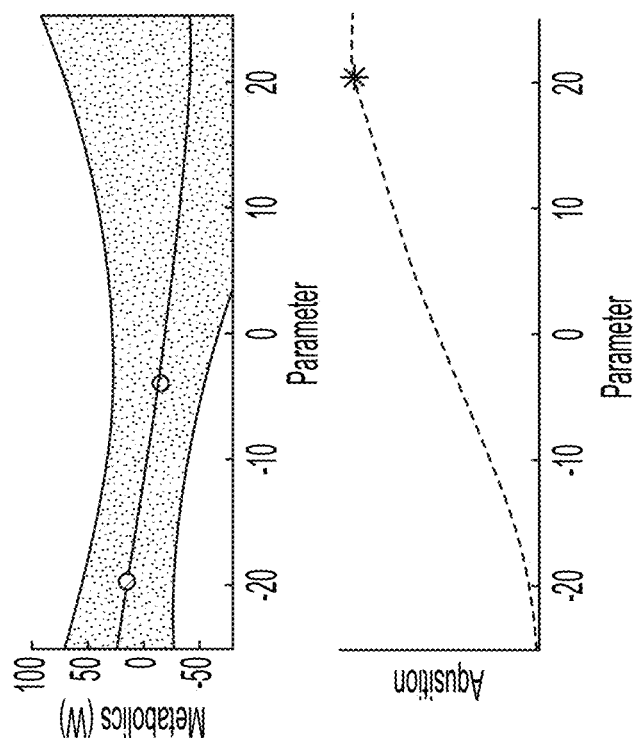
FIG. 21A, FIG. 21B, FIG. 21C, FIG. 21D, FIG. 21E, and FIG. 21F show a one-dimensional optimization process using a Bayesian optimization method, in accordance with an embodiment of the present disclosure.
Figure 21B:
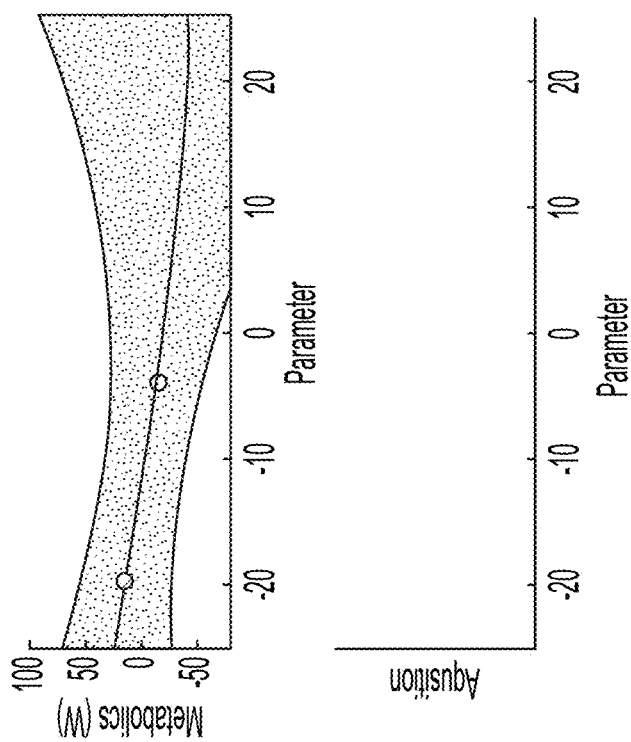
Figure 21D:
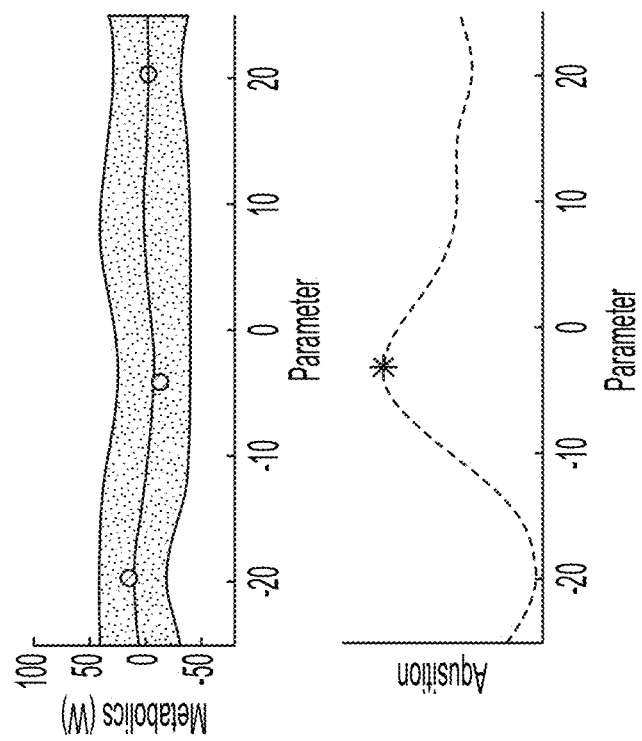
Figure 21C:
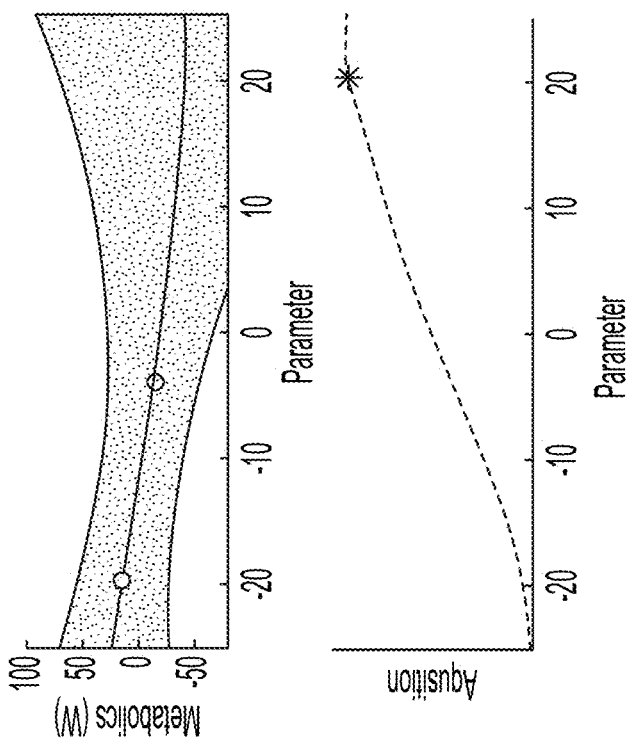
Figure 21E:
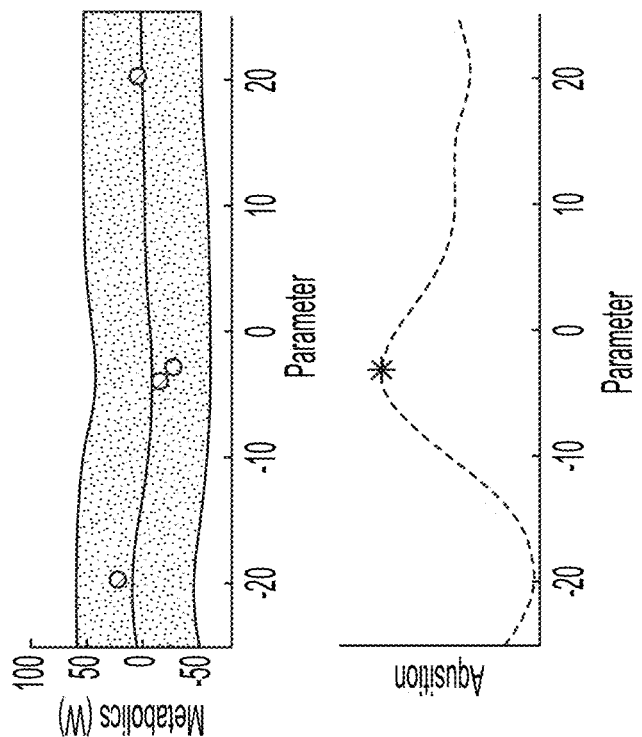
Figure 21F:
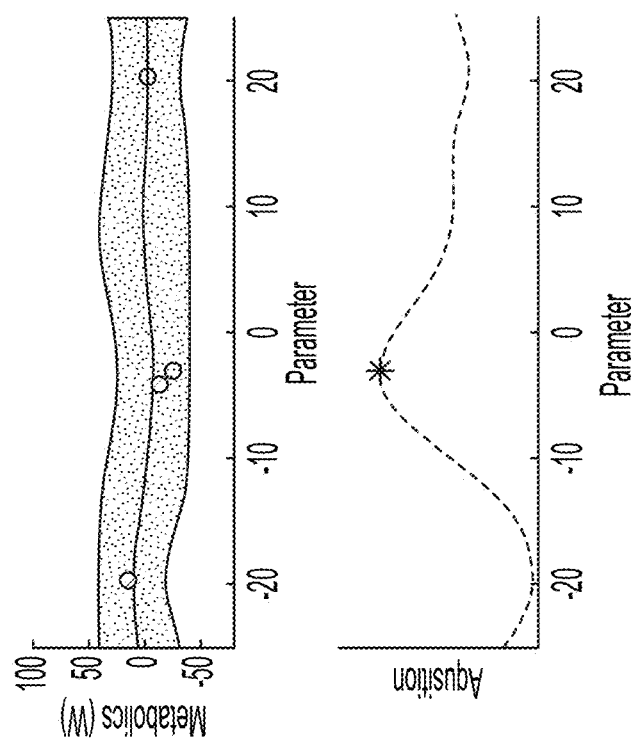

This approach is exemplified in FIG. 20A and FIG. 20B. The feasible region (FIG. 20A)—colored section) can be divided into 3 different control parameter regions (FIG. 20B). Then, for each region, a point (FIG. 20B) can be randomly selected.

FIG. 20A and FIG. 20B show initial exploration point selection methods. Peak and offset timing presented as an example. In FIG. 20A, colored space is a feasible space and different color corresponds to a different cost, shown by a right bar. FIG. 20B shows a sampling method.

Iterative Optimization

Iteratively, the algorithm may perform the following operations:

1. The cost function is evaluated on the set of candidate points.
2. The cost function posterior distribution is updated based on the objective function evaluation for each sampling point
3. New control-space points are generated as a new set of candidates, based on a pre-defined metrics (measure function).

The cost function can be either a direct measure or a proxy measure for the desired outcome (i.e., objective function) of the exosuit. Examples of this could be a direct measure of metabolic cost, a direct measure of gait symmetry, integral positive power at the ankle (a proxy measure for metabolic cost), etc. Any combination measure would be useable as well, provided it can be calculated in real time with the available sensors.

The updated cost and the set of current evaluation points are then used to update a posterior distribution. This is done through a parametric optimization to find a best fit of a prior distribution. The prior distribution is defined by a set of free parameters, usually defining a Gaussian process, which are then optimized with a log-likelihood maximization with the observed objective function value at the current evaluation points.

Finally, the updated posterior distribution is used to pick a new set of best candidates for the next iteration of the algorithm, using a pre-defined measure (metric function), such as a combination of Gaussian probability distributions.

Bayesian Optimization

Bayesian optimization is a global, sample efficient, and non-parametric optimization method. This optimization finds a posterior distribution of the unknown objective function using prior information. Then the posterior distribution is used to efficiently sample a next candidate. The presently disclosed Bayesian optimization uses Gaussian process as a prior. Hyper parameters of Gaussian process can vary landscape, amplitude, and noise level of posterior distribution.

The following example describes how this method works on a simple one-dimensional example. The same algorithm is applied for multi-variable optimization in the next Section.

Optimization Method Explanation Using One-Parameter Example

FIG. 21 shows an example of a one-dimensional optimization process using a Bayesian optimization method. Bayesian optimization is easily scalable for optimizing any number of actuation parameters, as the process for defining a mathematical model and determining a suitable candidate parameter or set of candidate parameters is performed in like manner regardless of the number of actuation parameters being optimized.

A. After evaluating initial data points (two red dots), the algorithm optimizes the parameters of a prior distribution by maximizing the log likelihood of the observed objective function on the candidate points.

B. The prior is used to calculate a posterior distribution which can vary the landscape (curvature of green line), amplitude (minimum and maximum difference of green line), and noise level (gray area).

C. Using the fitted information (top), the algorithm calculates the best possible next data point using a metric (bottom, red star).

D. The candidate point is evaluated (top, parameter 20).

E. The algorithm find updated posterior distribution (top). Using the info, a new candidate point is calculated (bottom).

F. The new candidate point was evaluated (top, parameter near −5)

G. The algorithm fitted the data (top) and calculate new candidate point (f).

This process is repeated until convergence or termination.

In FIG. 21, red dots in the top figures are evaluated data points. Green curve showed fitted landscape and gray area showed noisy level. Bottom plots shows a probability of being minimum. Red star showed the optimal point.

Termination

At the end of each iteration cycle, some termination criteria are evaluated to decide whether to stop or continue the optimization. Such criteria are pre-defined, and involve any combination of analysis of the cost function, candidate points and time passed from the first iteration.

Usable termination criteria include: a) having very close consecutive candidate points, b) measuring a small variation of the cost function across the candidate set, c) a time threshold has passed, d) a high posterior probability of a specific point being an optimum.

Representative Example #4: Hip Assistance, Two-Parameter, Bayesian Optimization

This section presents an implementation of the above described algorithm in the following situation:

1. An exosuit to assist hip extension during walking, with the purpose of reducing metabolic cost
2. A direct measure of metabolic cost as an objective function
3. A two-dimensional parameter optimization for the actuation profiles
4. A Bayesian optimization method with a Gaussian process prior Objective Function: Maximize Walking Economy (Minimizing Metabolics)

In this embodiment, a direct measure of metabolic cost was available in real-time thanks to a portable oxymetry/CO2 machine, providing a very accurate proxy of the true metabolic cost during walking.

Control Variable: Peak and Offset Timing Actuation

The hip extension assistance provided by the exosuit during one gait cycle is simplified to a sinusoidal-like profile. The actuation profile imparted by the exosuit in this algorithm is composed of two simple sinusoidal curves, providing an approximation of a fraction of the biological hip moment.

This approach enables the system to quickly change to different magnitude, shape, and timings of assistive profiles by changing parameters of the two sinusoidal curves as shown in (Eq. 1).

$$F_d(x) = \begin{cases} F_d^p \sin\left(\frac{\pi(x - T_d^o)}{2(T_d^p + T_d^o)}\right), & T_d^o \leq x < T_d^p \\ F_d^p \sin\left(\frac{\pi(x - 2T_d^p + T_d^o)}{2(T_d^e - T_d^p)}\right), & T_d^p \leq x < T_d^e \\ 0, & \text{otherwise} \end{cases} \quad \text{(Eq. 1)}$$

where $T_d^o$, $T_d^p$, and $T_d^e$ define the desired onset, peak, and end timing of assistive profile within the gait cycle (GC) respectively, while $F_d$, $F_d^p$, and x define the desired assistive force, peak force magnitude, and current GC respectively.

Thus, control variables of $T_d^o$, $T_d^p$, $T_d^e$ can be used to regulate the shape of the assistive profile. Using a low level force control different assistive profiles tracking can be realized, as shown in FIG. 22A, FIG. 22B, FIG. 22C and FIG. 22D.

Figure 22B:
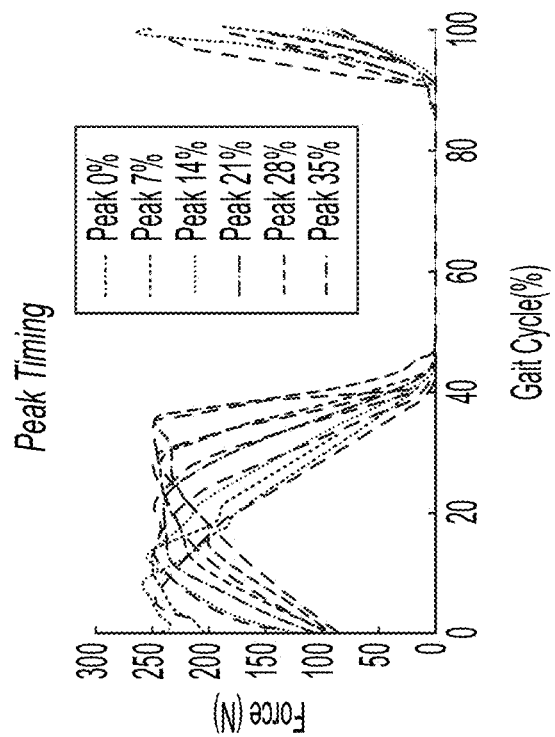
FIG. 22A, FIG. 22B, FIG. 22C, and FIG. 22D illustrate the effects of variations in onset timing, peak timing, offset timing, and shift timing on an assistive force profile, in accordance with an embodiment of the present disclosure.
Figure 22A:
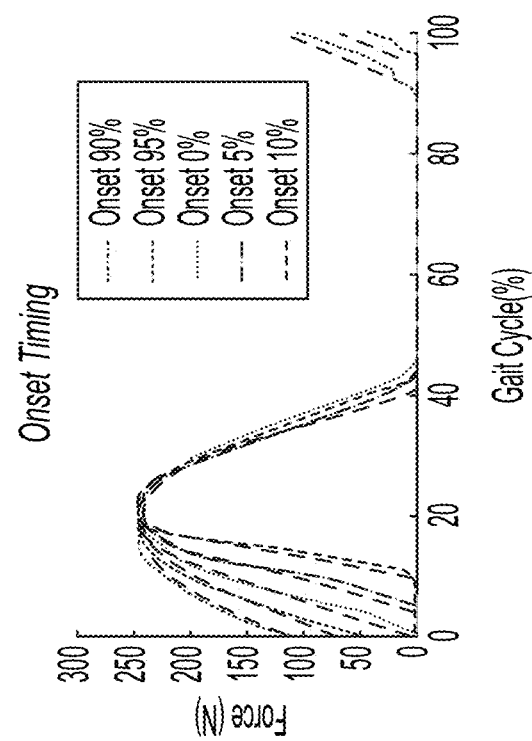
Figure 22D:
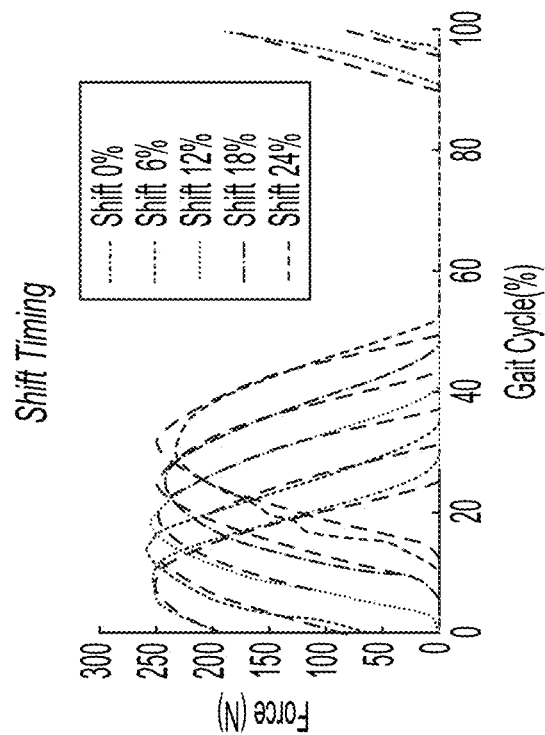
Figure 22C:
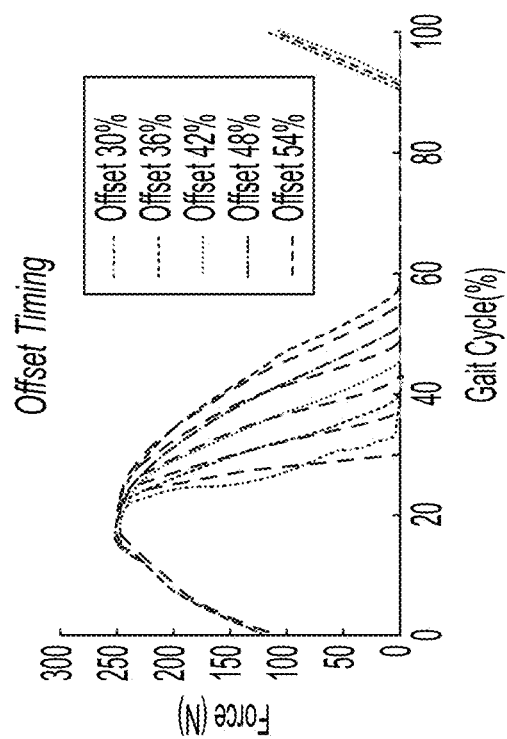

FIG. 22A, FIG. 22B, FIG. 22C and FIG. 22D show an example of force tracking on different assistive profiles when varying onset timing (FIG. 22A), peak timing (FIG. 22B), offset timing (FIG. 22C), and entire profile timing (FIG. 22D).

For the hip joint, the peak and offset timing actuation were selected as the control variables of the optimization.

Figures 23A, 23B, 23C:
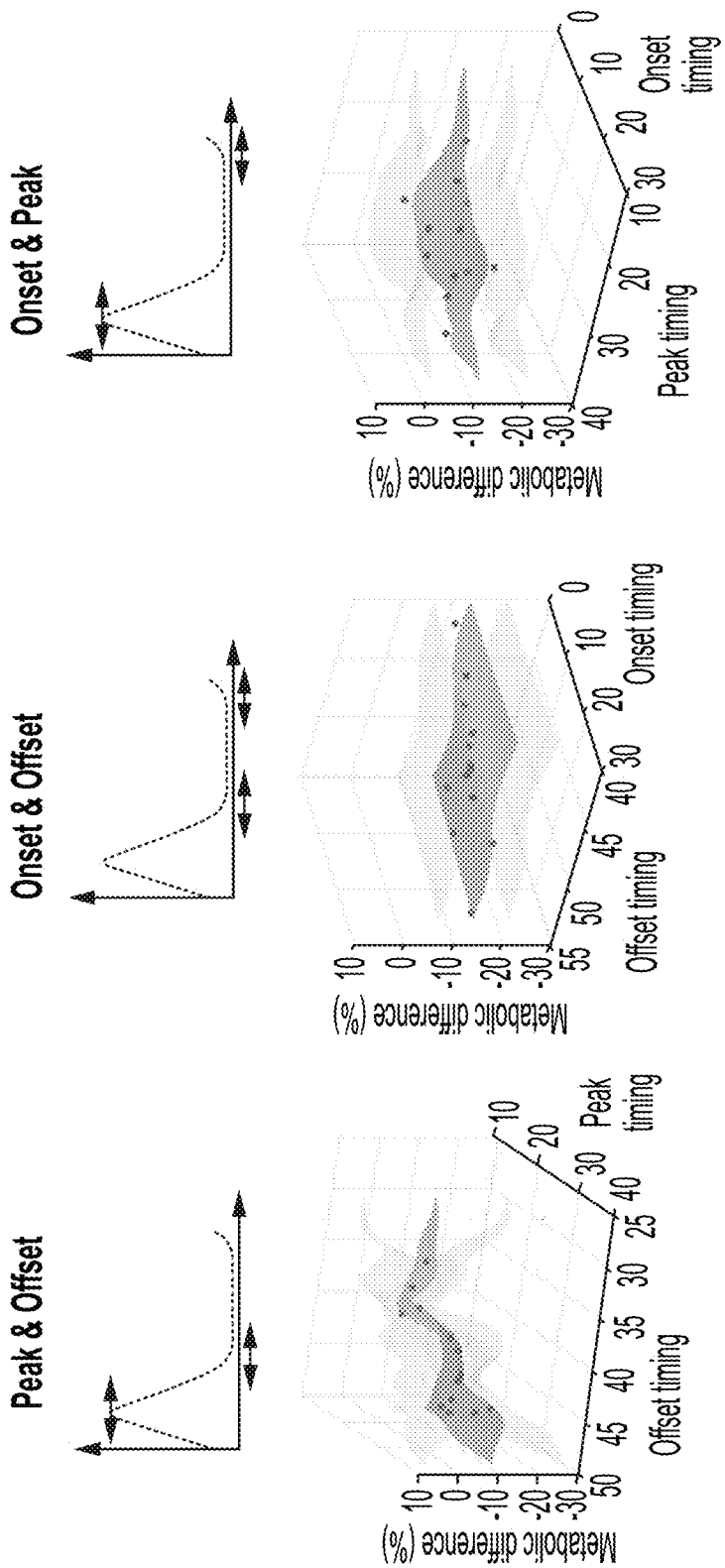
FIG. 23A, FIG. 23B, and FIG. 23C show an objective function landscape for combinations of actuation parameters, in accordance with an embodiment of the present disclosure.

FIG. 23A, FIG. 23B, and FIG. 23C show the landscape of different combination of control parameters of a representative subject.

Internal testing found that the combination of peak and offset timing can vary metabolics more than 20% (FIG. 23A) while other combinations seem to be already in an optimal range (FIG. 23B) and FIG. 23C). FIG. 23B and FIG. 23C show that greatly reduced metabolics almost entire feasible region while FIG. 23A shows difference in metabolics depending on parameters.

The algorithm selected the peak and offset timing variables within some predefined constraints:
1. 5% GC<=Peak Timing<=25% GCs
2. 30% GC<=Offset Timing<=40% GC
3. Offset Timing−Peak Timing>=15% GC These constraints were picked to respect the overall exosuit control system bandwidth on force tracking and to generate a moment in line with the hip biological torque.

The magnitude of force and onset timing parameters were fixed. The magnitude of the peak force was selected to 30% of the subject's body weight for the subject's comfort while using the disclosed system. The maximum hip flexion point was picked as the onset timing of the assistive profile due to hip studies having shown a larger metabolic reduction with earlier onset timing. The example of candidate force profiles is shown in FIG. 24.

Figure 24:
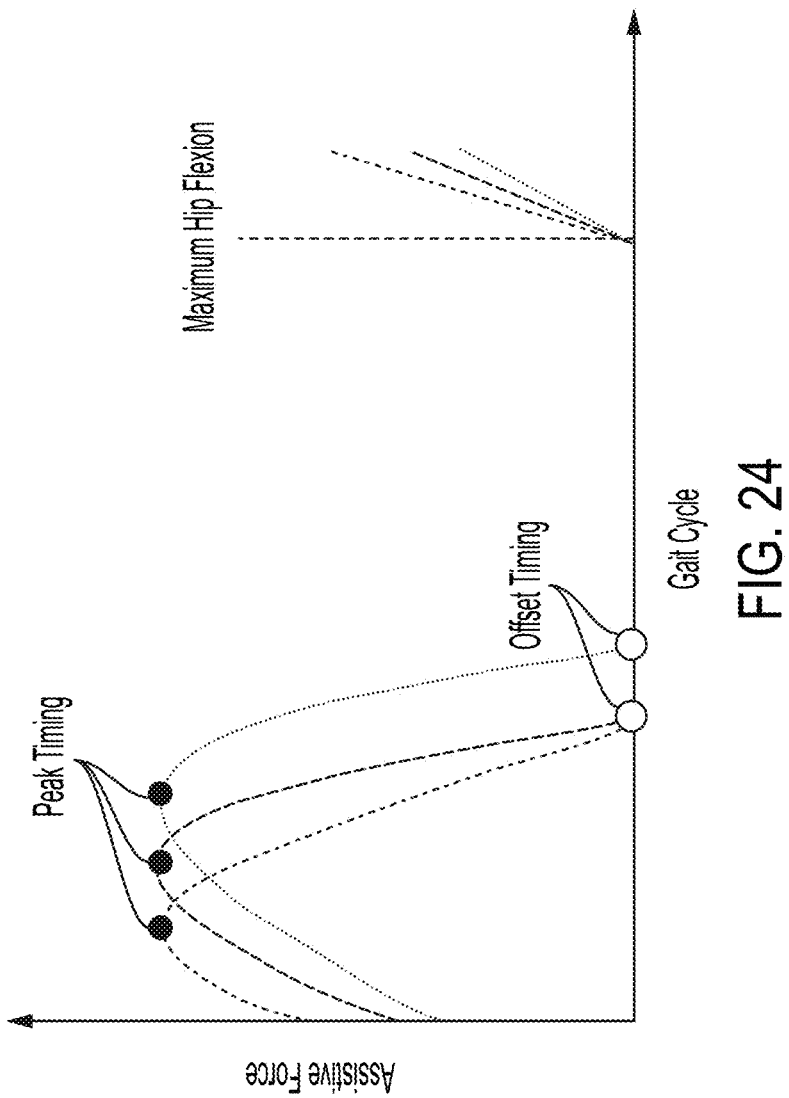
FIG. 24 shows an example of control variables (peak timing and offset timing) defining the assistive profile for each gait cycle, in accordance with embodiments of the present disclosure.

FIG. 24 shows an example of control variables (peak timing and offset timing) defining the assistive profile for each gait cycle. The onset timing is the detection of the maximum hip flexion for the current gait cycle and the magnitude of the peak force is 30% of the subject's body weight.

Cost Function: Metabolic Cost

Metabolic cost was computed directly in real-time using respiratory data. The estimated value can be calculated using either oxygen intake or oxygen and carbon dioxide combination (y=0.278*V(O2)+0.075*V(CO2)). Cost was estimated by low pass filtering two minutes of metabolic data.

Optimization Method: Bayesian Optimization

The resulting Bayesian optimization method based on a Gaussian process prior is described in the pseudocode below.

Pseudocode of implementation:

```
Main:
-------------------
Initial_data_points = get_initial_data_points_randomly;
% initialize parameters using prior information
Parameters = initialize(noise, landscape, amplitude)
% evaluate initial data points.
data = evaluate(initial_data_points)
% initialize candidate data points
new_candidate = initial_data_points
While (1)
    % optimize Gaussian processing hyper parameters
    parameters = optimize_parameters(parameters,data);
    % optimize the next candidate using posterior distribution
    new_candidate = optimize_candidate_points(parameters, data);
    If (convergence_criteria_meet)
        Break;
    end
    % if not converged, evaluate the data points
    data = evaluate (new_candidate);
end
function parameters = optimize_parameters(parameters, dat)
    % calculate initial log likelihood
    loglikelihood = calculate_log_likelihood (parameters, data)
    % initialize initial parameters
    optimal_parameter = parameters;
    % optimize hyperparameters of a prior to maximize log
likelihood of observed data
    for i=1:random_trials
        % reduce local minima by adding random points in the seed
        [new_parameter,loglikelihood] = gradient_search
(parameters + random_points, data)
        If(loglikelihood<loglikelihood_previous)
            Optimal parameters = new_parameter;
        end
    end
    parameter = optimal_parameter
end
function new_candidate = optimize_candidate_points(parameters, data);
    % find new candidate using gradient search method
    new_candidate = gradient_search( probability_of_improvement);
end
```

Experimental Validation of Optimization Approach

This section presents execution examples of presented algorithm. Benefited from the sample efficiency and non-parametric nature, the Bayesian optimization found an optimal peak and offset timing within 30 minutes across subjects (N=3, 1.25 m/s, hip exosuit). The average metabolic reduction was 19% (Table 2).

Figure 25A:
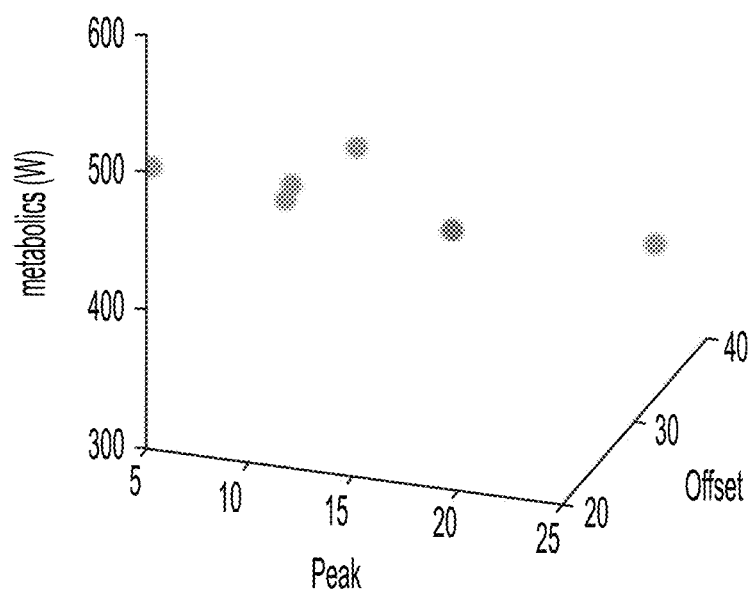
FIG. 25A, FIG. 25B, and FIG. 25C illustrate a process for defining an objective function landscape and identifying candidates for optimizing actuation parameters to maximize the objective function, in accordance with an embodiment of the present disclosure.
Figure 25B:
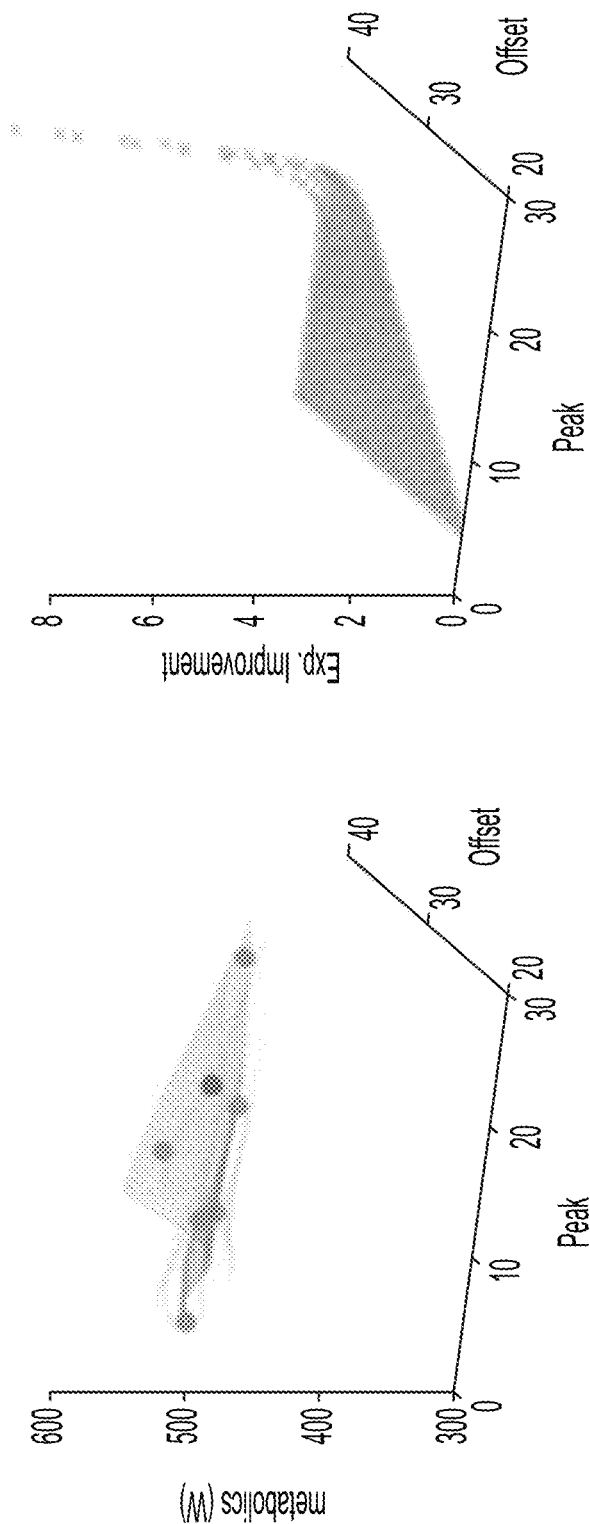
Figure 25C:
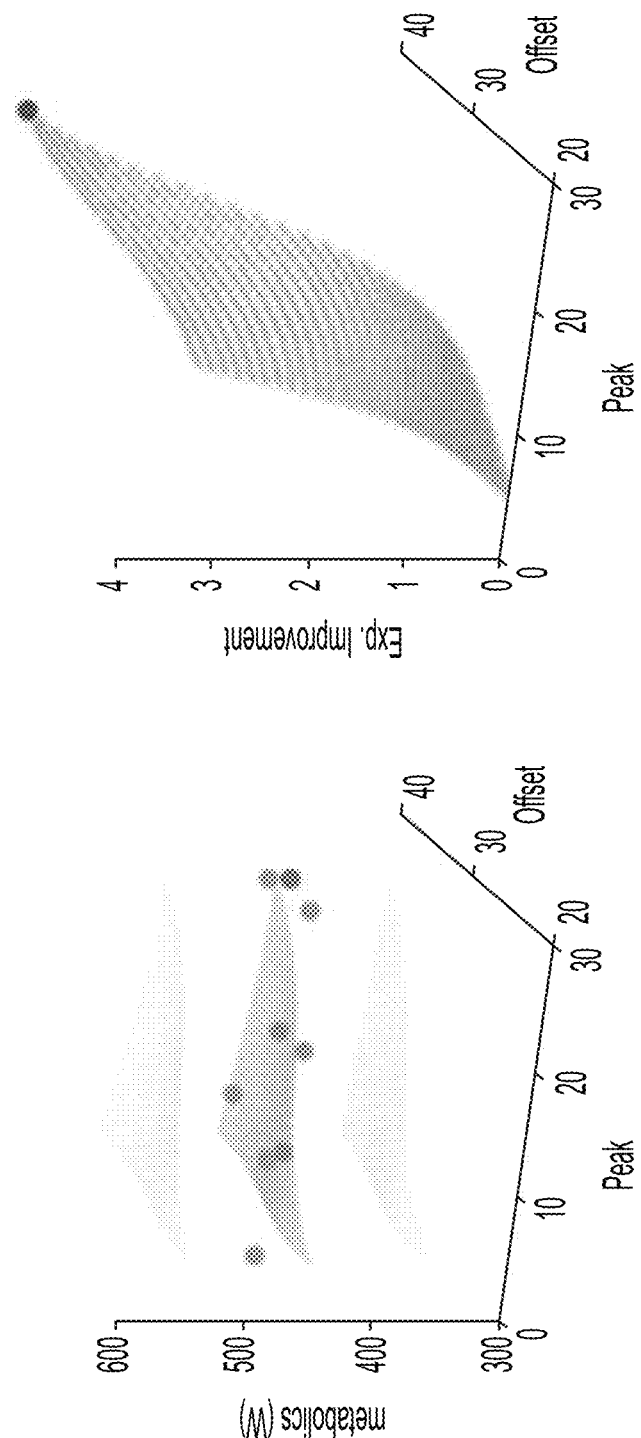

FIG. 25A, FIG. 25B, and FIG. 25C show the general process of the algorithm of an exemplary subject.

As described in the pseudo-code:

(a) FIG. 25A shows the algorithm evaluated the initial peak and offset timing points.

(b) FIG. 25B (left) shows the algorithm fitted data by estimating landscape, noise, and amplitude.

(c) FIG. 25B (right) shows that then Bayesian optimization was used to calculate the best possible next candidate.

(d) FIG. 25C shows that then the candidate points were evaluated by measuring metabolics of the parameter set, fitted the data (left), and selected the best possible candidate until the algorithm converges (right).

Table 2 shows initial pilot results using the algorithm described above (N=3, 4 trials). Current pilot results show that an optimal point can be found within 30 minutes, half of time compared to existing methods with greater reduction compared to no assistance condition.

TABLE 2

| Metabolic Reduction | Optimal point | Convergence time |
| --- | --- | --- |
| 19 ± 7% | Peak: 23 ± 2%<br>Offset: 39 ± 2% | 26 ± 3 mins |

Additional Representative Examples

Optimization approaches of the present disclosure may have various medical applications, as further detailed below.

Dorsiflexion Assistance

Representative systems and methods are now provided for optimizing dorsiflexion assistance. This application may be particularly useful for persons with impaired gait requiring assistance during the swing phase and heel strike of gait (e.g., stroke, foot drop, MS). As an example, stroke patients may have reduced control of ankle dorsiflexion which results in a reduced capability to lift their foot during the swing phase, this presents difficulties to guarantee sufficient ground clearance and may result in patients catching their toe during walking which is a risk of tripping or developing compensatory strategies with the hip joint that impact their walking efficiency, stability and their overall musculoskeletal health. Moreover, right after heel strike, there is the need to have a controlled dorsiflexion to avoid presentations such as "foot slap", in this case dorsiflexion assistance may help patients have a more controlled dorsiflexion speed after heel strike improving their overall walking dynamics.

The wearable system may be configured to provide active assistance in dorsiflexion (unilateral). A suitable objective function may target typical biological landing angle at heel strike. Landing angle is an important feature of healthy walking, during walking on flat terrain, healthy individuals typically land with the heel (positive foot to floor angle). Some patient population such as stroke patients or patients with dorsiflexion deficits may land neutrally or with their toes (negative foot to floor angle) because they are not able to sufficiently dorsiflex their ankle during the swing phase; this has implications on ground clearance and overall walking dynamics. Landing with a healthy-like ankle angle may improve walking efficiency and stability of patients.

As a proxy for the objective function, the controls approach could seek to minimize error between paretic "foot-to-floor" (hereinafter "FtF") angle at heel strike and non-paretic FtF angle at heel strike from the previous step. Foot to floor angle can be used to characterize whether patients land with their heel, neutrally or on their toes. Having a healthy-like or symmetric foot to floor angle may have implications on overall stability and walking efficiency. Patients are more likely to trip if their land with their toes as this may imply that they are not dorsiflexing enough during swing.

The wearable system, in an embodiment, may include at least one sensor capable of measuring rotational angle and velocity of the paretic foot and at least one sensor capable of measuring rotational angle and velocity of the non-paretic foot by using sensors such as IMUs. The foot to floor angle may be calculated when detecting a strike of the foot with the ground (this timing event can be identified by for example looking at sudden changes in foot speed or acceleration when contacting the ground). Depending on the patient population and available sensors, foot contact with the ground may not be detected robustly, in those instances, the peak foot to floor angle may be used as an objective function as described in the pseudocode above.

Suitable actuation parameters to optimize may include one or a combination of: magnitude of cable travel during actuation, duration of maximum amplitude of actuation, onset timing of actuation, onset rate of actuation, offset timing of actuation, and release rate of actuation. By commanding different magnitudes of cable travel during dorsiflexion, the system provides targeted assistance to the ankle which results in different dorsiflexion angles which has a direct impact in foot to floor angle. Previous studies and biomechanic intuition suggest that commanding more cable pull typically result in higher ankle dorsiflexion angles (within range of motion of the user), biomechanically this effect is similar to the effect that contraction the underlying muscles would have.

Below is a pseudocode implementation of this embodiment, in which the objective function is the landing angle (error_ftf_hs) which is minimized by modulating a dorsiflexion actuation magnitude (df_actuation_magnitude) within predefined boundaries (max_allowed_df_actuation_magnitude and min_allowed_df_actuation_magnitude), these boundaries have been defined so that the assistance doesn't go higher than our maximum actuation travel to guarantee comfort and safety, a lower limit on the assistance magnitude is defined as a safety parameter and can be defined by the user either as a threshold or on a patient-by-patient basis to guarantee that the users are getting a minimum amount of assistance to assist their walking. In this embodiment, the actuation parameter is not perturbed any further if the landing error angle is within a threshold. This works as the termination strategy for the algorithm.

```
1. global max_allowed_df_actuation_magnitude = 40000;
2. global min_allowed_df_actuation_magnitude = 2000;
3. global k_high = 0.2;
4. global k_medium = 0.1;
5. global k_low = 0.05;6.7. if (hs_detection_confirm_np == true) // Store nonparetic foot
angle at its heel-strike
8. {
9.      ftf_np_hs = measured_ftf_np;
10. }
11.
12. if (hs_detection_confirm_p == true) // Store paretic foot angle at its heel-strike
13. {
14.     ftf_p_hs = measured_ftf_p;
15. }
16.
17. error_ftf_hs = ftf_np_hs - ftf_p_hs; /I Error between pareti and nonparetic angles
18.
19. void loop()
20. {
21.     //Update dorsiflexion actuation magnitude DS dorsiflexion assitance mode is
22.       triggered and paretic toe-off is detected.
23.     if (df_assistance_mode == true && to_detection_confirm_p == true)
24.     {
25.         if (error_ftf_hs >= threshold1)
```

```
26.          {
27.            df_actuation_magnitude = (1 + k_high) * df_actuation_magnitude;
28.          }
29.          else if (error_ftf_hs >= threshold2 && error_ftf_hs < threshold1)
30.          {
31.            df_actuation_magnitude = (1 + k_medium) * df_actuation_magnitude;
32.          }
33.          else if (error_ftf_hs >= threshold3 && error_ftf_hs < threshold2)
34.          {
35.            df_actuation_magnitude = (1 + k_low) * df_actuation_magnitude;
36.          }
37.          else if (error_ftf_hs < 0)
38.          {
39.            df_actuation_magnitude mag = (1 − k_low) * df_actuation_magnitude;
40.          }
41.          // Ensure dorsiflexion actuation magnitude is within the allowable range
42.          if (df_actuation_magnitude > max_allowed_df_actuation_magnitude)
43.          {
44.            df_actuation_magnitude = max_allowed_df_actuation_magnitude;
45.          }
46.          else if (df_actuation_magnitude < min_allowed_df_actuation_magnitude)
47.          {
48.            df_actuation_magnitude = min_allowed_df_actuation_magnitude;
49.          }
50.       }
51.       else
52.       {
53.          df_actuation_magnitude = 0;
54.       }
55. }
```

In a related embodiment for optimizing dorsiflexion assistance, rather than driving paretic FtF to match the FtF of the non-paretic foot, the optimization approach may be configured to drive paretic FtF angle to an objective value determined empirically from literature or studies (e.g., approximately 20 degrees). The wearable system may be configured to provide active assistance in dorsiflexion (may be unilateral or bilateral), with at least one sensor capable of measuring rotational angle of the assisted foot (or two sensors if both feet are being assisted).

Plantarflexion Assistance Optimization

Representative systems and methods are now provided for optimizing plantarflexion assistance. This application may be particularly useful for persons with impaired gait requiring assistance during the push-off phase of walking (e.g., stroke, MS). These patient populations may have reduced forward propulsion capabilities which may result in walking deficits such as increased metabolic cost of walking or reduced walking speed and could benefit from ankle plantarflexion assistance.

The wearable system may be configured to provide active assistance in plantarflexion (unilateral). A suitable objective function may be maximizing gait symmetry between paretic and non-paretic limbs, non-symmetric walking is typically associated with low-walking efficiency and/or reduced stability.

As a proxy for the objective function, the controls approach could seek to minimize error between anterior-posterior ground reaction force (APGRF) peaks, or as a Root Mean Square Error between the two APGRF profiles defined from heel-strike to toe-off. APGRF is the maximum value of the ground reaction force pointing in the direction of walking and therefore is a measurement that correlates with forward propulsion.

The wearable system, in an embodiment, may include at least one sensor capable of measuring ground reaction forces such as the anterior-posterior ground reaction force, which is a measure of the reaction force on the ground from the user propelling themselves forward. Alternative error measures can also be used.

Suitable actuation parameters to optimize may include one or a combination of: magnitude of actuation, duration of maximum amplitude of actuation, onset timing of actuation, onset rate of actuation, offset timing of actuation, and release rate of actuation.

For clarity, the systems and methods described in Representative Example #1 may be utilized to optimize forward propulsion in healthy persons in like manner by providing plantarflexion assistance. This application may be particularly useful for persons with impaired gait requiring assistance during the push-off phase of walking (e.g., stroke, MS). The wearable system may be configured to provide active assistance in plantarflexion, with sensors capable of measuring ankle speed and assistive force. A possible objective function proxy for estimating increased contribution of a joint to forward propulsion may be maximizing positive power delivered to the joint. Suitable actuation parameters to optimize may include one or a combination of: magnitude of actuation, duration of maximum amplitude of actuation, onset timing of actuation, onset rate of actuation, offset timing of actuation, and release rate of actuation.

Hip Extension Assistance Optimization

Representative systems and methods are now provided for optimizing hip extension assistance. This application may be particularly useful for persons with impaired hip function, which may result in walking deficits such as reduced forward propulsion. These patients may benefit from hip extension assistance. During healthy walking, hip extension and trailing limb angle are contributors to forward propulsion and other important characteristics of gait. During typical healthy push-off, the hip, knee, and foot are positioned such that a line drawn between the 5th metatarsal of the foot and the greater trochanter of the hip will form an angle behind a vertical axis at the individual's center of mass. This angle is often referred to as the trailing limb angle. With the limb in this position, propulsion forces generated during plantar flexion will have an anterior-posterior vector to them, and will assist in propelling the body forward. In populations with impaired hip function, a common result is a reduced or nonexistent trailing limb angle. As this angle is reduced, the anterior-posterior vector of the propulsion forces generated during pushoff will be reduced, which can result in substantially reduced forward propulsion in these populations. Such individuals would be sensitive to changes in actuation parameters for hip extension, making hip extension assistance optimization particularly useful for this population. Hip assistance (extension and flexion) may also be assistance for stabilizing the body during a step and hip flexion assistance is also important around the time of push off as the wearer swings their leg forward. Different parameters would be use for hip flexion assistance.

The wearable system may be configured to provide active assistance in hip extension (unilateral or bilateral). A suitable objective function may target typical biological trailing limb angle during terminal stance. This is the angle between the global vertical axis and the line defined by a point on the pelvis (often the greater trochanter or the hip joint center) and a point on the stance foot (often the fifth metatarsal head or the center of pressure). Compared to healthy walking, people with impaired gait may have a lower trailing limb angle during terminal stance. As the trailing limb angle increases, more of the ground reaction force goes into forward propulsion; as the trailing limb angle decreases, more of the ground reaction force goes into vertical components. Therefore, increased trailing limb angle during terminal stance (when the majority of forward propulsion occurs) may be related to increased forward propulsion.

Using a proxy for the objective function of increasing the anterior-posterior propulsion vector during pushoff, the controls approach could seek to minimize error between trailing limb angle at pushoff and an objective value determined empirically from literature or studies.

The wearable system, in an embodiment, may include at least one sensor capable of measuring hip extension. The sensor or combination of sensors can be embodied by one or more inertial measurement units (IMUs) or alternative sensors capable of measuring, for example, thigh angular position, shank angular position, and foot angular position for the assisted limb. By measuring thigh, shank, and foot angular position together, we are able to calculate lower-limb kinematics, the orientation of the thigh, shank, and foot relative to one another. Incorporating all three orientations together allows us to approximate the trailing limb angle as described above. Additionally, taken independently, the thigh, shank, and foot angular position are also useful for detecting events during the gait cycle. For example the foot's angular position may allows the controller to determine when specific gait events occur, such as push-off and the foot's initial contact with the ground.

Suitable actuation parameters to optimize may include one or a combination of: magnitude of actuation, duration of maximum amplitude of actuation, onset timing of actuation, onset rate of actuation, offset timing of actuation, and release rate of actuation.

Depending on the application, it may be desired to optimize hip extension by using the non-paretic leg as a reference as opposed to using data from literature or previous study. This approach may be more suitable for patients that have a unilateral deficit on one leg and that haven't developed significant compensatory strategies on their non-paretic leg. The main benefit of this is that the non-paretic leg will adapt to different speeds and will be more individualized to the person as opposed to use reference average data. To this end, another embodiment for optimizing hip extension assistance may include a wearable system configured to provide active assistance in hip extension (unilateral), with at least one sensor capable of measuring trunk angular position, at least one sensor capable of measuring thigh angular position, and at least one sensor capable of measuring foot angular position for the assisted limb(s). A suitable objective function may target typical biological trailing limb angle at push-off, and as a proxy for the objective function, the controls approach could seek to minimize error between paretic hip extension angle at heel rise and non-paretic extension angle at heel strike from the previous step. Suitable actuation parameters to optimize may include one or a combination of: magnitude of actuation, duration of maximum amplitude of actuation, onset timing of actuation, onset rate of actuation, offset timing of actuation, and release rate of actuation.

Generic Unilateral Assistance Optimization

Representative systems and methods are now provided for generic unilateral assistance optimization. This application may be particularly useful for persons with impaired gait requiring assistance on one side of their body (hemiparesis) (e.g., stroke, MS).

Consider, by way of example, the specific case of an individual recovering from stroke. Characteristics of post-stroke hemiparetic gait can include impaired movement on the affected (paretic) side, which may include (among other things):

a. Weakness in the gastrocnemius and soleus (plantar flexor) muscles on the affected side, resulting in reduced forward propulsion force generated during pushoff;

b. Weakness in the tibialis anterior (dorsi-flexor) muscles on the affected side, resulting in reduced ground clearance during swing and possible compensatory strategies to achieve ground clearance, such as hip hiking or hip circumduction; and c. Reduced stability during weight bearing and pushoff of the affected leg, which may limit the ability of the individual to tolerate weight bearing during single limb support on the affected side, and may require use of an assistive device such as a walker or cane for additional support.

The above unilateral deficits and weaknesses contribute to an asymmetric walking pattern with respect to the timing, spatial movements, and forces generated by each leg.

The wearable system may be configured to provide active assistance to address one or more specific impairments in this population, for example by addressing point a) above by providing unilateral assistance to the wearer's affected limb during plantarflexion. A suitable objective function in this case may be maximizing the overall symmetry between each leg during respective portions of the gait cycle. The goal of perfect symmetry would indicate that both legs (paretic and non-paretic) are contributing equally to forward during walking, as is expected in healthy individuals. The wearable system may be configured to provide active assistance in plantarflexion (unilateral). A suitable objective function may be maximizing gait symmetry between paretic and non-paretic limbs As a proxy for the objective function, the controls approach could seek to minimize error between paretic single-limb support time and the previous non-paretic single-limb support time (temporal symmetry). Temporal symmetry is an appropriate proxy for overall walking symmetry because a) both symmetries are influenced by the same deficits described above for this population, and b) temporal symmetry is accurate and feasible to measure with the available sensors in the system. As a proxy for the objective function, the controls approach could seek to minimize error between paretic step time and the previous non-paretic step time (temporal symmetry).

The wearable system, in an embodiment, may include at least one sensor capable of measuring rotational velocity of each foot. Using sensors to measure the rotational velocity of each foot, we can analyze these data to identify specific events in the gait cycle, such as paretic and non-paretic toe-off or heel strike. By detecting specific gait events we can divide the gait cycle into discrete phases for our optimization algorithms. For example, the paretic single-limb support time would be defined as the duration of time between the non-paretic toe-off event and the non-paretic heel strike event. When this is compared against the duration of the previous non-paretic single limb support, we can evaluate the difference (error) between these two values and incorporate this input into our optimization loop.

Suitable actuation parameters to optimize may include one or a combination of: magnitude of actuation, duration of maximum amplitude of actuation, onset timing of actuation, onset rate of actuation, offset timing of actuation, and release rate of actuation.

Optimization Using Suit-Body Interaction

A controller can be applied to optimize objective functions that characterize the interaction between the suit and the wearer.

For applications in healthy patient population during walking, an algorithm may optimize user self-reported comfort while walking on the exosuit. An embodiment may include a hand-held device as an input of the comfort of the wearer. The wearer may rate the comfort or perception of how assistive is the system with the current settings by pressing some button in the hand-held. An example rating will be (1-5) where 1 is much less assistive than the previous timing condition, 3 is as assistive as the previous condition and 5 is significantly more assistive than the previous condition.

The parameters to be optimized could include the onset of the actuation, since, as explained previously, this parameter has a big impact in the individualization of the assistance.

As the user walks, the system will vary the onset timing and wait for the user to provide input thought the device, based on the rating, the system would then move the onset parameter to a different value in the proximity using a method equivalent to the gradient descent method described above and modify the timing in the direction in which the user feels the system is more comfortable compared to the previous condition. It would also be possible to use pressure sensor data between the wearer and the device as a measure for comfort to the wearer. For example, if pressure was very high and localized that could be a measure of discomfort.

Optimization Using Performance of the System

A controller may have as an objective optimizing an objective function related to the performance of the device. As an example embodiment and algorithm may be set-up to optimize the average positive power delivered to a biological joint during walking while minimizing the power consumption of the system.

An example objective function will weight those two objectives based on priorities for the system. For instance, the objective function could be defined as follows: $F=\alpha PositivePower+\beta BatteryConsumption$. The weighting coefficients may be constant and defined by the system designer, variable defined by the user through a input device (hand-held remote, etc.) or varied automatically by the algorithm based on the conditions of the system, for instance the importance associated to battery consumption may be 0 when the system has full battery but 0.8 when the battery level is very low. For purposes of this example, the coefficients will be constant.

An algorithm may optimize timing or magnitude variables such as the onset of the actuation to maximize the proposed objective function. The onset of actuation has an effect both on average positive power and on battery consumption which qualifies it as a suitable control parameter.

Controls Architecture Including Outer Optimization Loop and Inner Reactive Loop

Systems and methods of the present disclosure, in various embodiments, may include a control system architecture configured with an outer "optimization-related" loop consistent with the above-described optimization approaches, and an inner "reactive" loop for providing rapid controls adaptation in response to sudden changes (e.g., walking on uneven terrain, avoiding obstacles, or changing locomotive speed). As configured, the wearable system is free to dynamically react to sudden circumstances without being constrained by, or instead affecting, optimization efforts running over a longer period of time.

Figure 26:
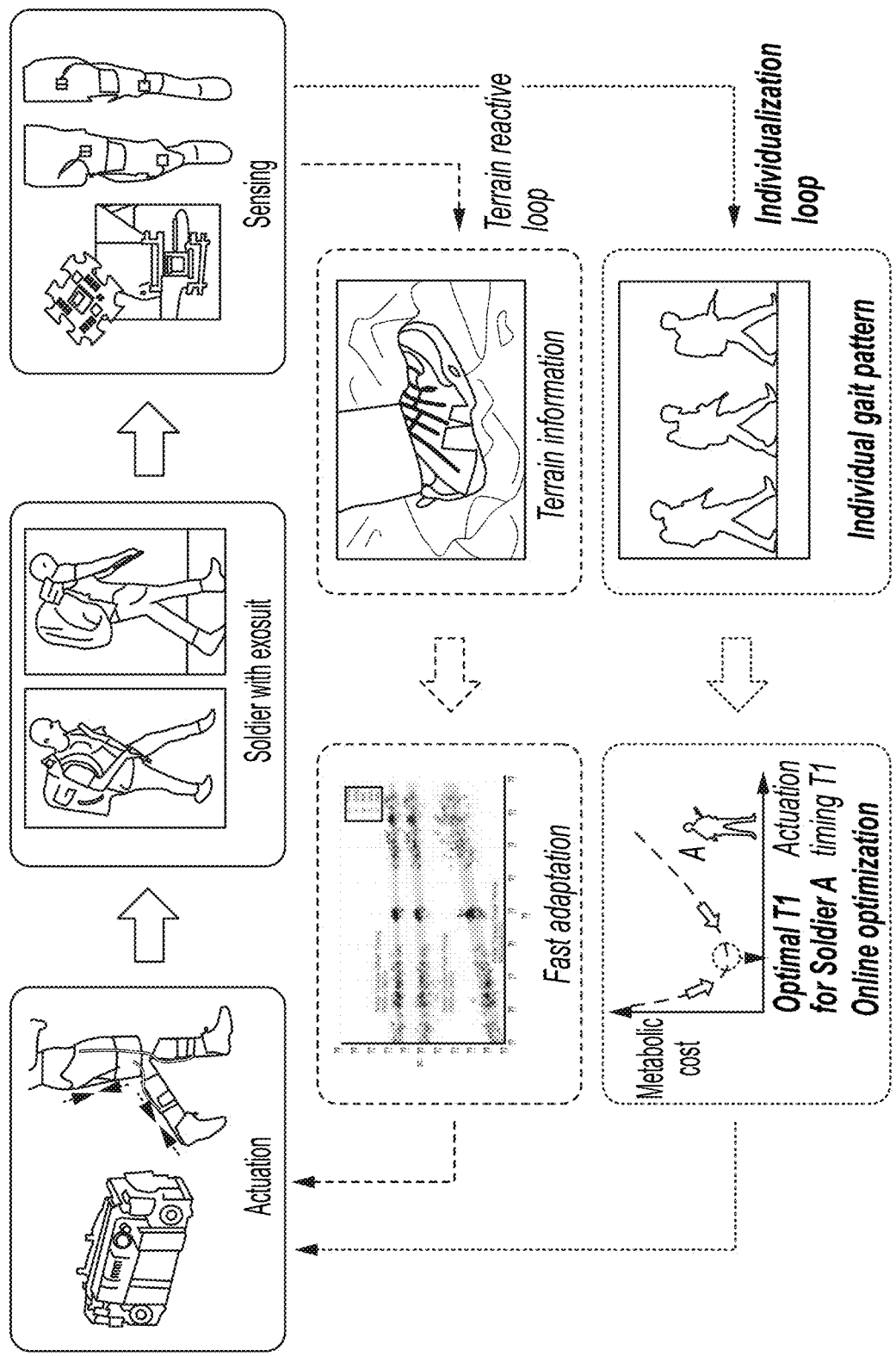
FIG. 26 is a flowchart illustrating a control system configured with an outer optimization loop for optimizing an actuation parameter(s) to maximize/minimize and objective function, and an inner reactive loop for providing rapid controls adaptations, in accordance with embodiments of the present disclosure.

More specifically, the proposed approach is summarized in FIG. 26 and further described in more detail below. The control algorithm is divided in two loops:

1) An outer optimization loop that utilizes on-board sensors to detect how the user walks and adapts the assistance parameters to maximize an objective function which measures the outcome of wearing the system, the optimization process typically takes a few iteration loops to converge to the optimal value. Example objective functions could be minimizing the metabolic cost of walking for healthy individuals, improved walking symmetry for impaired patients, etc.

2) An inner reactive loop that is continuously running detecting events within the current step to have a high-frequency adaptation to terrain or detection of activities, if some specific event is detected during a step, it may not be desired to actuate at the optimal timing found by the outside loop. An example embodiment of this would be an algorithm that always triggers based on the optimal timing decided by the outer optimization loop but that if it detects that the user is going over an obstacle or going down an steep incline will get out of the way and not assist at all. Another example would be an algorithm that uses optimal actuation parameters but if during a specific step detects a rock or a bump on the ground, it will shift this optimal timing by a specific gait % based on biomechanics knowledge of changes in joint kinetics when stepping on different type of bumps.

Figure 27A:
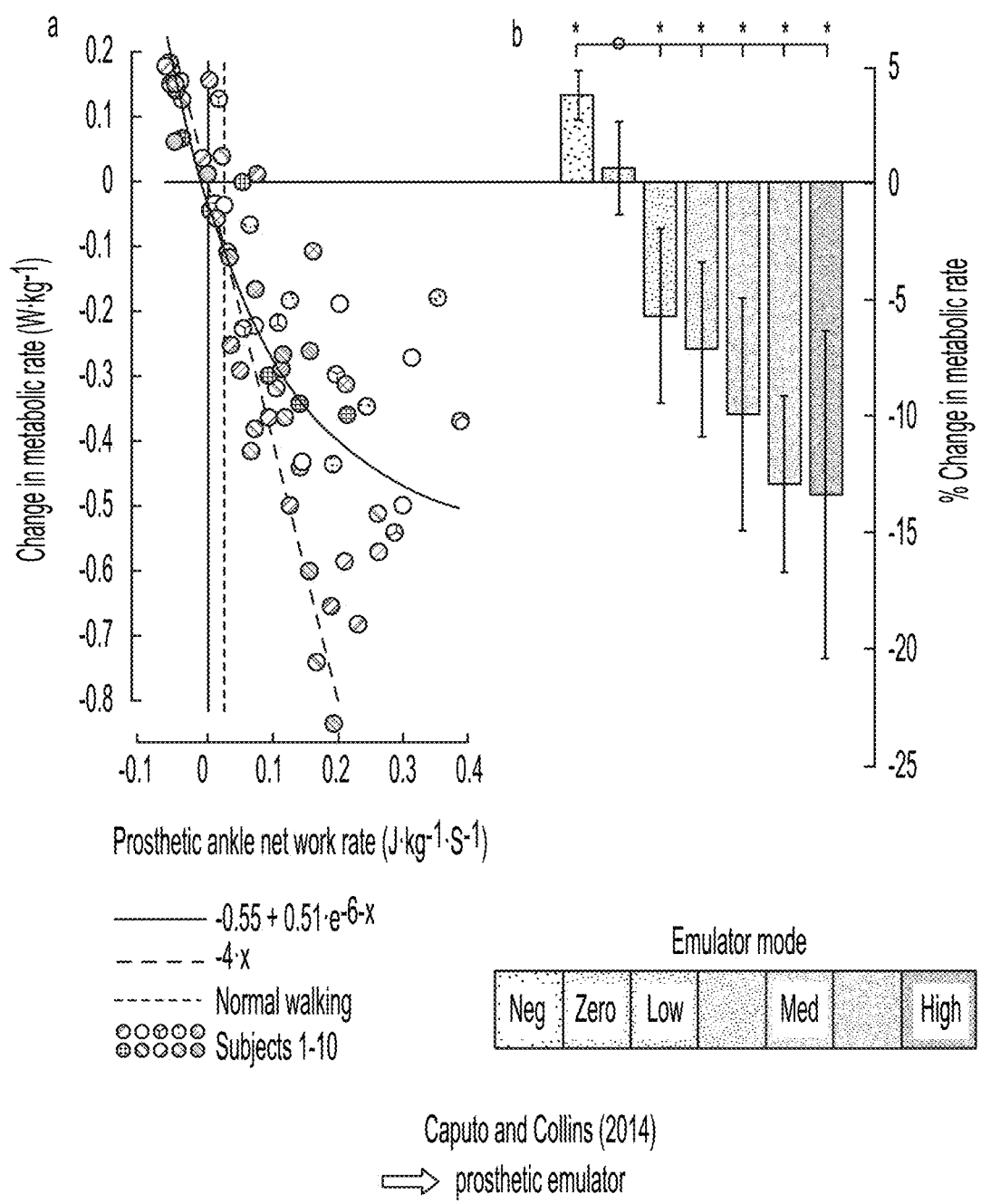
FIG. 27A, FIG. 27B, and FIG. 27C illustrates experimental data validating average positive power delivered to the ankle joint as a proxy for metabolic benefit.
Figure 27B:
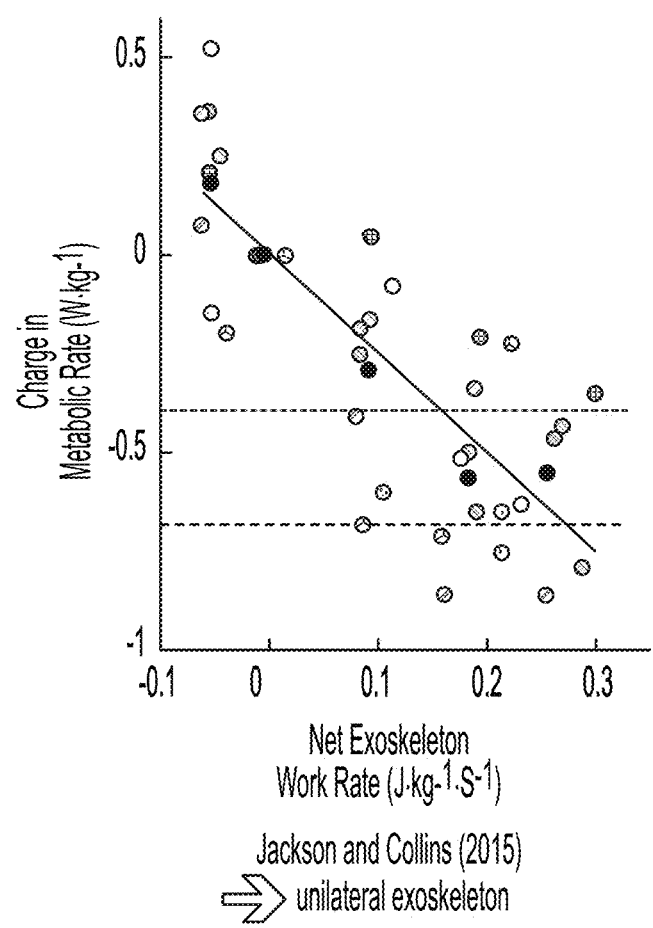
Figure 27C:
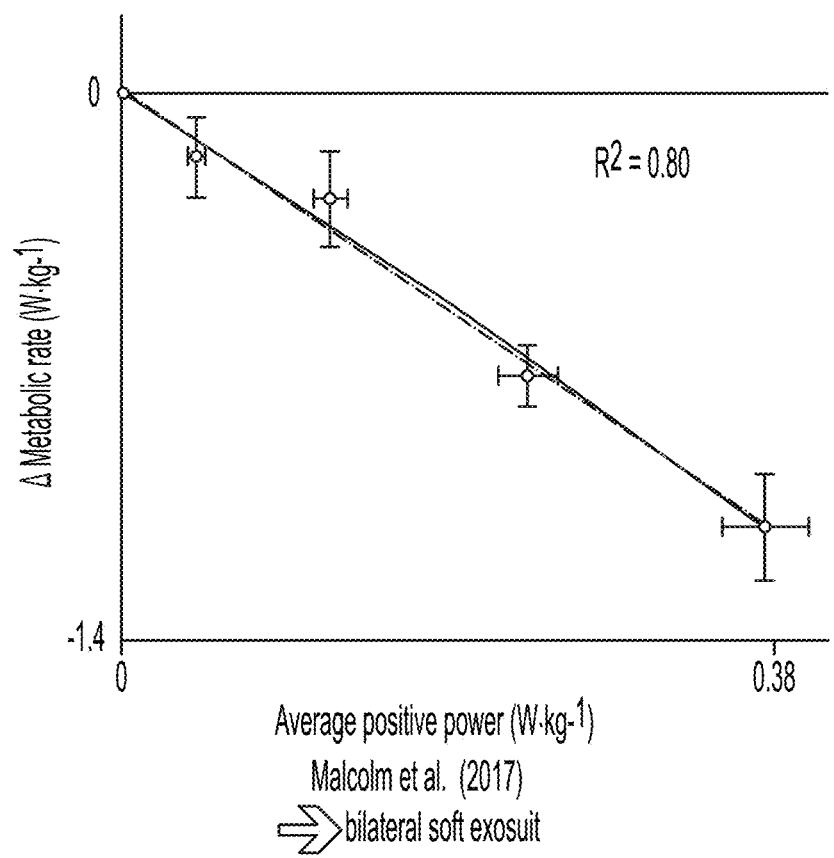

The following multi-dimensional optimization implementation has the goal of minimizing the metabolic cost of walking for different individuals. Measuring metabolic cost directly requires sensors that are intrusive and not suitable for every day wear, for instance, a mask to measure pulmonary gas exchange. However, for the ankle joint, maximizing the positive power delivered to the joint could be used as a proxy for the metabolic benefit; the more positive power that the system delivers to the joint, the more metabolic reduction the system will produce. This hypothesis has been confirmed during our protocols and other literatures as shown in FIG. 27A, FIG. 27B, and FIG. 27C.

Figure 28B:
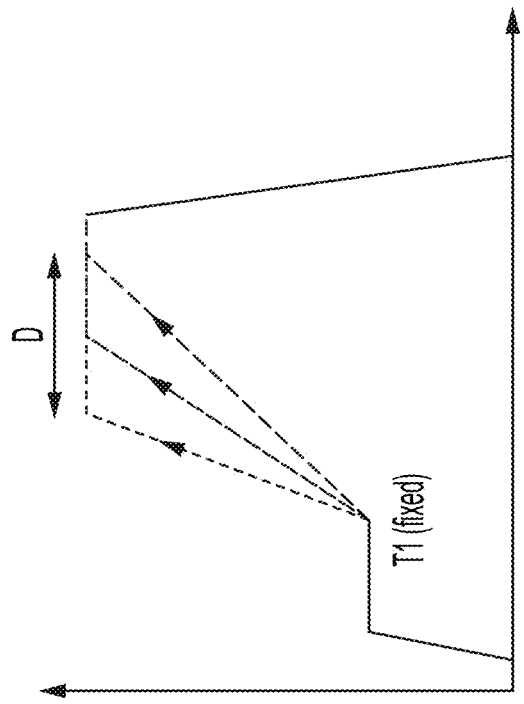
FIG. 28A, FIG. 28B, and FIG. 28C illustrate a two-step optimization process in which one control variable is frozen while another control variable is modified until an optimum is found, in accordance with an embodiment of the present disclosure.
Figure 28A:
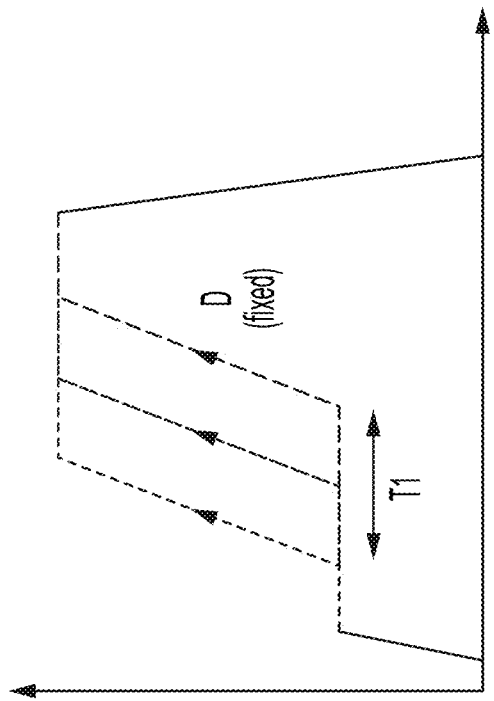
Figure 28C:
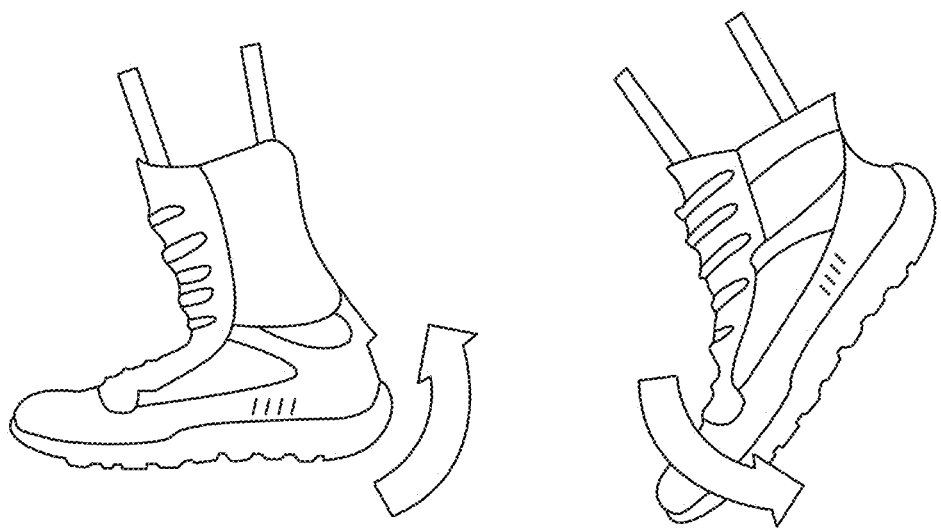

The selected optimization control variables for this study are characterized by the onset of the assistive profile (T1; when the cable starts to pull, which should be related to the start timing of push-off) and by the slope or duration of the assistance (D; how fast the cable pulls, which should be related to the ankle joint velocity during push-off). In order to simplify the problem, we define a 2-step optimization process in which the algorithm will freeze one of the control variables while modifying the other one and then switch this process until it finds the optimum as shown in FIG. 28A, FIG. 28B, and FIG. 28C.

The parameter space for these two variables (T1, D) may change between different subjects, different walking conditions (walking speed, step length, etc.), different systems (capabilities of the mechanics, stiffness of the suit-human interface, etc.), or by a combination of these. In order to mitigate this problem, an algorithm that defines whether the current point in the search space is "feasible" or not has been implemented. Feasibility in this case is achieved when the system is able to deliver a force profile consistently between consecutive steps; if there is too much variability in the achieved peak force, the algorithm defines this as a failure point and won't consider this during the optimization.

Figure 29:
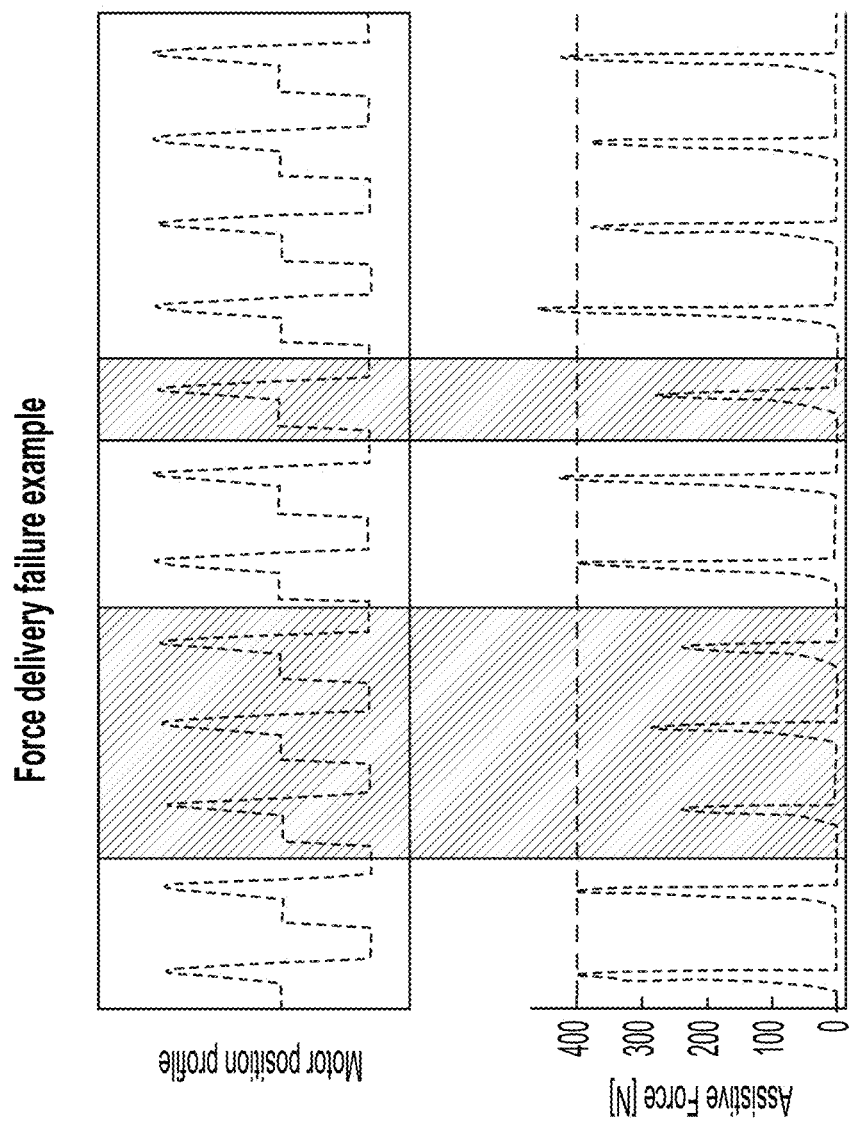
FIG. 29 illustrates an actuator position profile and an assistive force profile depicting inconsistency in force delivery indicative of a failed point in the optimization process, in accordance with embodiments of the present disclosure.
Figure 30A:
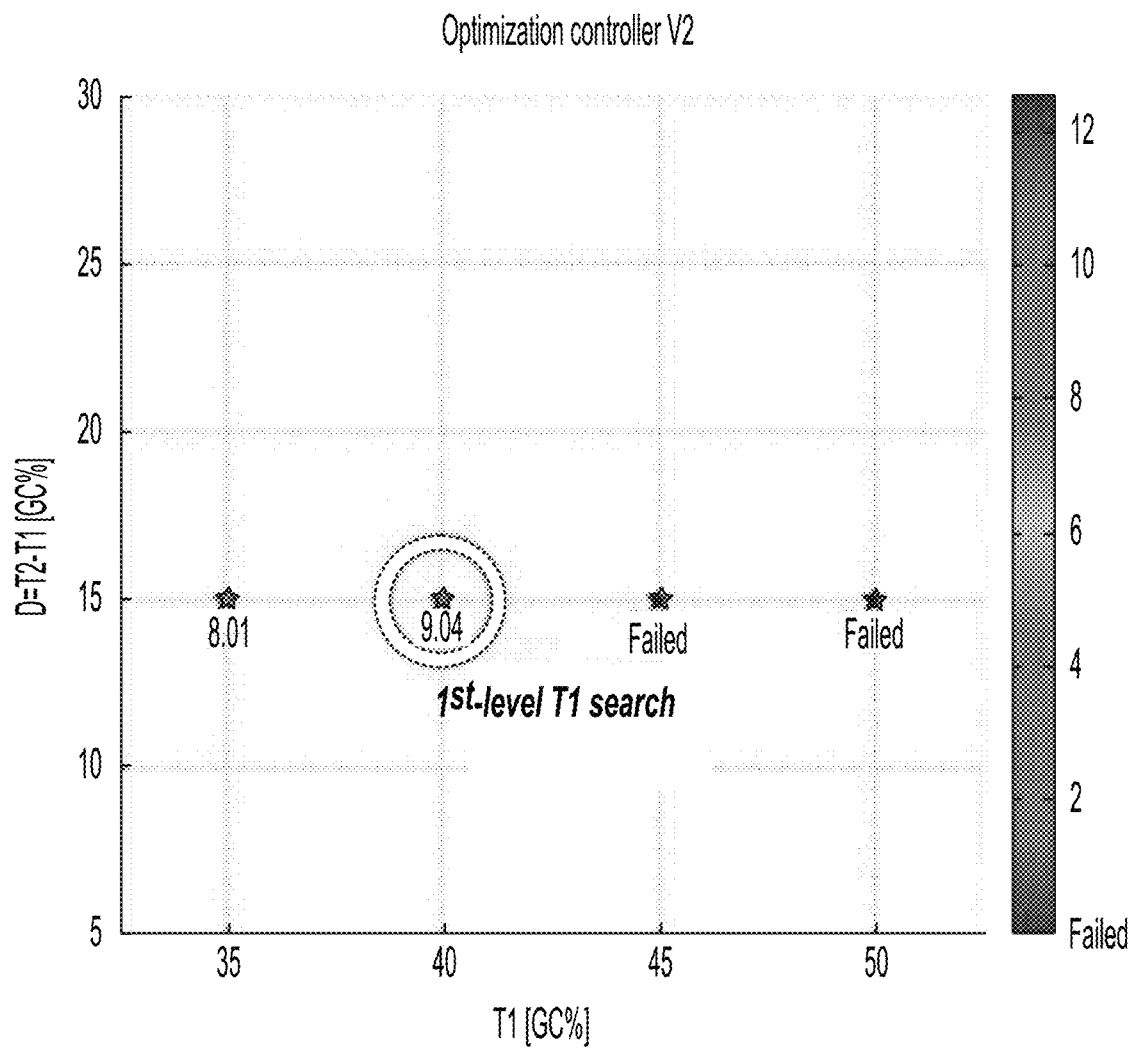
FIG. 30A, FIG. 30B, FIG. 30C, FIG. 30D, and FIG. 30E how an example of how the optimization works between different steps while a subject is walking on a treadmill at a speed of 1.5 m/sec, in accordance with an embodiment of the present disclosure.
Figure 30B:
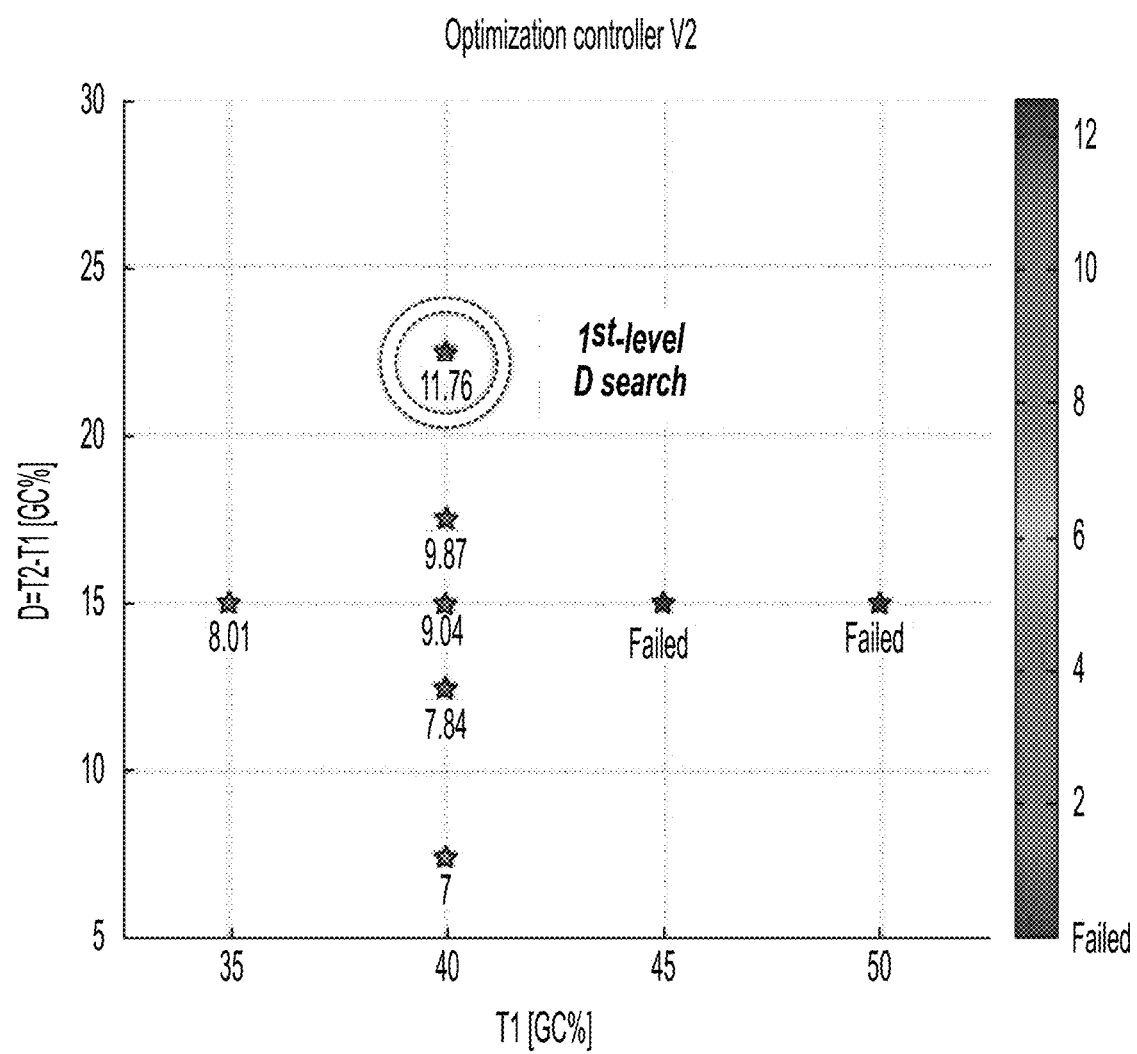
Figure 30C:
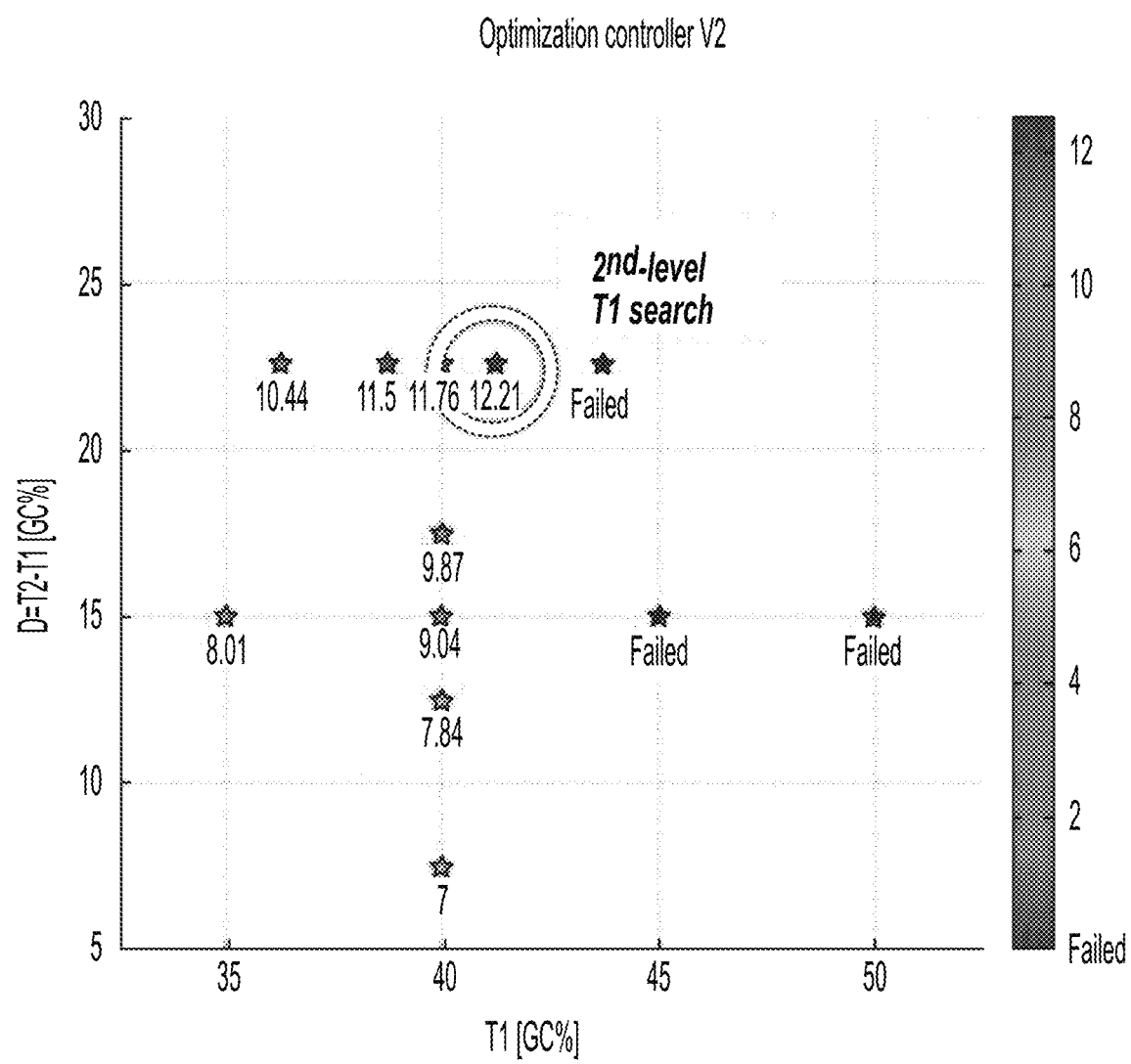
Figure 30D:
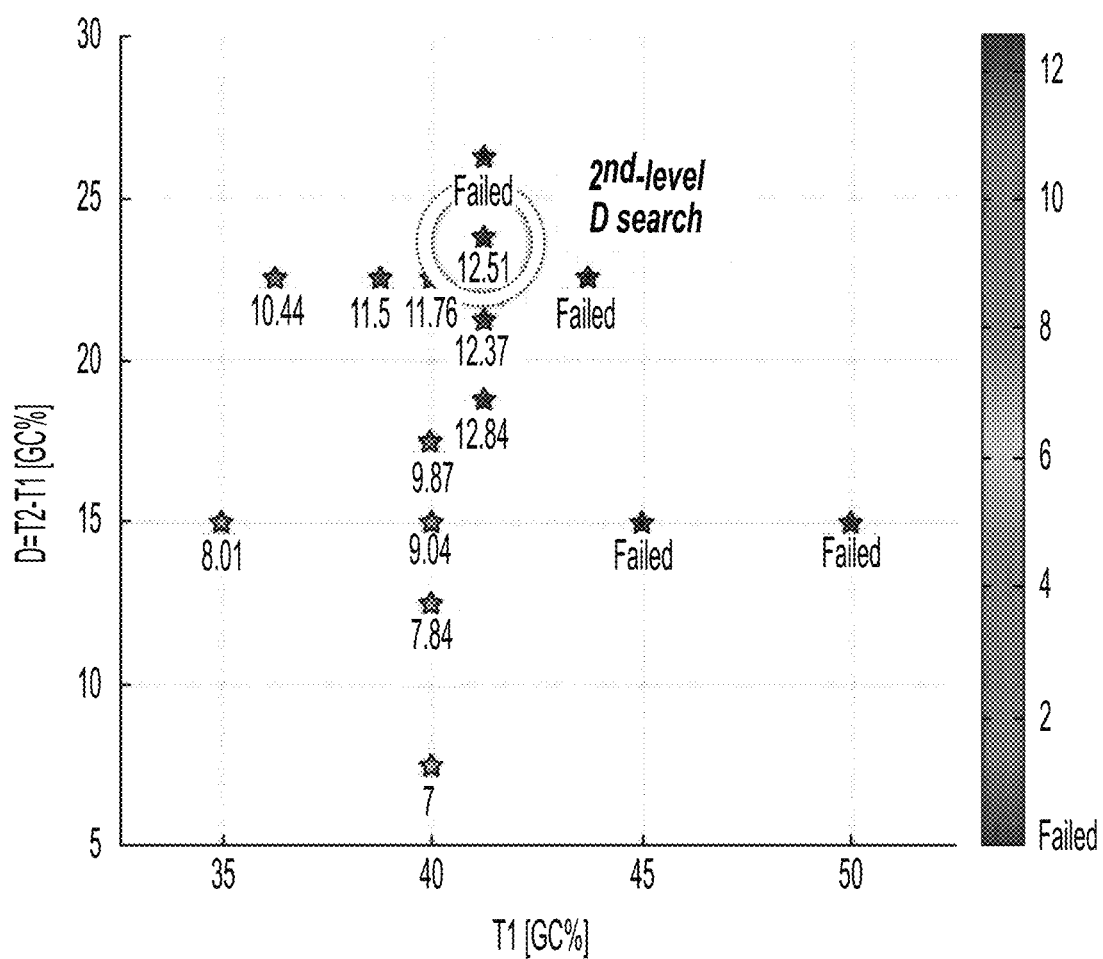
Figure 30E:
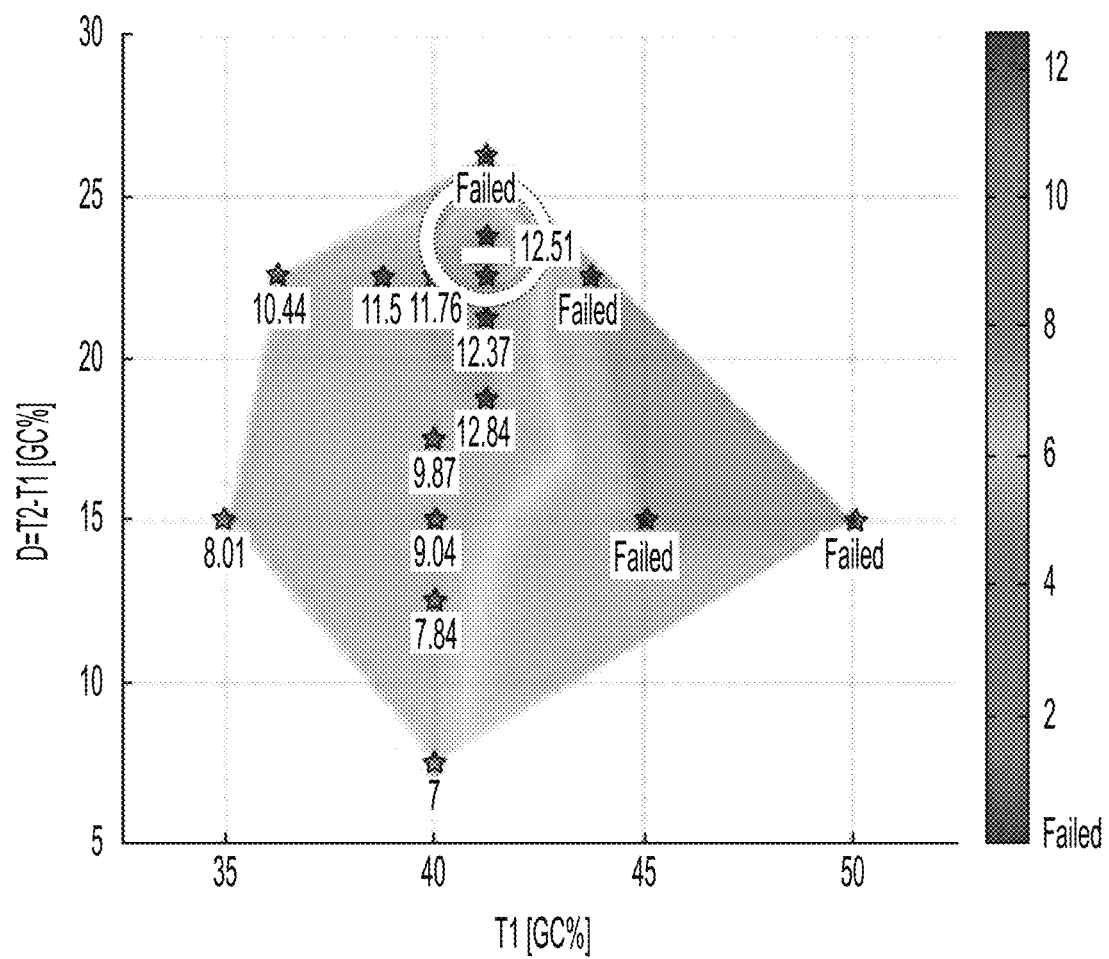

An example of a point in the parameter space that is not-feasible is shown in FIG. 29. The point does not result in consistent force delivery. The peak assistive force significantly drops from the desired value (400 N), even while a same motor profile is applied. Therefore the algorithm does not consider this point as part of the search space. Another condition that could be added to constrain available parameter space is maximum electrical power consumption for each condition, therefore, the algorithm would only consider points that consume less electrical power than a defined threshold; this could be of interest when the system has to be able to assist during a long distance to make sure that the battery will last.

The multi-level, multi-parameter alternating optimization, searches the best value for the two parameters (T1,D) in rotation and reduces the step width as the search advances to improve granularity of the optimization.

Example steps of this optimization will be the following:
i) Starting point (given or initial guess)➔ T10, D0
ii) 1st-level T1 search (while fixing D0) in 5% resolution ➔ T11
iii) 1st-level D search (while fixing T11) in 5% resolution ➔ D1
iv) 2nd-level T1 search (while fixing D1) in 2.5% resolution➔ T12
v) 2nd-level D search (while fixing T12) in 2.5% resolution➔ D2
vi) . . .

FIG. 30A, FIG. 30B, FIG. 30C, FIG. 30D, and FIG. 30E show an example of how the optimization works between different steps while a subject is walking on a treadmill at a speed of 1.5 m/sec. This algorithm shows that the delivered power can be increased from 8.0 W to 12.5 W by optimizing the onset and duration of the actuation; this increase is very significant and greatly improves the performance of the system. The following figure also shows how the algorithm is able to dynamically define the feasible search space by discarding points in which the force cannot be delivered consistently; the conditions labeled as "failed" and the blue area in the following graph are the search space that is not achievable for this subject and walking condition.

FIG. 31 summarizes the results when testing this algorithm on 6 subjects walking at 1.5 msec comparing two different algorithm, an algorithm that uses the same timing for every individual and an optimization algorithm that maximizes delivered positive power to the ankle joint. This demonstrates that i) the positive ankle power is increased for every subject by using this optimization approach, ii) that as a consequence, the metabolic benefit of the subjects measured by wearing a COSMED gas exchange measurement system is also improved. This also shows that the selection of positive power as a proxy is valid and iii) that the optimal timings are different for each subject which highlights the need for optimization.

Figure 32:
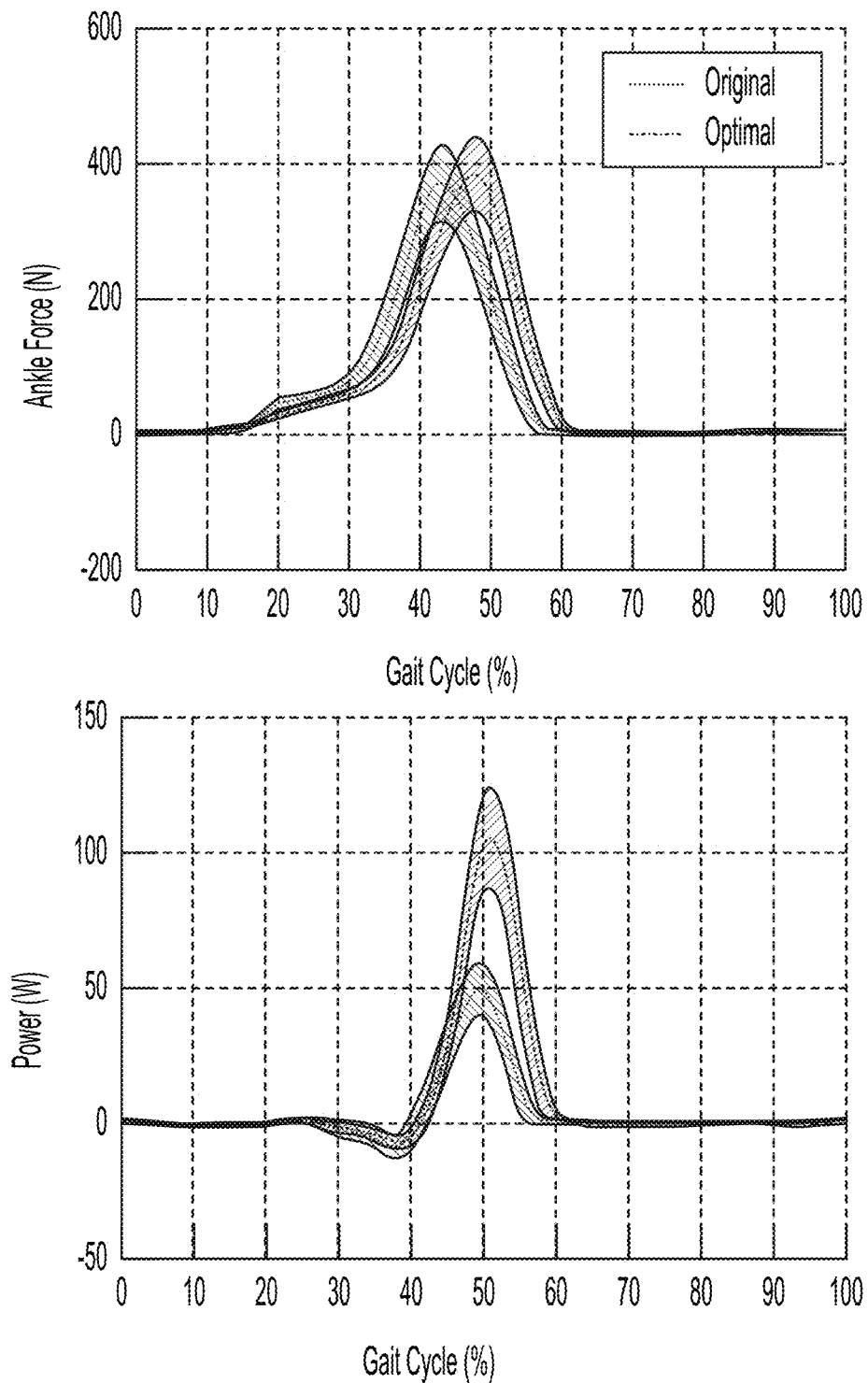
FIG. 32 shows original and optimized assistive force and power profiles, in accordance with embodiments of the present disclosure.
Figure 32:
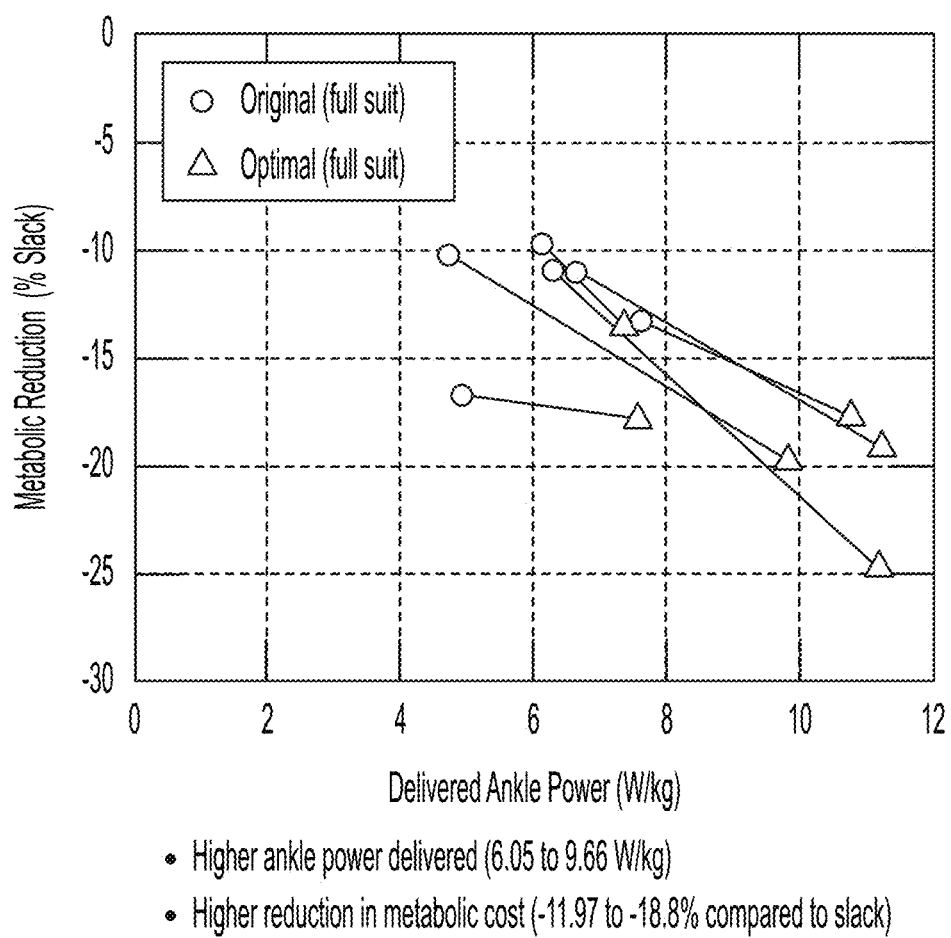
Figure 33A:
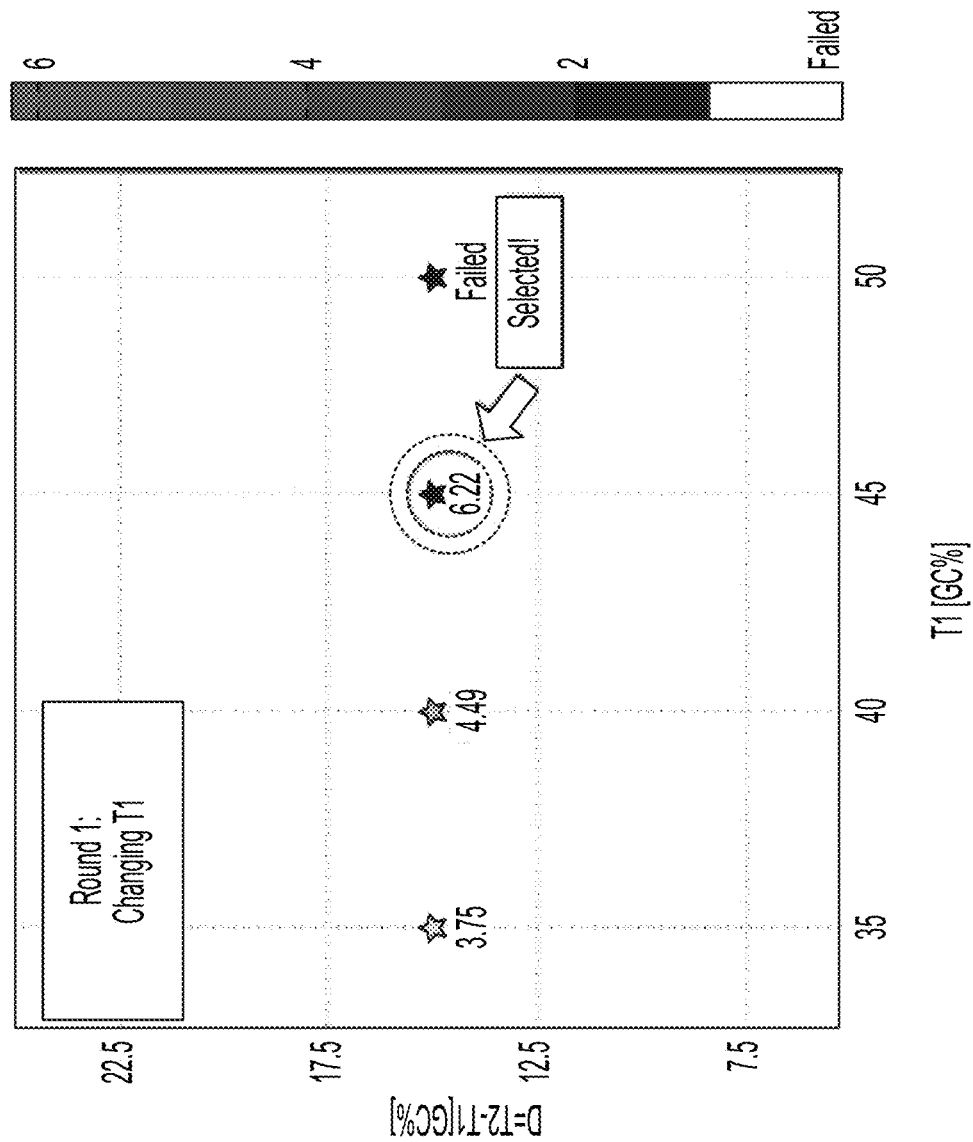
FIG. 33A, FIG. 33B, FIG. 33C, FIG. 33D, and FIG. 33E an approach for optimizing actuation timing to minimize power consumption, in accordance with an embodiment of the present disclosure.
Figure 33B:
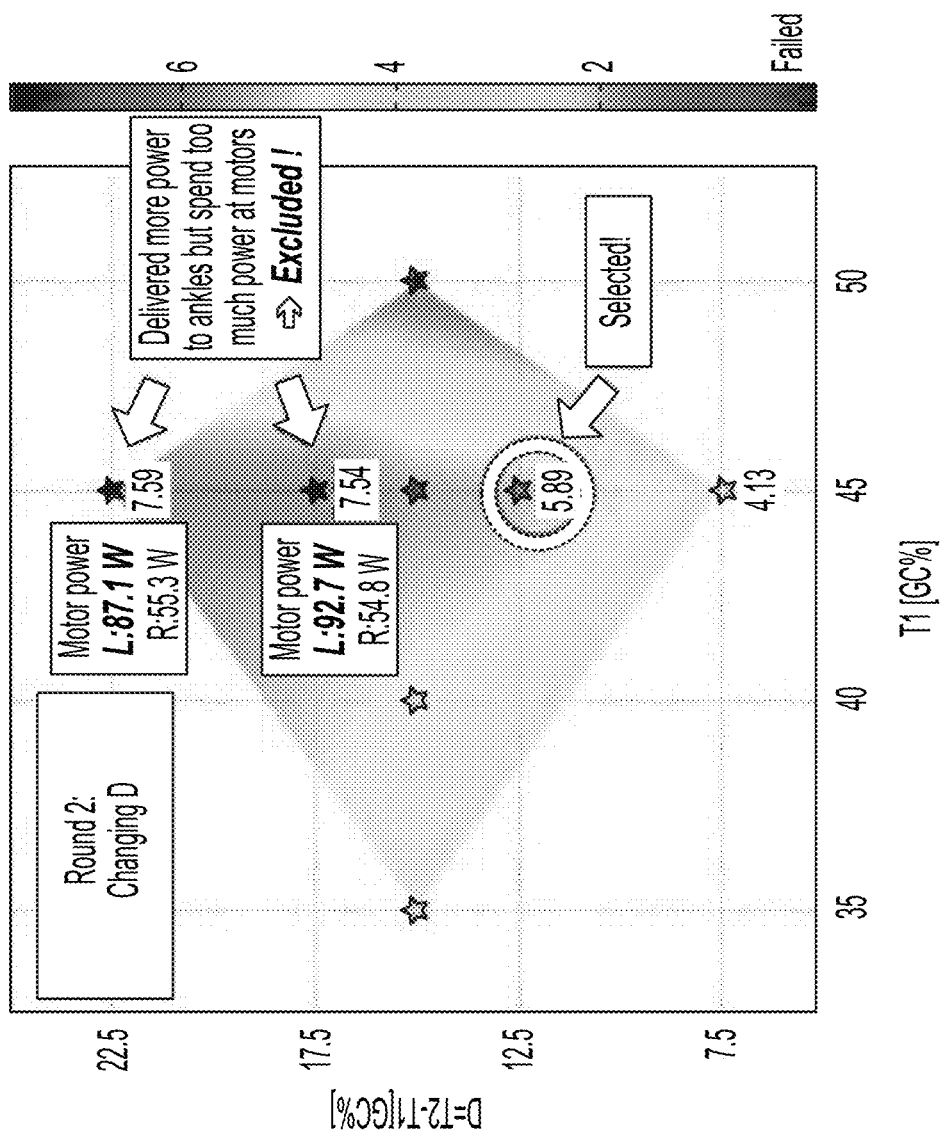
Figure 33C:
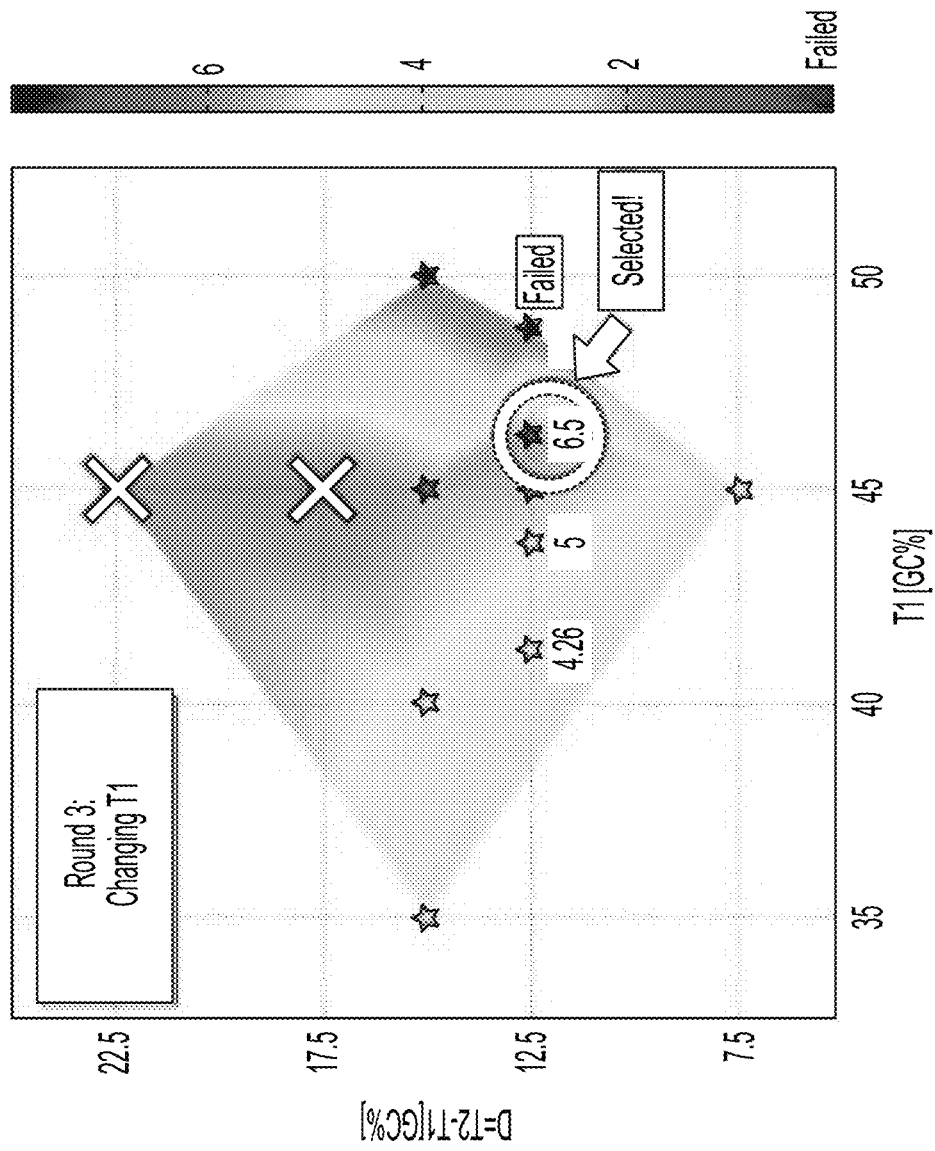
Figure 33D:
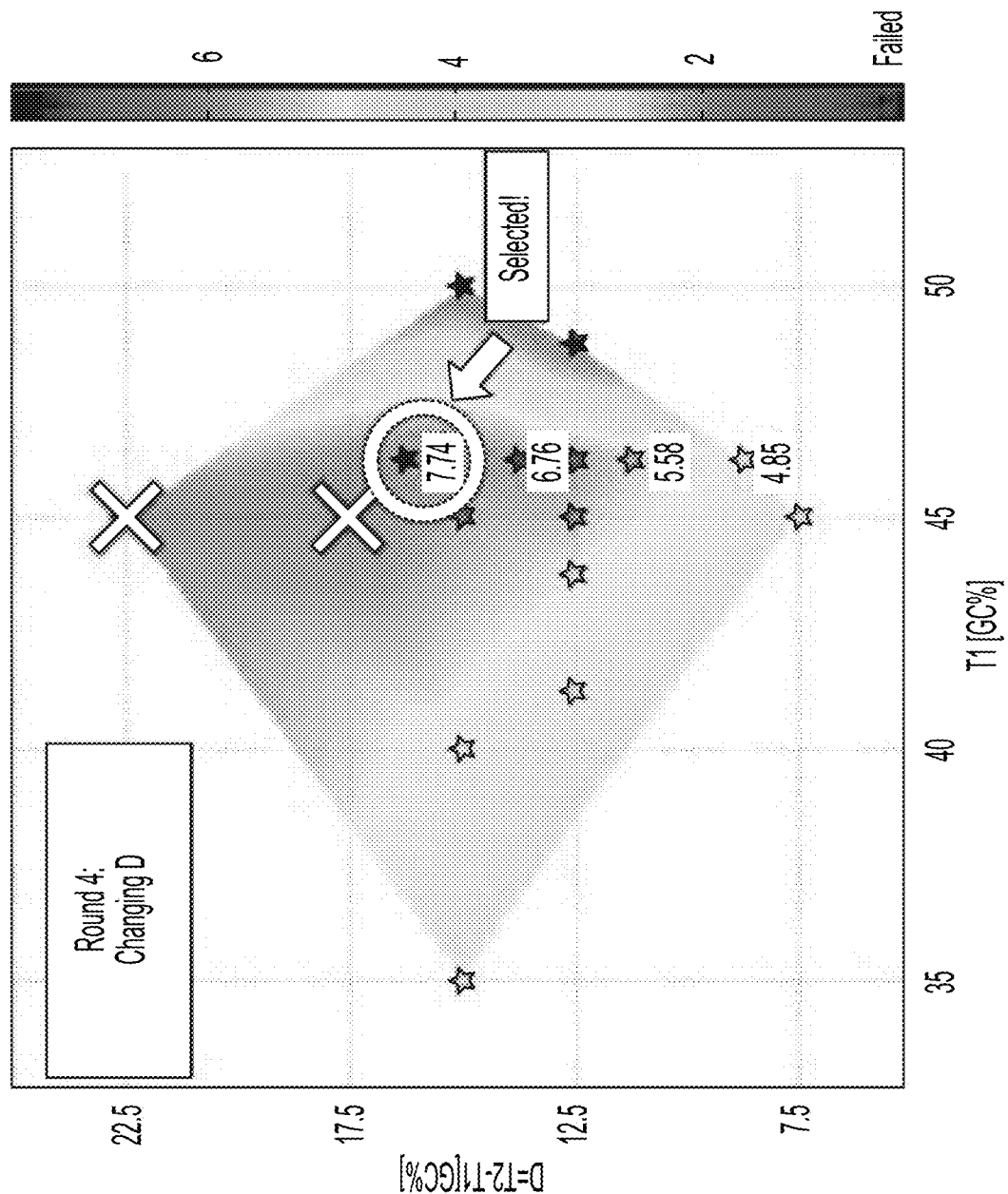
Figure 33E:
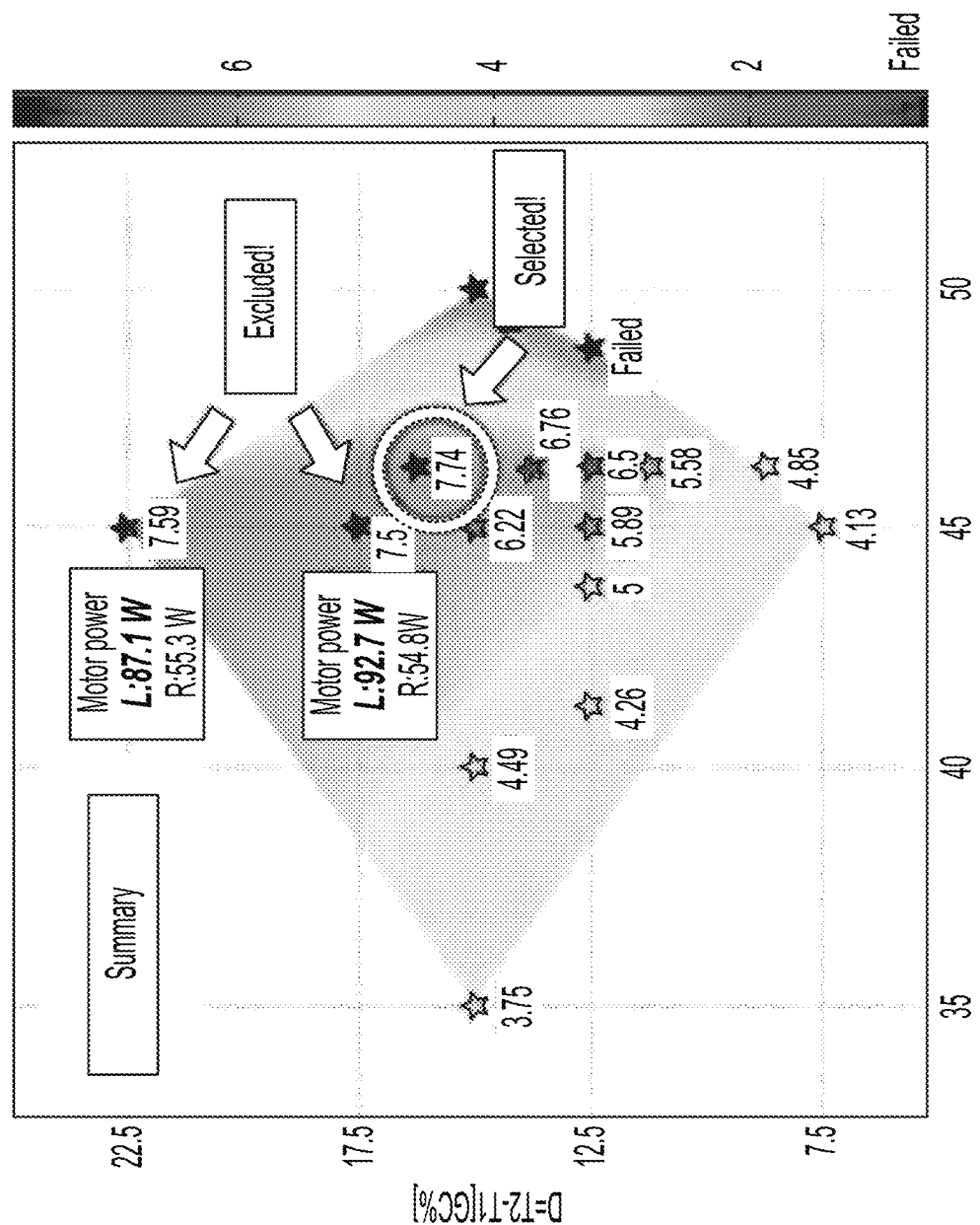

FIG. 32 shows that the assistive profile is different between optimal and original timing conditions and the power plot clearly shows that the optimal profile is able to deliver significantly more positive power to the ankle joint. The graph on the right shows that between using a controller with constant timings vs. adapting the timing using an optimization algorithm, every subject was able to improve metabolic reduction going from a reduction of 11.97% for constant timing to a reduction of 18.8% with optimization in average; this difference is extremely promising.

An addition to this algorithm for certain applications is to set a threshold for power consumption when exploring the search space during the optimization process. FIG. 33A, FIG. 33B, FIG. 33C, FIG. 33D, and FIG. 33E show an example of how this algorithm would work. These graphs were created in real-time on a subject walking on a treadmill. As shown in the next figure, the algorithm will exclude conditions that consume too much power. As shown in the last graph, the algorithm selected a condition that produces 7.74 W of positive power as opposed to the global optimum which would have been 7.59 W but it does so consuming electrical power below the specified threshold during these tests.

An example embodiment of an optimization procedure could be:

1) User walk on a treadmill at a constant speed to maximize positive power and run optimization algorithm until the system finds the optimal timing based on this subject. During this process, the algorithm is running to find the optimal timing based on a gait (%) as described above.

2) Once the algorithm has found the optimal timing, the algorithm may provide relative values of a biomechanic event that is known to change when subject changes speeds or different events so that the system will adapt the timing depending on the activity that the user is doing. For instance, after the optimization process described above, the algorithm may provide a threshold for the joint speed that should be used to trigger the actuation that was found at that specific speed on the treadmill as opposed to a fixed gait percentage if that's believed to give a more adaptive result to different speed.

Another embodiment of this optimization procedure would be running continuously during walking and adapt to any changes in gait by optimizing the objective function as the user walks or as the user does the desired activity.

The following pseudocode is representative of such embodiments:

```
...
float ank_pos_pow[60];
float elec_pow[60];
float ank_pos_pow_ave[3];
float elec_pow_ave;
```

```
float ank_pos_pow_max;
float T1_current = 40.0; // initial condition (in this example, T1 = 40% GC)
float D_current = 10.0; // initial condition (in this example, D = 10% GC)
float T1_interval = 5.0; // initial condition (in this example, T1 search interval starts from 5% GC and will be reduced)
float D_interval = 5.0; // initial condition (in this example, D search interval starts from 5% GC and will be reduced)
float T1_best;
float D_best;
float T1_candidates[3];
float D_candidates[3];
int stride_count = 0;
int condition_count = 0;
int round_count = 0;
tht failure_count = 0;
bool END_OF_STRIDE = FALSE;
bool END_OF_CONDITION = FALSE;
bool END_OF_ROUND = FALSE;
...
while (1) // Execute this every loop (e.g. 1 ms)
{
    ...
    Assistance_Generator (T1_current, D_current); // Always generate assistance profile using the current T1 and D
    ...
    if ( END_OF_STRIDE ) // Execute this once per stride (e.g. the next right foot heel strike)
    {
        ank_pos_pow[stride_count]= Ank_Pos_Pow_Calculator( ); // Save ankle positive power delivered during the stride
        elec_pow[stride_count]= Elec_Pow_Calculator( ); // Save electrical power spent by actuator during the stride
        if ( !Force_Consistency_Checker( ) ) // Check force delivery consistency and count the number of failures
            failure_count++;
        stride_count++;
        if ( stride_count == 60 ) // In this example, one condition consists of 60 strides
            END_OF_CONDITION = 1;
    }
    if ( END_OF_CONDITION ) // Execute this once per condition
    {
        ank_pos_pow_ave[condition_count] = average( ank_pos_pow );
        elec_pow_ave = average( elec_pow );
        if ( failure_count > 5 ) // In this example, exclude the condition if 5+ out of 60 strides were failed
            ank_pos_pow_ave[condition_count] = -1;
        if ( elec_pow_ave > 80 ) // In this example, exclude the condition of electrical power was higher than 80W
            ank_pos_pow_ave[condition_count] = -1;
        stride_count = 0;
        failure_count = 0;
        condition_count++;
        if ( condition_count == 3 ) // In this example, one round consists of 3 conditions
            END_OF_ROUND = 1;
    }
    if ( END_OF_ROUND ) // Execute this once per round
    {
        ank_pos_pow_max = max( ank_pos_pow_ave );
        best_condition_num = find( ank_pos_pow_ave, ank_pos_pow_max );
        T1_best = T1_candidates[best_condition_num];
        D_best = D_candidates[best_condition_num];
        condition_count = 0;
        round_count++;
        if ( round_count % 2 == 0) // If the round count is even, fix D and search for T1
        {
            D_candidates = [D_best, D_best, D_best];
            T1_candidates[0] = T1_best - T1_interval;
            T1_candidates[1] = T1_best;
            T1_candidates[2] = T1_best + T1_interval;
            T1_interval = T1_interval /2; // Reduce search interval for T1
        }
        else // If the round count is odd, fix T1 and search for D
        {
            T1_candidates = [T1_best, T1_best, T1_best];
            D_candidates[0] = D_best - D_interval;
            D_candidates[1] = D_best
            D_candidates[2] = D_best + D_interval;
            D_interval = D_interval / 2; // Reduce search interval for D
        }
    }
    T1_current = T1_candidates[condition_count];
    D_current = D_candidates[condition_count];
    END_OF_STRIDE = FALSE;
    END_OF_CONDITION = FALSE;
    END_OF_ROUND = FALSE;
}
```

While the presently disclosed embodiments have been described with reference to certain embodiments thereof, it should be understood by those skilled in the art that various changes may be made and equivalents may be substituted without departing from the true spirit and scope of the presently disclosed embodiments. In addition, many modifications may be made to adapt to a particular situation, indication, material and composition of matter, process step or steps, without departing from the spirit and scope of the present presently disclosed embodiments. All such modifications are intended to be within the scope of the claims appended hereto.

What is claimed is:

1. A wearable system comprising:
an exosuit configured to span one or more joints of a wearer;
at least one actuator configured to generate a force in the exosuit;
at least one sensor configured to measure information for evaluating an objective function associated with an interaction between the wearer and the exosuit; and
at least one controller configured to iteratively:
actuate the at least one actuator according to at least one actuation profile,
evaluate the objective function based on the information measured by the at least one sensor to determine a resulting change in the objective function,
update a target value of at least one parameter of the at least one actuation profile towards a target based at least in part on the objective function,
adjust the at least one parameter of the at least one actuation profile based on the updated target value and the resulting change in the objective function, and
continue to actuate, evaluate, update and adjust to optimize the objective function;
wherein, in at least an initial iteration:
the step of adjusting includes defining, based on corresponding evaluations of the objective function from the at least one sensor, a mathematical correlation between the at least one parameter and the corresponding evaluations of the objective function, and evaluating the mathematical correlation to determine a candidate value or a candidate set of values of the at least one parameter for optimizing the objective function; and
wherein, in at least a subsequent iteration:
the step of actuating includes actuating the at least one actuator according to an actuation profile associated with the candidate value or the candidate set of values, and
the step of updating includes updating the mathematical correlation based on a corresponding evaluation of the objective function from the at least one sensor.

2. The wearable system according to claim 1, wherein the at least one parameter of the at least one actuation profile is selected from the group consisting of: an onset timing of actuation, an offset timing of actuation, a rate of actuation, a timing at which a maximum amplitude of actuation is reached, a maximum amplitude of actuation, a minimum amplitude of actuation, and an overall shape of the actuation profile.

3. The wearable system according to claim 1, wherein the objective function includes one or a combination of energy expenditure, locomotive efficiency, locomotive output, ground clearance, gait symmetry, similarity of joint kinematics to normative data, time integral of muscular activity, propulsive impulse, peak propulsive force, ratio of propulsive impulse to braking impulse, propulsion impulse symmetry, peak propulsion symmetry, timing of a transition from braking to propulsion, similarity of ground reaction forces to normative data, stability during locomotion, joint range of motion, foot placement, step length, step width, time to perform a repetitive task, trailing limb angle during terminal stance, vertical center of mass travel, center of mass power, similarity of center of pressure location of the foot to normative data, total pressure of the foot during push off, blood oxygenation in muscles, and muscle contraction or strain.

4. The wearable system according to claim 1, wherein the objective function includes one or a combination of displacement of the exosuit, comfort of the wearer, pressure at an interface between the wearer and the exosuit, load transfer along the wearer, and actuator force.

5. The wearable system according to claim 1, wherein the objective function includes one or a combination of electrical power consumption; consistency of assistive forces; maximum and average actuator position, velocity, acceleration, or jerk; and temperature.

6. The wearable system according to claim 1, wherein evaluating the objective function includes one or a combination of obtaining a direct measurement of the objective function using the one or more sensors; calculating or approximating the objective function using the information measured by the one or more sensors; and measuring, calculating, or approximating a proxy correlated with the objective function using the information measured by the one or more sensors.

7. The wearable system according to claim 1, wherein the information for evaluating the objective function includes one or a combination of an angle, velocity, or acceleration of one or more joints; a force, torque, or power applied by the exosuit; a type of physical activity in which the wearer is engaged; a posture of the wearer; an energy expenditure of the wearer; and an interaction of the wearer's body with a surrounding physical environment.

8. The wearable system according to claim 1, wherein the information for evaluating the objective function includes one or a combination of a shearing or compression force generated between the wearer and the exosuit; and a position of the exosuit on the wearer.

9. The wearable system according to claim 1, wherein the information for evaluating the objective function includes one or a combination of a current or a voltage used during actuation of the exosuit; a temperature of one or more components of the exosuit; a force generated by the at least one actuator; a force delivered to the exosuit; and a force, torque, or power delivered to the wearer of the exosuit.

10. The wearable system according to claim 1, wherein the at least one sensor includes one or a combination of an inertial measurement unit, a joint angle sensor, a force or pressure sensor, a torque sensor, a metabolic energy measurement device, a muscle activity measurement device, a ground reaction force sensor, a heart rate sensor, and an insole force or pressure sensor.

11. The wearable system according to claim 1,
wherein the at least one controller is configured to optimize the objection function until the objective function reaches a maximum value or a minimum value, or when a predefined termination criterion is met.

12. The wearable system according to claim 11,
wherein the predefined termination criterion is selected from the group consisting of: (i) a difference between evaluations of the objective function for successive adjustments to the at least one parameter of the at least one actuation profile falls below a predetermined threshold, (ii) a difference between successive adjustments to the at least one parameter of the at least one actuation profile falls below a predetermined threshold, (iii) a predefined amount of time since the start of optimization has been exceeded, (iv) the wearer exceeds a predefined number of steps since the start of optimization, and (v) a termination command is issued by the wearer.

13. The wearable system according to claim 1,
wherein the controller is configured to use a gradient descent process in actuating, evaluating, and adjusting to optimize the objective function.

14. The wearable system according to claim 1,
wherein, in evaluating the objective function, the controller is configured to determine whether the evaluation increased or decreased from one or an average of preceding evaluations of the objective function, and
wherein, in adjusting the at least one parameter of the at least one actuation profile, the controller is configured to continue adjusting the at least one parameter in a same direction if the objective function increased from the one or the average of preceding evaluations, and adjust the at least one parameter in an opposing direction if the objective function decreased from the one or the average of preceding evaluations.

15. The wearable system according to claim 1,
wherein the step of actuating includes actuating the at least one actuator according to a first set of actuation profiles for a corresponding period, the first set of actuation profiles having variations in a value of the at least one parameter,
wherein the step of evaluating includes comparing evaluations of the objective function taken by the at least one sensor during each of the corresponding periods to determine which of the actuation profiles is associated with a highest or lowest evaluation of the objective function depending whether the objective function is to be maximized or minimized, respectively, and
wherein the step of adjusting includes generating a second set of actuation profiles with variations in the values of the at least one parameter based on a derivative of the evaluation of the objective function associated with the first set of actuation profiles.

16. The wearable system according to claim 15,
wherein the values of the at least one parameter in the second set of actuation profiles are calculated as the corresponding values of the at least one parameter in the first set of actuation profiles plus the derivative of the evaluations of the objective function associated with the first set of actuation profiles.

17. The wearable system according to claim 1,
wherein the at least one parameter to be adjusted for optimizing the objective function includes at least one parameter to be optimized for maximizing or minimizing the objective function, and wherein, in at least the initial iteration:
the step of actuating includes actuating the at least one actuator according to two or more actuation profiles having different baseline values or sets of baseline values of the at least one parameter to be optimized.

18. The wearable system according to claim 1,
wherein the controller is configured to use a Gaussian process to define the mathematical correlation, and
wherein, in evaluating the mathematical correlation, the controller is configured to use a Bayesian process to determine the candidate value or candidate set of values of the at least one parameter.

19. The wearable system according to claim 1,
wherein the one or more joints of the wearer include a hip joint,
wherein the at least one parameter includes an actuation peak timing and an actuation offset timing, and
wherein the objective function is a locomotive efficiency of the wearer.

20. The wearable system according to claim 1,
wherein the at least one sensor is configured to measure a rotational velocity of a joint of the wearer and a force generated in the exosuit, and
wherein the at least one controller is configured to calculate, based on the measurements from the at least one sensor, an average positive power delivered by the exosuit to the wearer.

21. The wearable system according to claim 1,
wherein the at least one sensor is configured to measure a force or pressure between a foot of the wearer and a surface in the wearer's physical environment, and
wherein the at least one controller is configured to calculate, based on the measurements from the at least one sensor, a forward propulsive force of the wearer.

22. The wearable system according to claim 1,
wherein the at least one sensor is configured to measure a dorsiflexion angle of the ankle joint during a swing phase of locomotion, and
wherein the at least one controller is configured to calculate, based on the measurements from the at least one sensor, a ground clearance of the foot during the swing phase of locomotion.

23. The wearable system according to claim 1,
wherein the at least one sensor is configured to measure a landing angle of a paretic foot of the wearer and a landing angle of a non-paretic foot of the wearer,
wherein the at least one controller is configured to calculate, based on the measurements from the at least one sensor, a difference between the landing angle of the paretic foot and the landing angle of the non-paretic foot, and
wherein the objective function is symmetry between a gait of the non-paretic leg and a gait of the paretic leg.

24. The wearable system according to claim 1, wherein the at least one controller is further configured to:
monitor, in real-time, measurements from the at least one sensor to detect a predetermined motion of the wearer,
adjust, in real-time, the actuation profile in reaction to detecting the predetermined motion, and
disregard information measured by the at least one sensor during the predetermined motion when optimizing the objective function.

25. The wearable system according to claim 1, wherein the controller is configured to select an optimization approach based, at least in part, on a landscape of the objective function.

26. The wearable system according to claim 1, wherein the controller is configured to optimize the objective function using a gradient-descent optimization approach.

27. The wearable system according to claim 1, wherein the controller is configured to optimize the objective function using a Bayesian optimization approach.

28. The wearable system according to claim 1, wherein the controller is configured to sample a space of potential control parameters to estimate a landscape of the objective function.

29. The wearable system according to claim 1, wherein the objective function is an energy expenditure of the wearer.

30. The wearable system according to claim 1, wherein the objective function is a power delivered by the exosuit to the wearer.

31. A wearable system comprising:
   an exosuit configured to span one or more joints of a leg of a wearer;
   at least one actuator configured to generate a force in the exosuit for assisting or promoting an improvement in a gait of the wearer;
   at least one sensor configured to measure information for evaluating an objective function associated with at least one of providing physical assistance to the wearer, an interaction between the exosuit and the wearer, and an operation of the exosuit; and
   at least one controller configured to iteratively:
      actuate the at least one actuator according to at least one actuation profile during a gait cycle of the wearer,
      evaluate the objective function based on the information measured by the at least one sensor to determine whether the evaluation of the objective function increased or decreased from one or an average of evaluations of the objective function from preceding gait cycles,
      update a target value of at least one parameter of the at least one actuation profile towards a target based at least in part on the objective function,
      adjust the at least one parameter of the at least one actuation profile based on the updated target value and the determination of whether the evaluation of the objective function increased or decreased, and
      continue to actuate, evaluate, update and adjust until the evaluation of the objective function reaches a local maximum or a local minimum value, or when a predetermined termination criteria is met;
   wherein, in at least an initial iteration:
      the step of adjusting includes defining, based on corresponding evaluations of the objective function from the at least one sensor, a mathematical correlation between the at least one parameter and the corresponding evaluations of the objective function, and evaluating the mathematical correlation to determine a candidate value or a candidate set of values of the at least one parameter for optimizing the objective function; and
   wherein, in at least a subsequent iteration:
      the step of actuating includes actuating the at least one actuator according to an actuation profile associated with the candidate value or the candidate set of values, and
      the step of updating includes updating the mathematical correlation based on a corresponding evaluation of the objective function from the at least one sensor.

32. A wearable system comprising:
   an exosuit configured to span one or more joints of a leg of a wearer;
   at least one actuator configured to generate a force in the exosuit for assisting or promoting an improvement in a gait of the wearer;
   at least one sensor configured to measure information for evaluating an objective function associated with at least one of providing physical assistance to the wearer, an interaction between the exosuit and the wearer, and an operation of the exosuit; and
   at least one controller configured to:
      identify two or more actuation parameters to be adjusted for optimizing the objective function;
      actuate the at least one actuator according to two or more actuation profiles having different sets of baseline values of the two or more actuation parameters to be optimized;
      evaluate the objective function for each of the two or more actuation profiles based on the information measured by the at least one sensor;
      update a target value of each of the two or more actuation parameters towards a target based at least in part on the objective function;
      define, based on the updated target values and corresponding evaluations of the objective function, a mathematical correlation between the two or more actuation parameters and the corresponding evaluations of the objective function;
      evaluate the baseline mathematical correlation to determine a candidate set of values of the two or more actuation parameters for optimizing the objective function;
      update the mathematical correlation based on a corresponding evaluation of the objective function for an actuation of the at least one actuator according to an actuation profile associated with the candidate set of values of the two or more actuation parameters; and
      continue to update the mathematical correlation until an evaluation of the objective function reaches a global maximum or a global minimum value, or when a predetermined termination criteria is met.

* * * * *